(12) United States Patent
Suzuki

(10) Patent No.: US 10,748,263 B2
(45) Date of Patent: Aug. 18, 2020

(54) MEDICAL IMAGE PROCESSING APPARATUS, MEDICAL IMAGE PROCESSING METHOD AND MEDICAL IMAGE PROCESSING SYSTEM

(71) Applicant: Ziosoft, Inc., Tokyo (JP)

(72) Inventor: Takahiro Suzuki, Tokyo (JP)

(73) Assignee: ZIOSOFT, INC., Tokyo (JP)

( * ) Notice: Subject to any disclaimer, the term of this patent is extended or adjusted under 35 U.S.C. 154(b) by 2 days.

(21) Appl. No.: 16/156,571

(22) Filed: Oct. 10, 2018

(65) Prior Publication Data
US 2019/0114751 A1   Apr. 18, 2019

(30) Foreign Application Priority Data

Oct. 17, 2017  (JP) .................. 2017-201289

(51) Int. Cl.
| | | |
|---|---|---|
| G06T 17/00 | (2006.01) | |
| G06T 5/40 | (2006.01) | |
| G06T 15/08 | (2011.01) | |
| G06T 5/50 | (2006.01) | |
| G06T 15/06 | (2011.01) | |
| G06T 11/00 | (2006.01) | |
| G06T 11/20 | (2006.01) | |

(52) U.S. Cl.
CPC .................. *G06T 5/40* (2013.01); *G06T 5/50* (2013.01); *G06T 11/008* (2013.01); *G06T 15/06* (2013.01); *G06T 15/08* (2013.01); *G06T 11/206* (2013.01); *G06T 2200/24* (2013.01); *G06T 2207/10081* (2013.01); *G06T 2210/41* (2013.01)

(58) Field of Classification Search
CPC .. G06T 5/40; G06T 5/50; G06T 15/06; G06T 15/08; G06T 11/008
See application file for complete search history.

(56) References Cited

U.S. PATENT DOCUMENTS

| | | | | |
|---|---|---|---|---|
| 2004/0236549 | A1* | 11/2004 | Dalton .................... | G06T 15/08 703/2 |
| 2006/0291710 | A1* | 12/2006 | Wang ...................... | G06T 15/08 382/131 |
| 2007/0008318 | A1* | 1/2007 | Matsumoto ............. | G06T 15/08 345/424 |
| 2015/0320377 | A1 | 11/2015 | Masumoto | |

* cited by examiner

Primary Examiner — Charles Tseng
(74) Attorney, Agent, or Firm — Pearne & Gordon LLP

(57) ABSTRACT

A medical image processing apparatus includes an acquisition unit, a processing unit, a memory and a display. The acquisition unit acquires first volume data including data of a subject. A predetermined luminance condition is set in the memory. The predetermined luminance condition is a luminance condition that is to be satisfied by luminance of a first SUM image rendering the acquired first volume data. The processing unit generates first luminance information that gives the luminance of the first SUM image that satisfies the predetermined luminance condition, generates the first SUM image by rendering the acquired first volume data with the generated first luminance information, and displays the generated first SUM image in the display.

17 Claims, 67 Drawing Sheets

MEDICAL IMAGE PROCESSING APPARATUS, MEDICAL IMAGE PROCESSING METHOD AND MEDICAL IMAGE PROCESSING SYSTEM

CROSS-REFERENCE TO RELATED APPLICATION

This application claims priority based on Japanese Patent Application No. 2017-201289, filed on Oct. 17, 2017, the entire contents of which are incorporated by reference herein.

BACKGROUND OF THE INVENTION

1. Field of the Invention

The present disclosure relates to a medical image processing apparatus, a medical image processing method, and a medical image processing system.

2. Related Art

In the related art, SUM image is known as an image obtained by rendering volume data, that a sum value which is obtained by adding voxel values of voxels along virtual ray. The SUM image is adjusted under a predetermined luminance control to be displayed on a display device (for example, see US2015/0320377).

SUMMARY

In the SUM image, not only the voxel value in one planar section but also the voxel value of each voxel along the virtual ray affect a pixel value. For example, when a length in a direction along the virtual ray (a length in a depth direction on the SUM image) is 5 cm, a pixel value of a SUM image can be twice as large as the pixel value of the SUM image when the length is 10 cm. Accordingly, as the length (thickness) in the direction along the virtual ray changes, brightness on the SUM image changes greatly, and an appearance of the displayed image changes greatly. For example, when the length in the direction along the virtual ray is doubled, the brightness on the SUM image may be doubled to be excessively bright.

In view of the above circumstances, the present disclosure provides a medical image processing apparatus, a medical image processing method, and a medical image processing system that can suitably perform a luminance control for a SUM image.

According to one aspect of the disclosures, a medical image processing apparatus includes an acquisition unit, a processing unit, a memory and a display. The acquisition unit acquires first volume data including data of a subject. A predetermined luminance condition is set in the memory. The predetermined luminance condition is a luminance condition that is to be satisfied by luminance of a first SUM image rendering the acquired first volume data. The processing unit generates first luminance information that gives the luminance of the first SUM image that satisfies the predetermined luminance condition, generates the first SUM image by rendering the acquired first volume data with the generated first luminance information, and displays the generated first SUM image in the display.

According to another aspect of the disclosures, a medical image processing method in a medical image processing apparatus, includes: acquiring first volume data including data of a subject; setting a predetermined luminance condition, the predetermined luminance condition being a luminance condition that is to be satisfied by luminance of a first SUM image rendering the acquired first volume data, generating first luminance information that gives the luminance of the first SUM image that satisfies the predetermined luminance condition; generating the first SUM image by rendering the acquired first volume data and the generated first luminance information; and displaying the generated first SUM image.

According to further another aspect of the disclosures, a medical image processing system causes a medical image processing apparatus to execute the medical image processing operations including: acquiring first volume data including data of a subject; setting a predetermined luminance condition, the predetermined luminance condition being a luminance condition that is to be satisfied by luminance of a first SUM image rendering the acquired first volume data, generating first luminance information that gives the luminance of the first SUM image that satisfies the predetermined luminance condition; generating the first SUM image by rendering the acquired first volume data with the generated first luminance information; and displaying the generated first SUM image.

According to the present disclosure, a SUM image can be suitably luminance-controlled.

BRIEF DESCRIPTION OF THE INVENTION

DETAILED DESCRIPTION OF THE EMBODIMENT

Figure 1:
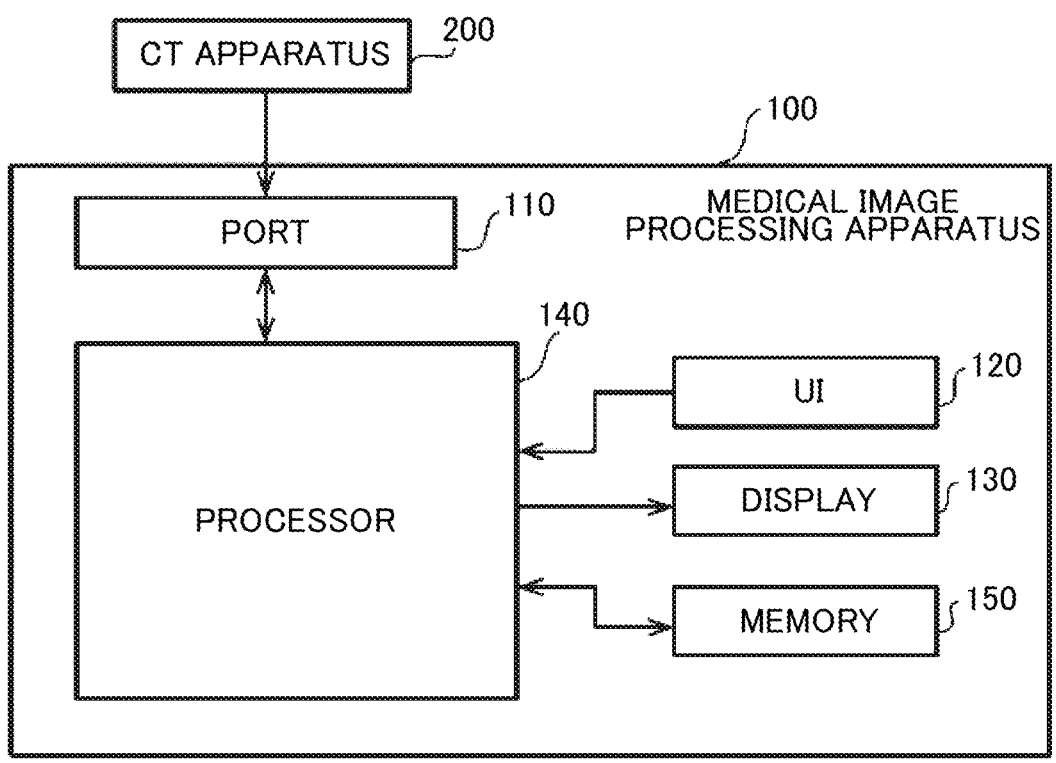
FIG. 1 is a block diagram illustrating a hardware configuration example of a medical image processing apparatus in a first embodiment.

Hereinafter, embodiments of the present disclosure will be described with reference to the drawings.

Details Leading to an Embodiment of Present Disclosure

For displaying a multi planar reconstruction (MPR) image and a maximum intensity projection (MIP) image including a subject, luminance may be controlled in some cases. For example, the MRP image and the MIP image may be luminance-controlled using a preset value. In the luminance control of CT image, a window width (WW) or a window level (WL) may be adjusted. For example, regarding the preset value used for a lung field region, a WL value is −716 and a WW value is 1492. Regarding the preset value used for a mediastinal region, the WL value is 231 and the WW value is 1971. Regarding the preset value used for a bone region, the WL value is 231 and the WW value is 1971.

In addition, the luminance control may be performed by auto window. The auto window is a process of automatically setting the WW and the WL based on contents of an image used in the MPR image and the MIP image. In the auto window, the WW or the WL was calculated, as luminance information, based on statistical information of pixels included in the MPR image and the MIP image as follows.

WW=a (Constant)×Variance pixel value in image
WL=Average pixel value in image

In the related art, in a SUM image, luminance control based on the WW/WL, luminance control using the preset value, and luminance control using the auto window are not performed. Since the SUM image is a sum of voxel values of respective voxels along virtual ray, a range of a value as the sum (total value) is wide, and an appropriate WW/WL varies greatly depending on tissues to be rendered or a physique of a patient, therefore the setting by automatic processing is not suitable for the SUM image. For example, it is not a preferable method of directly projecting a maximum value and a minimum value of the sum (total value) as white and black of an image. This is because that, in the SUM image, the method may cause so-called halation and black defect in many pixels on a thin image which is in interest of a user.

In a case where the pixel value of the generated SUM image is large and the SUM image is excessively bright, it is necessary to perform the luminance control by the user in order to reduce the brightness to display the SUM image. In this case, when controlling luminance of the SUM image, user convenience is insufficient. Also, even when the luminance control is performed by the user, since an adjustable range of the WW/WL is wide, adjustment is not easy.

Hereinafter, a medical image processing apparatus, a medical image processing method, and a medical image processing system that can suitably perform the luminance control for a SUM image will be described.

In the present disclosure, a medical image processing apparatus includes an acquisition unit, a processing unit, a memory and a display. The acquisition unit acquires first volume data including data of a subject. A predetermined luminance condition is set in the memory. The predetermined luminance condition is a luminance condition that is to be satisfied by luminance of a first SUM image rendering the acquired first volume data acquired by the acquision unit. The processing unit generates first luminance information that gives the luminance of the first SUM image that satisfies the predetermined luminance condition, generates the first SUM image by rendering the acquired first volume data with the generated first luminance information, and displays the generated first SUM image in the display. According to the disclosure, the SUM image can be displayed under the suitable luminance control. Specifically, the SUM image can be displayed close to an appearance when another previous SUM image was displayed.

First Embodiment

FIG. 1 is a block diagram illustrating a configuration example of a medical image processing apparatus 100 in a first embodiment. The medical image processing apparatus 100 includes a port 110, a user interface (UI) 120, a display 130, a processor 140, and a memory 150.

A CT apparatus 200 is connected to the medical image processing apparatus 100. The medical image processing apparatus 100 acquires volume data from the CT apparatus 200 and performs processing on the acquired volume data. The medical image processing apparatus 100 may be constituted of a personal computer (PC) and software installed in the PC.

The CT apparatus 200 irradiates a living body with X-rays and captures an image (a CT image) using a difference in absorption of the X-rays depending on tissues in the body. Examples of the living body include human body. The living body is an example of a subject.

The CT images may be captured plural times in time series. The CT apparatus 200 generates volume data including information on an arbitrary location within the living body. The arbitrary location within the living body may include various tissues (such as heart, kidney, large intestine, small intestine, and lungs). When the CT image is captured, a CT value or voxel value of each voxel in the CT image is obtained. The CT apparatus 200 transmits volume data as the CT image to the medical image processing apparatus 100 via a wired line or a radio line.

The CT apparatus 200 includes a gantry (not shown) and a console (not shown). The gantry includes an X-ray generator (not shown) and an X-ray detector (not shown), and captures an image at a predetermined timing instructed by the console. Accordingly, the gantry detects the X-rays transmitted through the human body to obtain X-ray detection data. The X-ray generator includes an X-ray tube (not shown). The console is connected to the medical image processing apparatus 100. The console acquires a plurality of pieces of the X-ray detection data from the gantry and generates volume data based on the X-ray detection data. The console transmits the generated volume data to the medical image processing apparatus 100. The console may include an operation unit (not shown) for inputting patient information, imaging conditions for CT scanning, contrast conditions for administration of a contrast medium, and other information. The operation unit may include an input device such as a keyboard or a mouse.

The CT apparatus 200 can acquire a plurality of pieces of three-dimensional volume data by continuously capturing images and generate moving images. The data of the moving images based on a plurality of pieces of the three-dimensional volume data is also called four-dimensional (4D) data.

The CT apparatus 200 may capture the CT image at each of a plurality of timings. The CT apparatus 200 may capture the CT image in a state where the subject is contrasted. The CT apparatus 200 may capture the CT image in a state where the subject is not contrasted.

The port 110 in the medical image processing apparatus 100 includes a communication port or an external device connection port and acquires volume data obtained from the CT image. The acquired volume data may be immediately sent to the processor 140 to be subjected to various processing. Also, the acquired volume data may be stored in the memory 150 and then sent to the processor 140 as needed to be subjected to various processing. In addition, the volume data may be acquired via a storage medium or a recording medium.

The volume data obtained by imaging of the CT apparatus 200 may be sent from the CT apparatus 200 to an image data server (Picture Archiving and Communication Systems: PACS) (not shown) to be stored. The port 110 may acquire the volume data from the image data server instead of acquiring the volume data from the CT apparatus 200. In this manner, the port 110 functions as an acquisition unit acquiring various data such as volume data.

The UI 120 may include a touch panel, a pointing device, a keyboard, or a microphone. The UI 120 receives an arbitrary input operation from the user of the medical image processing apparatus 100. The user may include a doctor, a radiologist, or other medical staff (paramedic staff).

The UI 120 receives an operation such as designation of a region of interest (ROI) in the volume data or setting of a luminance condition. The region of interest may include regions of various tissues (such as blood vessels, bronchial tubes, organs, bones, brain, heart, feet, neck, and blood flow). The tissues may broadly include tissues of living bodies such as diseased tissues, normal tissues, and organs.

The display 130 may include a liquid crystal display (LCD) and displays various information. The various kinds of information include a three-dimensional image obtained from the volume data. The three-dimensional image may include a volume rendering image, a surface rendering image, a virtual endoscope image (VE image), an MPR image, a curved planar reconstruction (CPR) image, and the like. The volume rendering image may include a ray sum image (also simply referred to as a "SUM image"), a maximum intensity projection (MIP) image, a minimum intensity projection (MinIP) image, an average value (Average) image or a ray cast image.

The memory 150 includes a primary storage device of various read only memory (ROM) or random access memory (RAM). The memory 150 may also include a secondary storage device such as hard disk drive (HDD) or solid state drive (SSD). The memory 150 may also include a tertiary memory device such as USB memory or an SD card. The memory 150 stores various kinds of information and programs. The various kinds of information may include volume data acquired by the port 110, an image generated by the processor 140, setting information set by the processor 140, and various programs. The memory 150 is an example of a non-transitory storage medium on which a program is recorded.

The processor 140 may include a central processing unit (CPU), a digital signal processor (DSP), or a graphics processing unit (GPU). The processor 140 functions as a processing unit 160 that performs various kinds of processing and control by executing the medical image processing program stored in the memory 150.

Figure 2:
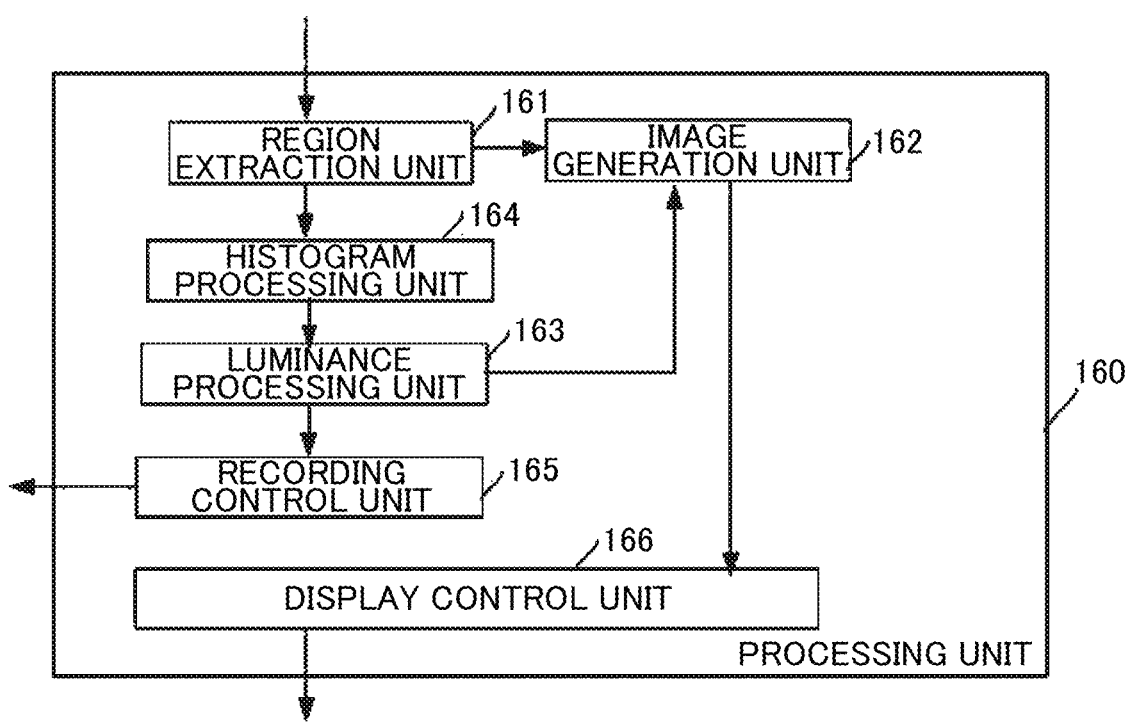
FIG. 2 is a block diagram illustrating a functional configuration example of the medical image processing apparatus.

FIG. 2 is a block diagram illustrating a functional configuration example of the processing unit 160.

The processing unit 160 includes a region extraction unit 161, an image generation unit 162, a luminance processing unit 163, a histogram processing unit 164, a recording control unit 165, and a display control unit 166.

The processing unit 160 performs an overall control of each part of the medical image processing apparatus 100. Each part included in the processing unit 160 may be realized as a different function by one piece of hardware or may be realized as a different function by a plurality of pieces of hardware. In addition, each part included in the processing unit 160 may be realized by a dedicated hardware component.

The region extraction unit 161 may perform segmentation processing with respect to the volume data. In this case, the UI 120 receives an instruction from the user, and the instruction information is sent to the region extraction unit 161. The region extraction unit 161 may perform segmentation processing to extract (segment) the region of interest from volume data using a known method, based on the instruction information. In addition, the region of interest may be set manually by detailed instruction from the user. When an observation object is predetermined, the region extraction unit 161 may perform segmentation processing to extract the region of interest including the observation object, from the volume data without user instruction. A region to be extracted may include regions of various tissues (such as blood vessels, bronchial tubes, organs, bones, brain, heart, feet, neck, and blood flow). The various tissues may include arteries, veins, portal veins, bile ducts, and the like.

The image generation unit 162 may generate a three-dimensional image, based on the volume data acquired by the port 110. The image generation unit 162 may generate a three-dimensional image, based on a designated region or the region extracted by the region extraction unit 161 from the volume data acquired by the port 110. The image generation unit 162 may generate, for example, a SUM image. Since the SUM image is close to appearance on X-ray image, the SUM image is familiar to the user and is easy to be observed by the user.

The image generation unit 162 may generate a SUM image for output (for display) of which luminance is adjusted with respect to an original SUM image, based on a histogram showing the distribution of the pixel values of a SUM image (target SUM image).

The luminance processing unit 163 performs processing to adjust the luminance when a three-dimensional image (for example, the SUM image) is displayed. Information (luminance information) related to luminance may include information of at least one of WW and WL (hereinafter, also simply referred to as WW/WL). The degree of freedom of the adjustment when adjusting both the WW and the WL is higher than the degree of freedom when adjusting either the WW or the WL. The WW indicates a width (range) of the pixel values of an image displayed by the display 130. The WL indicates a central value of the width of the pixel values of the image displayed by the display 130. The luminance information gives the luminance of the SUM image, for example.

Figure 5A:
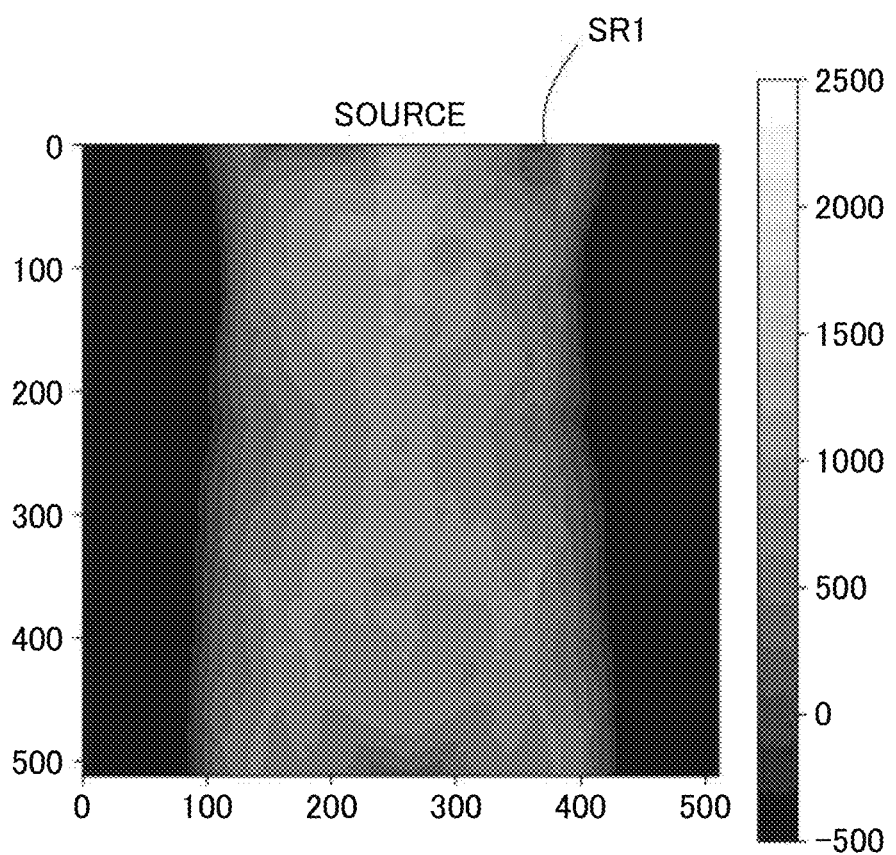
FIG. 5A is a diagram illustrating an original SUM image in a first generating example.
Figure 5B:
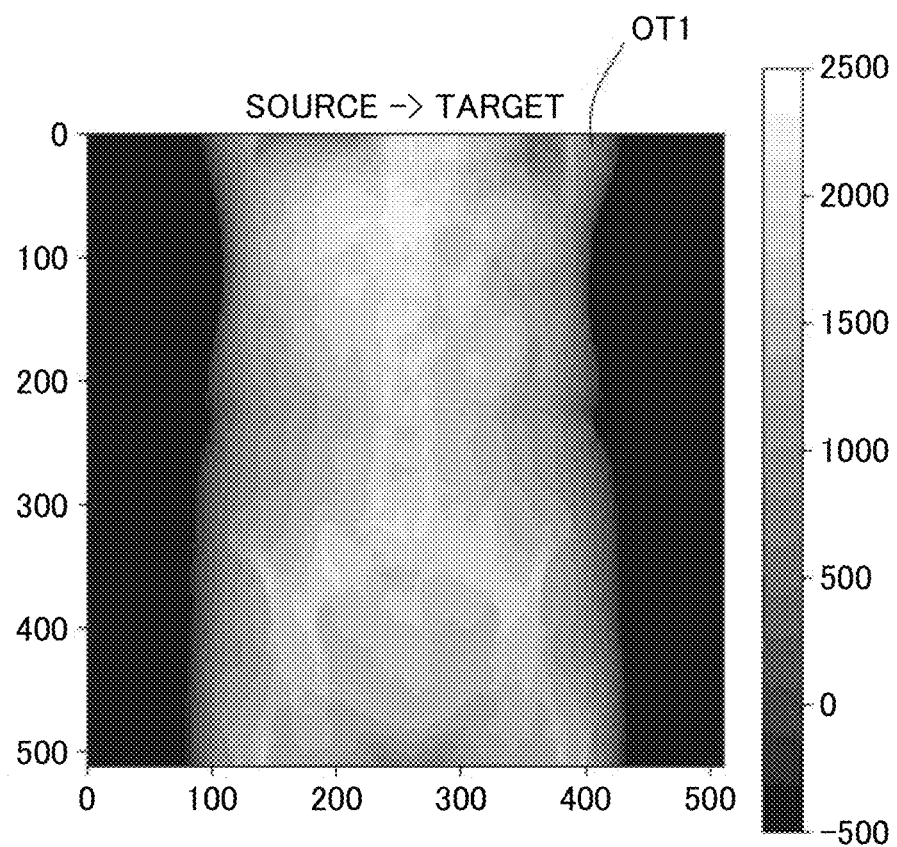
FIG. 5B is a diagram illustrating an output SUM image in the first generating example.
Figure 5C:
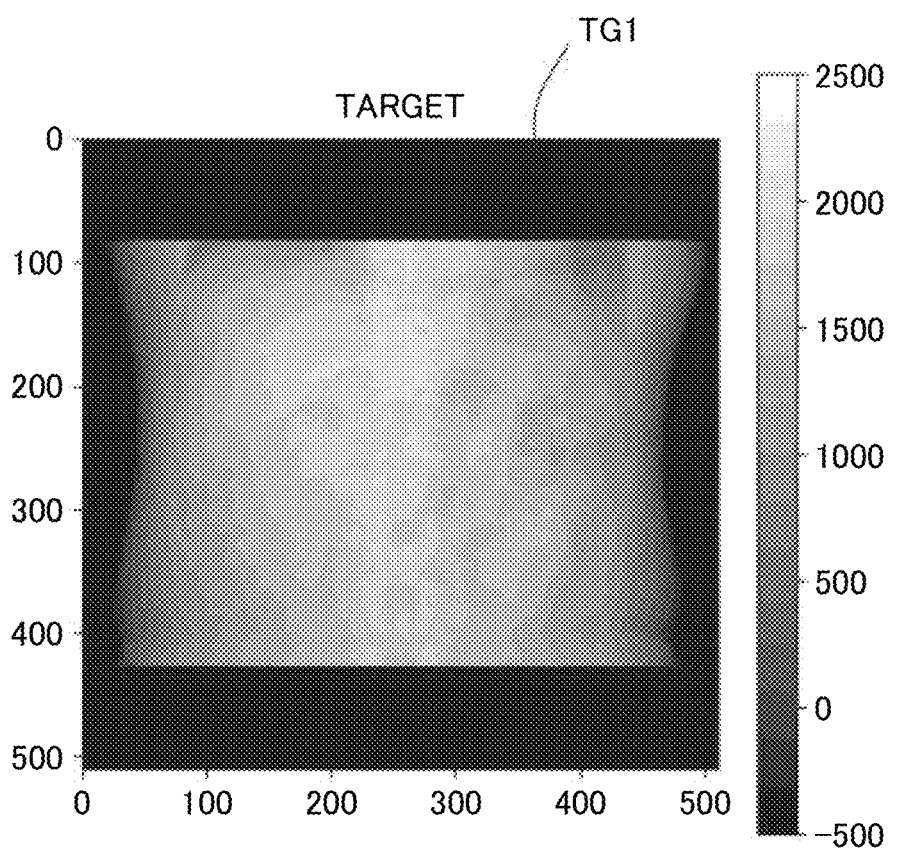
FIG. 5C is a diagram illustrating a target SUM image in the first generating example.
Figure 5D:
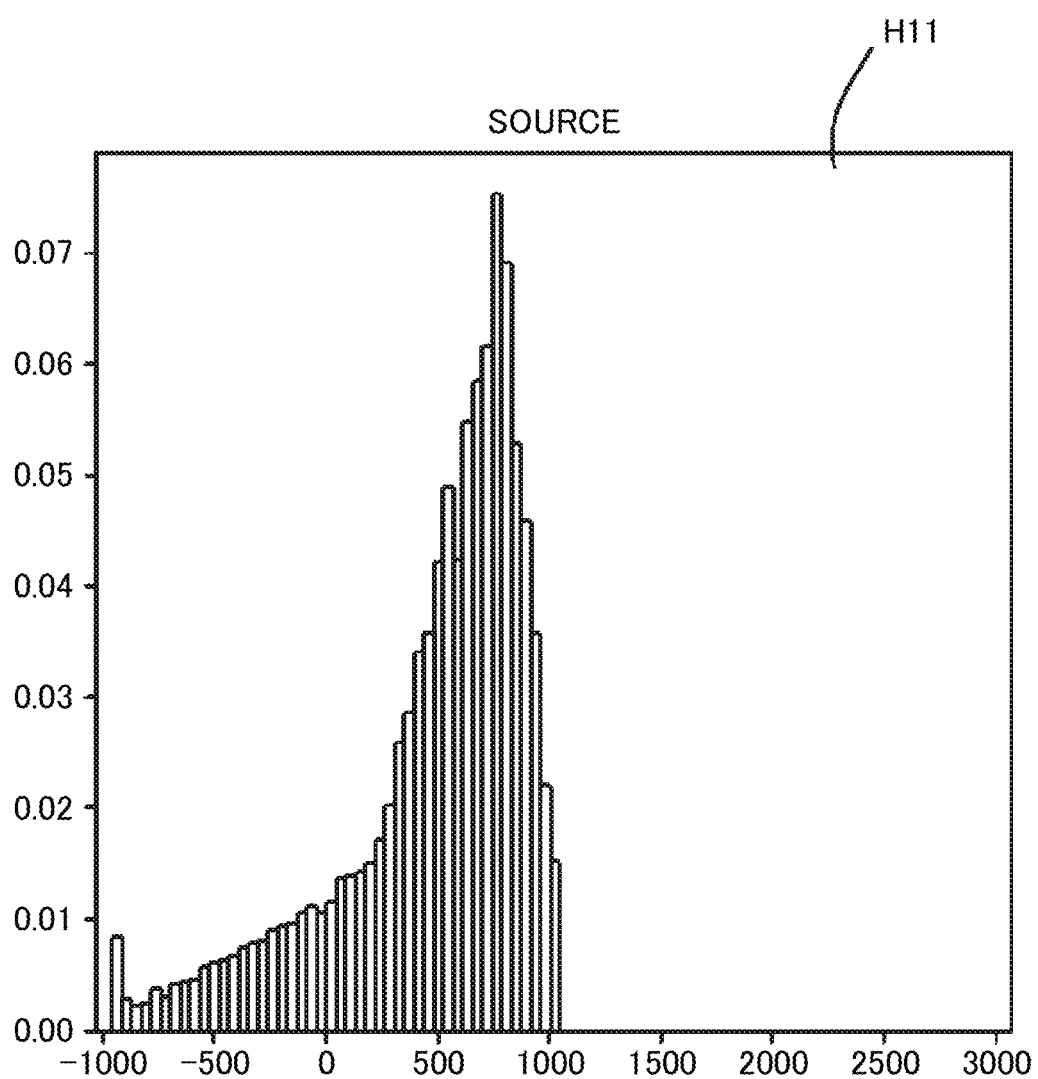
FIG. 5D is a diagram illustrating an original histogram related to the original SUM image in the first generating example.
Figure 5E:
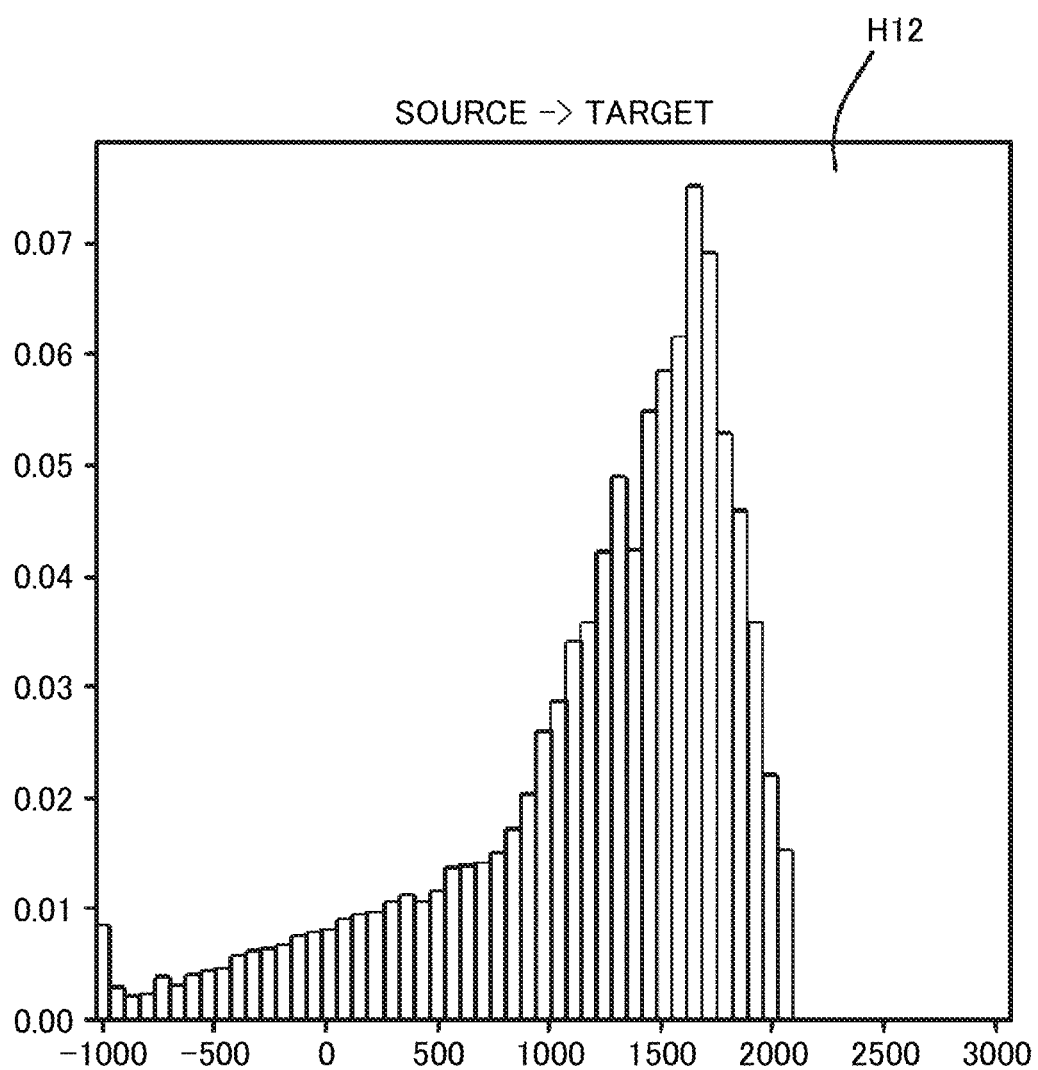
FIG. 5E is a diagram illustrating an output histogram related to the output SUM image in the first generating example.
Figure 5F:
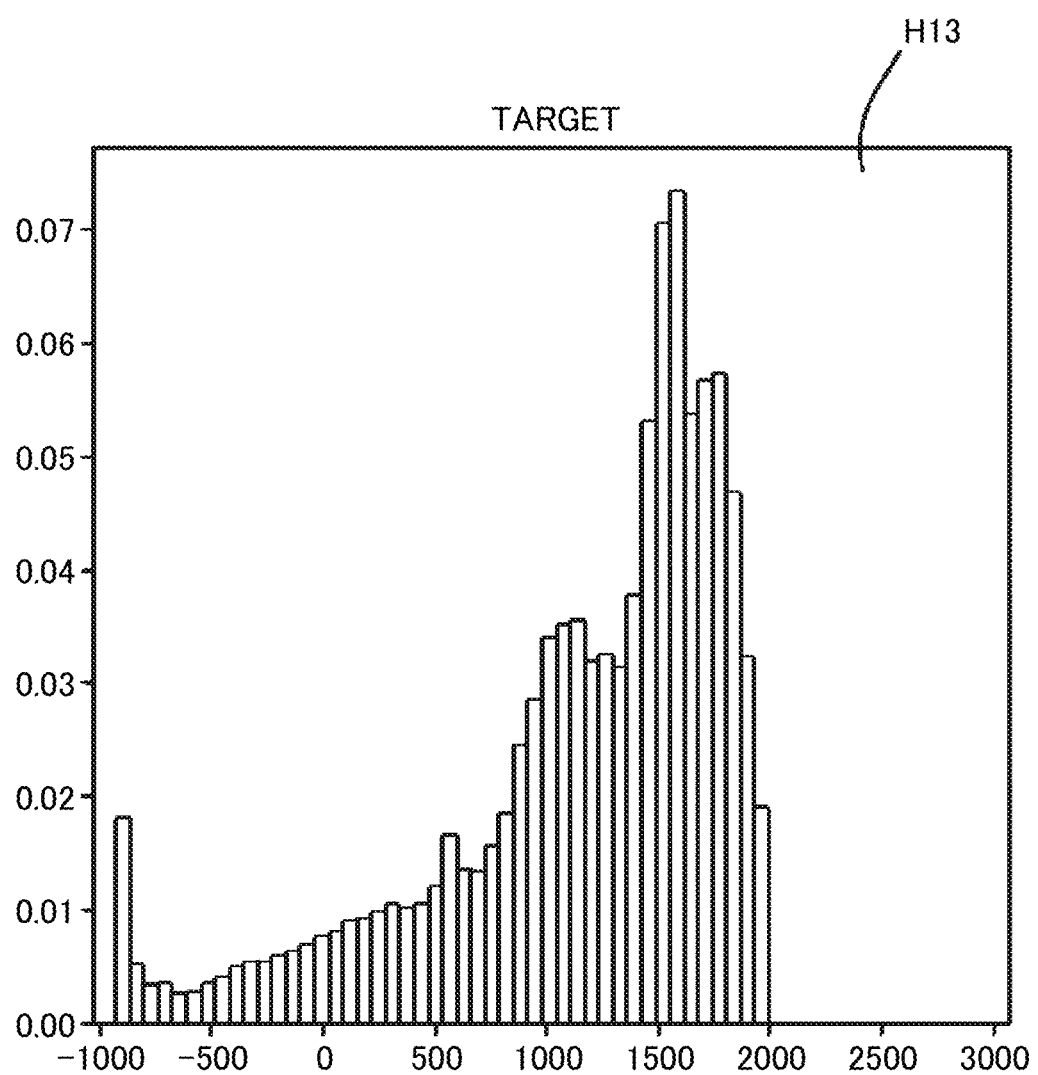
FIG. 5F is a diagram illustrating a target histogram related to the target SUM image in the first generating example.

The histogram processing unit 164 generates a histogram for adjusting the luminance (pixel value) of the volume data or the three-dimensional image (for example, FIGS. 5D, 5E, and 5F). The histogram shows a pixel value of each pixel in a three-dimensional image (that is, display image) when displaying the three-dimensional image (for example, the SUM image) and a frequency of each pixel value in the three-dimensional image. The histogram is used to adjust the luminance of the original SUM image and aids in generation of the SUM image for output.

The histogram processing unit 164 may derive (for example, calculate) the degree of difference between the histogram of the original SUM image and the histogram of the target SUM image. For example, the histogram processing unit 164 may generate a graph (for example, see FIGS. 5G and 7G) showing a correspondence relation between a scale ratio (for example, a scale value to be described later) or an amount of shift (for example, a shift value to be described later) in a pixel value direction of the histogram of the original SUM image and the degree of difference.

The recording control unit 165 records various kinds of data or information in the memory 150, and stores the various data or the information in the memory 150. The recording control unit 165 may cause the memory 150 to store, for example, the three-dimensional image, the luminance information, the information of the histogram.

The display control unit 166 causes the display 130 to display various data, information, and images. The display control unit 166 may cause to display the image (for example, a three-dimensional image and a SUM image) generated by the image generation unit 162. The display control unit 166 may cause to display a SUM image luminance-controlled by the luminance processing unit 163. The display control unit 166 may cause to display histogram and luminance relationship information generated by the histogram processing unit.

Next, the SUM image of the present embodiment will be described.

The SUM image can be calculated by adding voxels along virtual ray. Therefore, the SUM image can be computed at a high speed compared with an image on which complicated arithmetic processing is performed. In addition, the SUM image is an image close to angiography or a projectional radiography. That is, the SUM image may be used for pulmonary diagnosis like the projectional radiography, and may be used in simulation of interventional radiology (IVR) or preoperative preparation like the angiography. In addition, the SUM image may be used for a cone beam CT volume data output from an angiography apparatus.

The image generation unit 162 may apply 2D filter processing (for example, using a laplacian filter or a gradient filter) after 2D image as the SUM image is generated. Since the SUM image is based on addition of voxel values, the SUM image is likely to be an ambiguous image. However, accordingly, the medical image processing apparatus 100 can adjust a contour of the SUM image by the 2D filter processing.

The image generation unit 162 may perform offset based on a CT value of air to set the voxel value in a state of no negative value, and then add each voxel value of each voxel on the virtual ray to generate the SUM image. That is, +1000 is added to a value of −1000 which is the CT value of air, and the CT value of air is set to 0. Accordingly, the state is set to the state of no negative value.

When using magnetic resonance imaging (MRI) or positron emission tomography (PET) apparatus instead of the CT apparatus 200, there is no negative value as the voxel value. Therefore, the above-described preparation operation for setting the voxel value to the state of no negative value becomes unnecessary. Therefore, the voxel value is simply added to be the pixel value of the SUM image.

Next, an operation of the medical image processing apparatus 100 will be described.

The image generation unit 162 generates a SUM image (past SUM image) based on WW/WL (past WW/WL) set for volume data (past volume data) acquired in the past (previous time or before the previous time). The histogram processing unit 164 analyzes the pixel value in the past SUM image and generates a histogram (past histogram) of the past SUM image.

In a SUM image (new SUM image) generated based on new (current) volume data (new volume data), the luminance processing unit 163 adjusts the luminance information (new WW/WL) of the new SUM image so that the histogram (new histogram) of the new SUM image is similar to the past histogram.

Accordingly, the past SUM image is a target image for specifying the luminance of the new SUM image. Therefore, the past SUM image is also referred to as the "target SUM image (TARGET)". Similarly, the past histogram is also referred to as a target histogram. The past WW/WL is also referred to as a target WW/WL.

In this case, the image generation unit 162 generates a new SUM image, which has been subjected to a predetermined (original, for example, initial) luminance control, as an "original SUM image (SOURCE)" based on the new (current) volume data. The WW/WL related to the original luminance control is also referred to as original WW/WL. The histogram processing unit 164 may process the histogram of the original SUM image (also referred to as "original histogram") so that the original histogram is similar to the target histogram and generate a new histogram (also referred to as an "output histogram"). The WW/WL related to the luminance control based on the output histogram is also referred to as an output WW/WL.

The processing of the SUM image may include scale processing (also simply referred to as scale) and shift processing (also simply referred to as shift). The scale processing refers to enlarging (magnifying) processing of the original histogram in a pixel value direction (for example, the horizontal direction in FIG. 5D) and corresponds to WW conversion. The shift processing refers to translating processing of the original histogram in the pixel value direction, and corresponds to WL conversion. The SUM image related to the output histogram, that is, the SUM image expressed based on the pixel value indicated by the output histogram and the frequency of the pixel value are also referred to as an "output SUM image (OUTPUT)".

Figure 3:
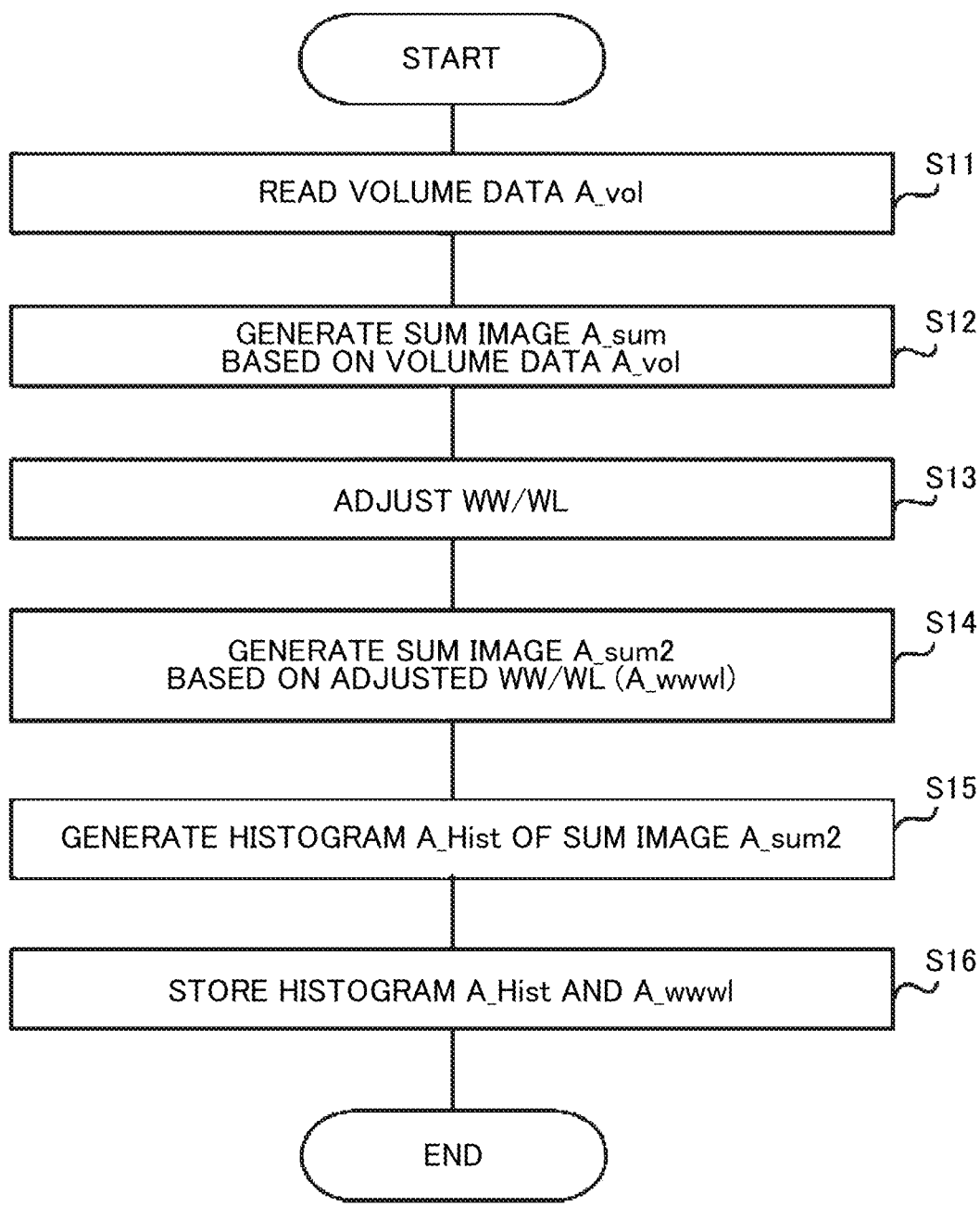
FIG. 3 is a flowchart illustrating an operation example related to a generation of a histogram of a SUM image.

FIG. 3 is a flowchart illustrating an operation example related to the generation of the histogram (target histogram) of the SUM image by the medical image processing apparatus 100.

First, the port 110 acquires volume data A_vol (corresponding to the past volume data) including the subject from the CT apparatus 200 or the like (S11).

The image generation unit 162 generates a SUM image A_sum based on the volume data A_vol (S12).

The UI 120 as an example of the operation unit receives a user operation and inputs WW/WL (at least one of WW and WL). The luminance processing unit 163 acquires WW/WL information from the UI 120 and adjusts the WW/WL (S13).

The image generation unit 162 generates a new SUM image A_sum2 (corresponding to the target SUM image) based on the volume data A_vol by using the adjusted WW/WL (also referred to as A_wwwl) (corresponding to the target WW/WL) (S14).

The histogram processing unit 164 generates a histogram A_Hist (corresponding to the target histogram) of the SUM image A_sum2 (S15). The recording control unit 165 records the histogram A_Hist and the adjusted WW/WL information in the memory 150 (S16).

According to the operation of FIG. 3, the medical image processing apparatus 100 can adjust the luminance (for example, the WW/WL) of the SUM image manually (for example, via the UI 120) so that the image looks like the user desires. The medical image processing apparatus 100 can store the adjusted luminance information in the memory 150 or the like. Accordingly, the medical image processing apparatus 100 can acquire the luminance information adjusted in the past from the memory 150, perform the luminance control of the SUM image to be generated later using this luminance information, and generate a SUM image so as to look like as the sum image in the past.

Figure 4:
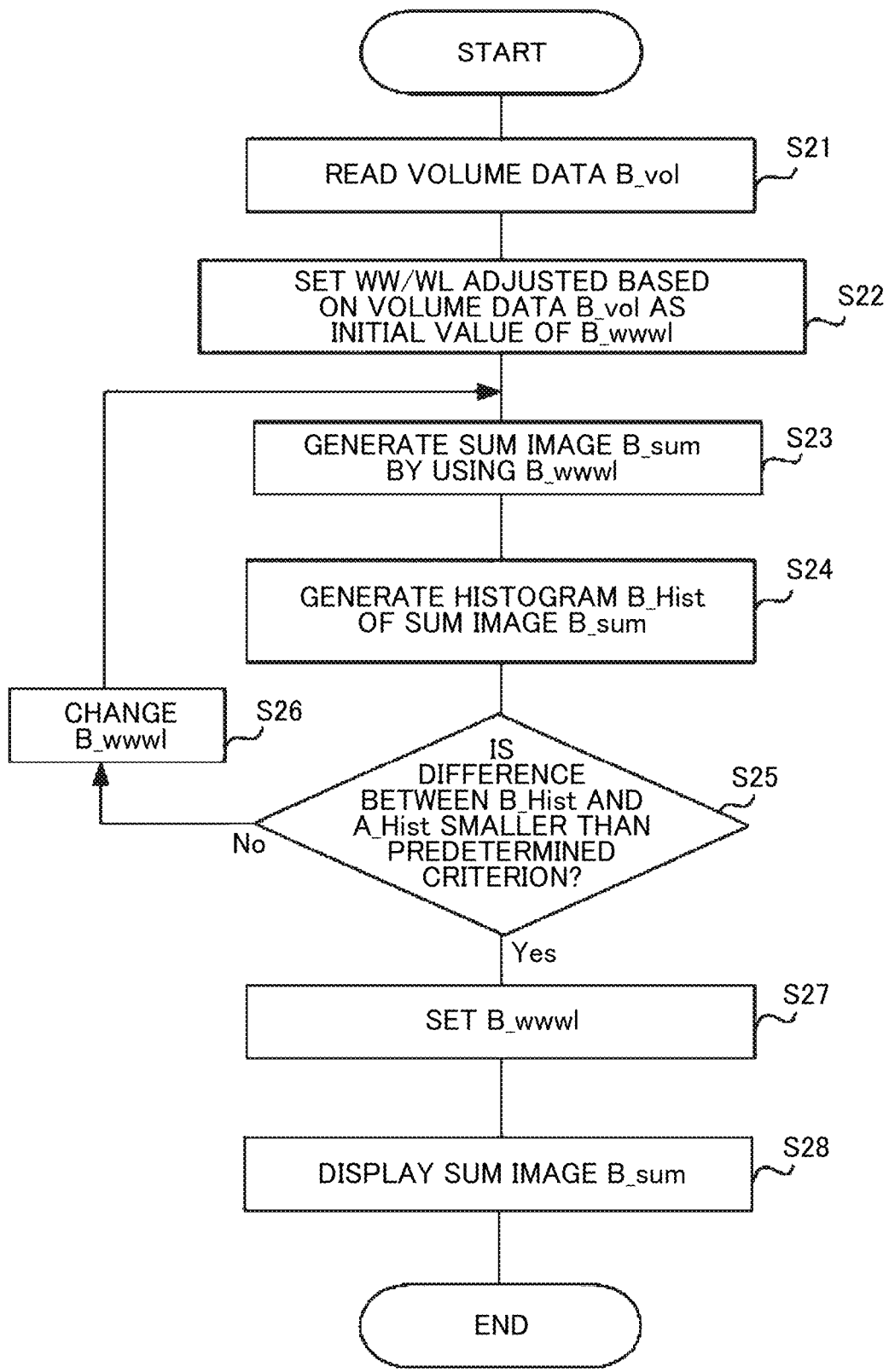
FIG. 4 is a flowchart illustrating an operation example related to a luminance control using a histogram, performed by a medical image processing apparatus 100.

FIG. 4 is a flowchart illustrating an operation example related to adjustment using the histogram (target histogram), performed by the medical image processing apparatus 100.

First, the port 110 acquires new volume data B_vol (corresponding to new volume data) including the subject from the CT apparatus 200 or the like (S21).

The luminance processing unit 163 sets the WW/WL (A_wwwl) used for the luminance control of the volume data A_vol as an initial value of WW/WL (B_wwwl) used for the luminance control of the volume data B_vol (S22). As the initial value of B_wwwl, other values may be used, for example, a preset value of WW/WL may be used. Information of the preset may be stored in the memory 150.

The image generation unit 162 generates a new SUM image B_sum (corresponding to an original SUM image) based on the volume data B_vol by using the set B_wwwl (corresponding to the original WW/WL) (S23).

The histogram processing unit 164 generates a histogram B_Hist (corresponding to the original histogram) of the SUM image B_sum (S24).

The histogram processing unit 164 determines whether or not the difference between the histogram B_Hist and the histogram A_Hist is smaller than a predetermined criterion (for example, the difference ε used for an end condition of an iterative calculation is smaller than a predetermined value) (S25).

When the difference between the histogram B_Hist and the histogram A_Hist is equal to or larger than the predetermined criterion, the luminance processing unit 163 sets a changed B_wwwwl based on the difference between the histogram B_Hist and the histogram A_Hist (S26). Then, the process proceeds to S23. The luminance processing unit 163 may adjust B_wwwl, for example, according to Newton's method, steepest descent method, or least squares method. For example, the luminance processing unit 163 may calculate B_wwwl according to the least squares method when changing the scale value, and may calculate B_wwwl according to the steepest descent method when changing the scale value and the shift value.

On the other hand, when the difference between the histogram B_Hist (corresponding to the output histogram) and the histogram A_Hist is smaller than the predetermined criterion, the luminance processing unit 163 may set B_wwwl (corresponding to the output WW/WL) (S27). The image generation unit 162 may generate the SUM image B_sum (corresponding to the output SUM image) which is luminance-controlled according to the set WW/WL. The display control unit 166 causes the display 130 to display the SUM image B-sum (S28).

Next, regarding processing of generating the output SUM image from the original SUM image based on the target SUM image, several generating examples will be exemplified in the following. This processing is also referred to as processing to generate the output histogram from the original histogram based on the target histogram.

The past volume data and the new volume data may be volume data of the same part (for example, the whole upper body) in the same subject. The past volume data and the new volume data may be volume data of different parts (for example, whole upper body and lungs) in the same subject.

The past volume data and the new volume data may be volume data of the same part in different subjects. The past volume data and the new volume data may be volume data of different parts in different subjects. In any of cases, there is not much difference in the generated histograms. Therefore, there is not much difference in a result of the luminance control. It is because the histogram is illustrated by the pixel value of the SUM image and the frequency of the pixel value, and does not include the information on a shape of the subject, the part of the subject, and the like.

In addition, in each generating example, the original histogram and the target histogram are compared, for example, according to a histogram intersection. The histogram processing unit 164 determines a degree of similarity between the original histogram and the target histogram, and processes (for example, scale processing, shift processing) the original histogram to increase the degree of similarity and generates the output histogram. A histogram intersection value (a value calculated by the histogram intersection) or a divergence value may be used as an index indicating the degree of similarity between the original histogram and the target histogram. The histogram intersection value takes a value from 0 to 1. In a case of a perfect match, the histogram intersection value is 1. On the other hand, the divergence value is a value obtained by subtracting the histogram intersection value from a value of 1. Accordingly, in case of the perfect match, the divergence value is value of 0. This is because the application of the steepest descent method or the least squares method is considered. As the divergence value is closer to 0, this shows that the degree of similarity between both histograms is high. As the divergence value is closer to 1, this shows that the degree of difference between both histograms is high. Also, coefficients of scale processing and shift processing of the histogram to increase the degree of similarity may be calculated according to the steepest descent method or the least squares method, for example.

First Generating Example

In a first generating example, as a target SUM image, one SUM image is generated from 271 slice images in volume data. It is also assumed that one SUM image is generated from 92 slice images in the volume data as the original SUM image and the output SUM image. The processing of the SUM image is assumed to be performed by scale processing. In addition, it is assumed that the target SUM image is an image including the lung region of the subject, and the original SUM image and the output SUM image are assumed as images including the whole upper body of the subject.

The larger the number of slice images, the larger the range of the volume data that the SUM image is generated from. In addition, if the number of slices is large, the pixel value does not necessarily increase, but depends on a condition of the range of the volume data to be generated by the SUM image (existence of normal cells, existence of cancer cells, range of bones, and the like). This is the same in other generating examples.

FIG. 5A is an example of an original SUM image SR1. FIG. 5B is an example of an output SUM image OT1. FIG. 5C is an example of a target SUM image TG1. FIG. 5D is an example of an original histogram H11 related to the original SUM image SR1. FIG. 5E is an example of an output histogram H12 related to the output SUM image OT1. FIG. 5F is an example of a target histogram H13 of the target SUM image TG1.

In FIGS. 5A to 5C, the horizontal axis and a vertical axis indicate coordinate values on two-dimensional coordinates in which the SUM image is expressed. In addition, a right scale bar in FIGS. 5A to 5C indicates the pixel value (−500 to 2500). In FIGS. 5E to 5F, the horizontal axis shows the pixel value of the SUM image, and the vertical axis shows a normalized frequency. These are the same in other generating examples.

Figure 5G:
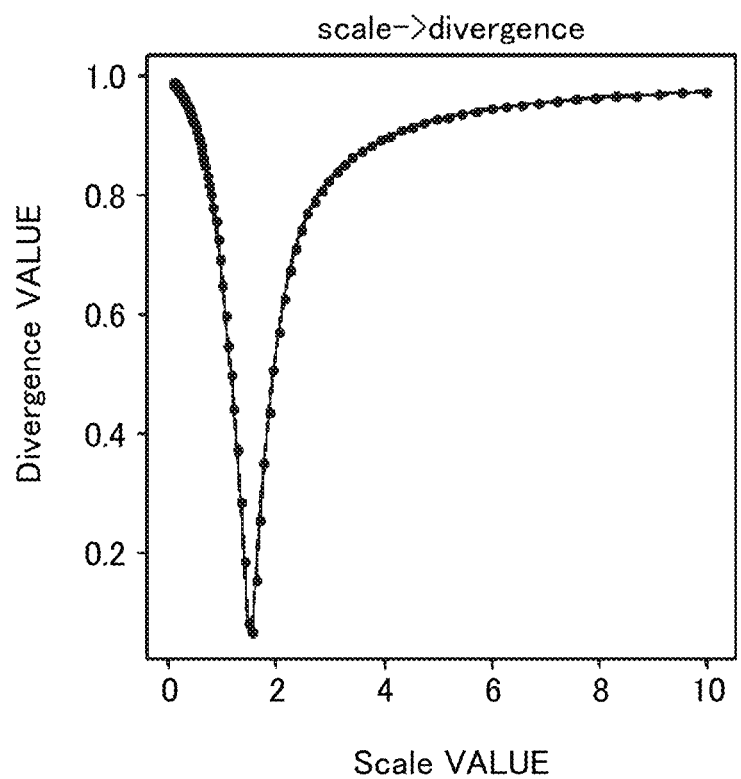
FIG. 5G is a diagram illustrating a relationship between a scale value and a divergence value in the first generating example.

FIG. 5G is a diagram illustrating a relationship between a scale value and a divergence value. In FIG. 5G, the horizontal axis represents the scale value, and the vertical axis of FIG. 5G represents the divergence value. The scale value is a value related to the scale processing, and indicates the enlargement amount (magnification amount) in an x-axis direction of the original histogram (for example, the horizontal direction in FIG. 5D). The divergence value indicates the degree of difference between the original histogram H11 (including a processed histogram obtained by enlarging the original histogram based on the scale value) and the target histogram H13. Therefore, this shows as the divergence value (degree of difference) is greater, the both histograms are different from each other. Therefore, when the degree of difference is large, the degree of similarity between both histograms is small, and appearance when the SUM image is displayed is different. This is the same in other generating examples.

In the first generating example, the histogram processing unit 164 compares the original histogram H11 and the target histogram H13, for example, according to the histogram intersection, and calculates the divergence value. Based on the original histogram H11 and the scale value, the histogram processing unit 164 multiplies the original histogram H11 and the scale value, for example, and enlarges the original histogram H11 in the x-axis direction (for example, the horizontal direction in FIG. 5D) to generate the processed histogram. The histogram processing unit 164 compares the processed histogram and the target histogram H13, for example, according to the histogram intersection, and calculates the divergence value. The degree of difference between each processed histogram based on each scale value and the target histogram H13 is shown as the divergence value for each scale value in FIG. 5G.

The luminance processing unit 163 calculates a WW value (an example of the output WW/WL) corresponding to a scale value (for example, a value of 1.8) at which the divergence value in FIG. 5G is equal to or less than a predetermined value (for example, a value of 0.3) (for example, the minimum value). The scale value and the WW value correspond one to one. For example, the scale value and the WW value are in a proportional relationship and may have linearity. In this case, the luminance processing unit 163 may multiply the scale value by a predetermined value α to calculate the WW value. In addition, the scale value may indicate the enlargement ratio for adjusting the original WW value. In this case, the luminance processing unit 163 may multiply the original WW value by the scale value to generate the WW value. The luminance processing unit 163 carries out the luminance control based on a derived WW value to the original SUM image SR1. The image generation unit 162 generates the output SUM image OT1 luminance-controlled by the luminance processing unit 163.

Each histogram in FIGS. 5D to 5F is normalized so as to be a predetermined value (for example, a value of 1) over the entire frequency. This is the same in other generating examples.

According to this first generating example, the medical image processing apparatus 100 carries out the scale processing to the original histogram H11 so that the divergence value between the original histogram H11 and the target histogram H13 is as small as possible. Accordingly, the output histogram H12 can be generated. Therefore, the medical image processing apparatus 100 can generate the output SUM image OT1 based on the original SUM image SR1. By using the divergence value, the appearance when the output SUM image OT1 is displayed becomes close to the appearance when the target SUM image TG1 is displayed. The luminance of the target SUM image TG1 is luminance adjusted as the user desires. Therefore, the medical image processing apparatus 100 can provide the output SUM image OT1 which is easy to see for the user by bringing the luminance balance of the output SUM image OT1 closer to the luminance balance of the target SUM image TG1. In addition, the luminance control performed by the user operation for adjusting the brightness at the time of displaying the original SUM image SR1 is unnecessary, and thus the convenience of the user when performing the luminance control on the original SUM image SR1 can be improved.

In the above, +1000 is added to the value of −1000 which is the CT value of air, the CT value of air is set to the value of 0, and a state is set to have no negative value. Instead of this, in FIGS. 5A to 5G, the range indicating only the air component in the SUM image may be excluded from the count of the frequency of the pixel value and may be excluded from the generation object of the histogram. This is the same in other generating examples. For example, since a region of which a pixel value is −1000 is a region of air, the histogram processing unit 164 may exclude a region of which a pixel value is equal to or less than a predetermined threshold value (for example, −800, −500, or −300) from the count of the frequency of the pixel value.

Second Generating Example

In a second generating example, as the target SUM image, one SUM image is generated from 92 slice images in the volume data. It is also assumed that one SUM image is generated from 271 slice images in the volume data as the original SUM image and the output SUM image. The processing of the SUM image is assumed to be performed by scale processing. In addition, it is assumed that the target SUM image is an image including the whole upper body of the subject, and the original SUM image and the output SUM image are images including the lung region of the subject. In the second generating example, descriptions on items or processing similar to those in the first generating example are omitted or simplified.

Figure 6A:
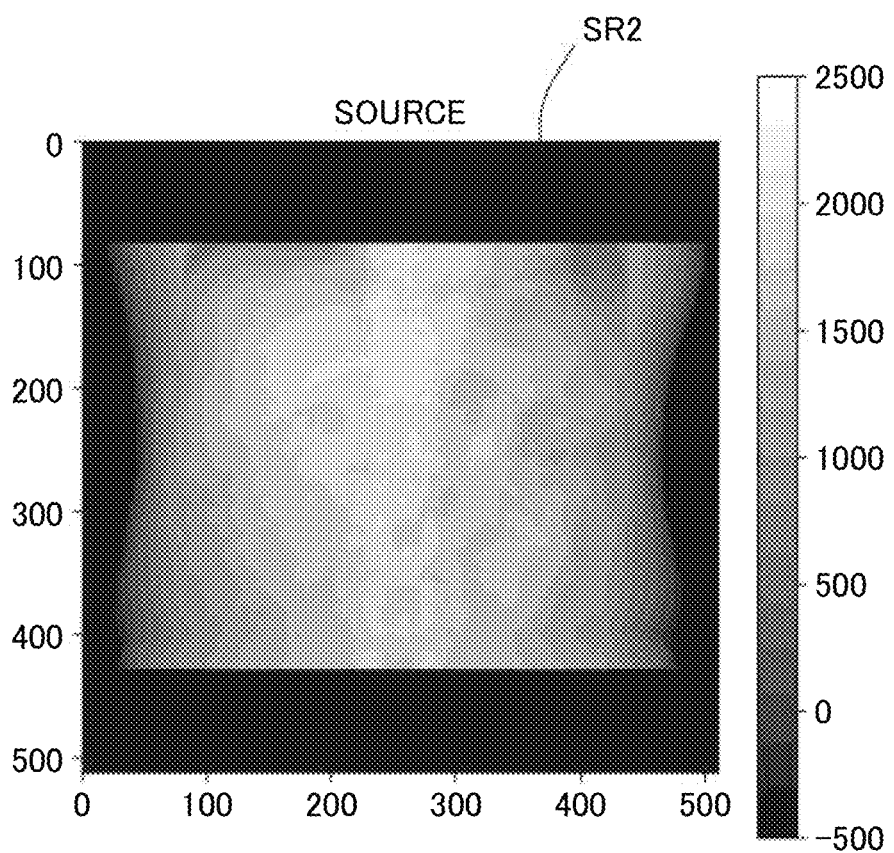
FIG. 6A is a diagram illustrating an original SUM image in a second generating example.
Figure 6B:
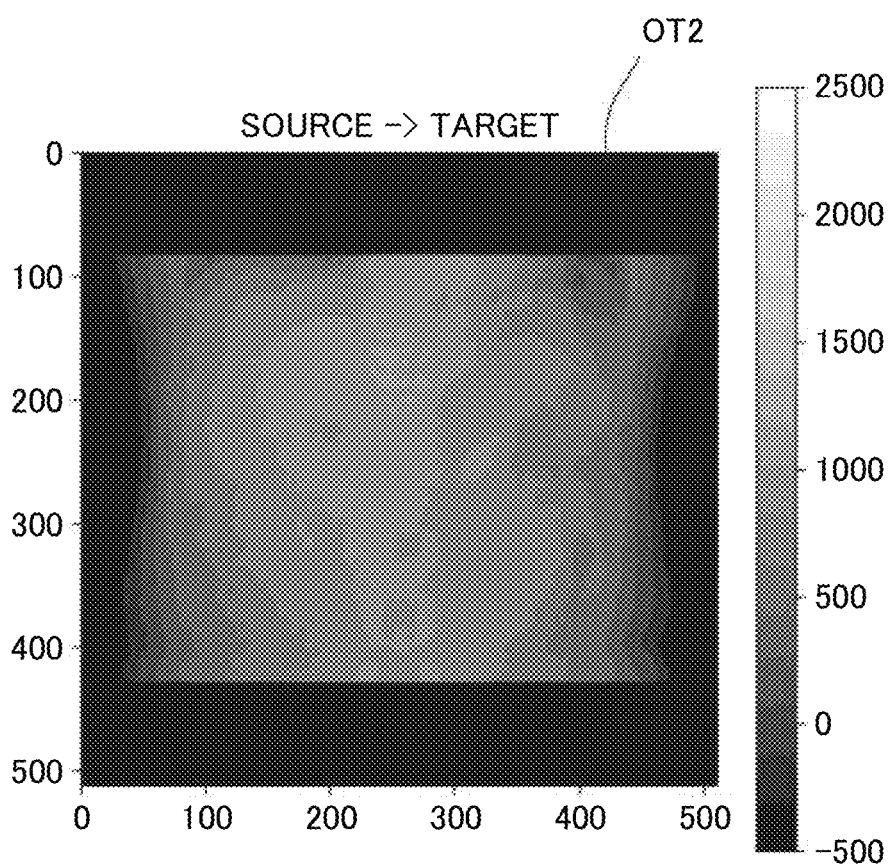
FIG. 6B is a diagram illustrating an output SUM image in the second generating example.
Figure 6C:
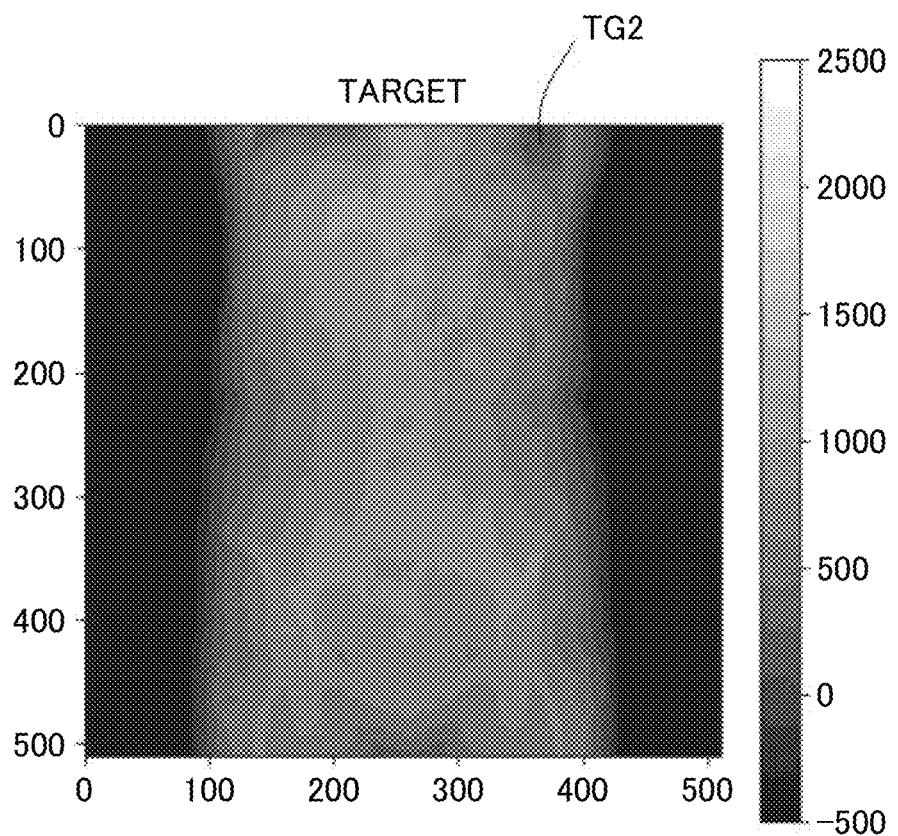
FIG. 6C is a diagram illustrating a target SUM image in the second generating example.
Figure 6D:
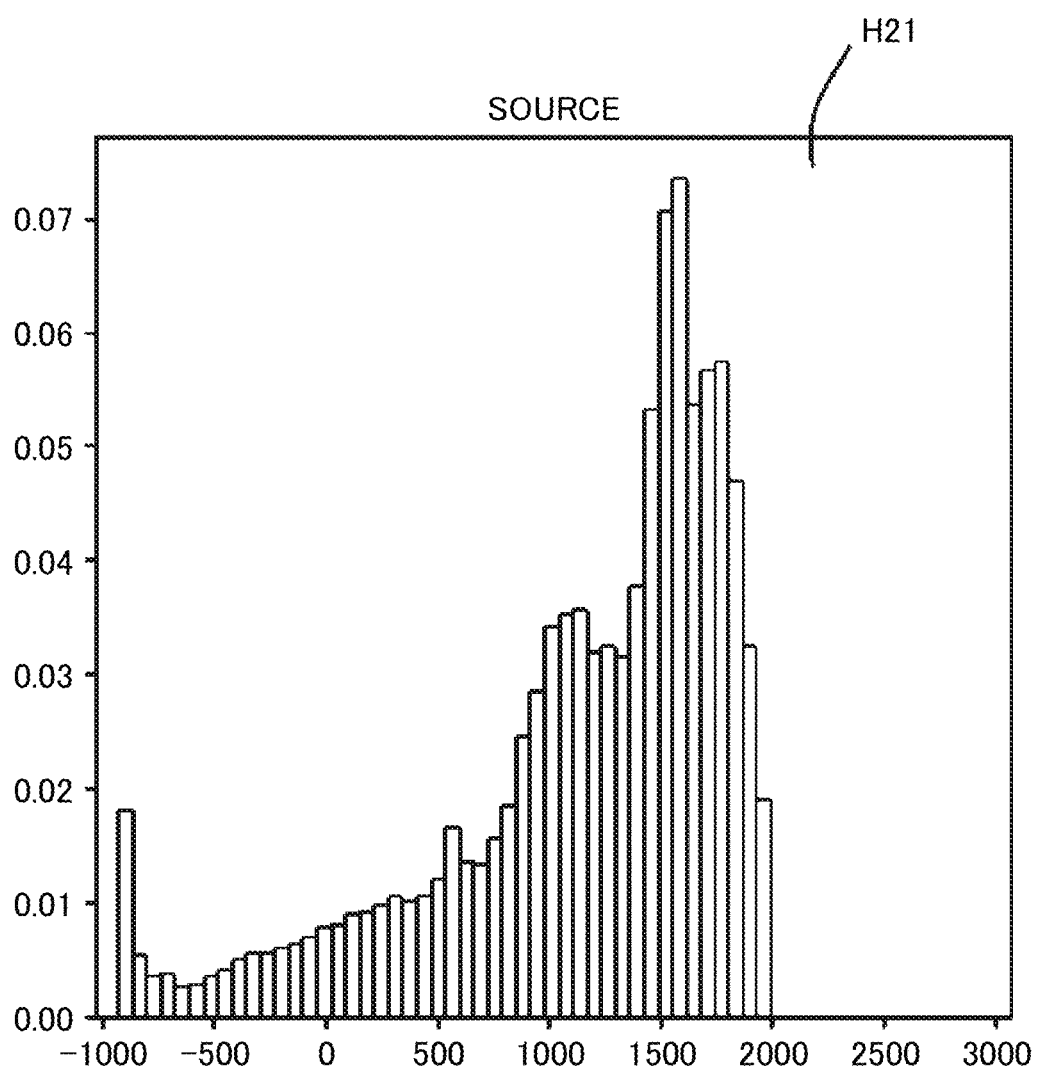
FIG. 6D is a diagram illustrating an original histogram related to the original SUM image in the second generating example.
Figure 6E:
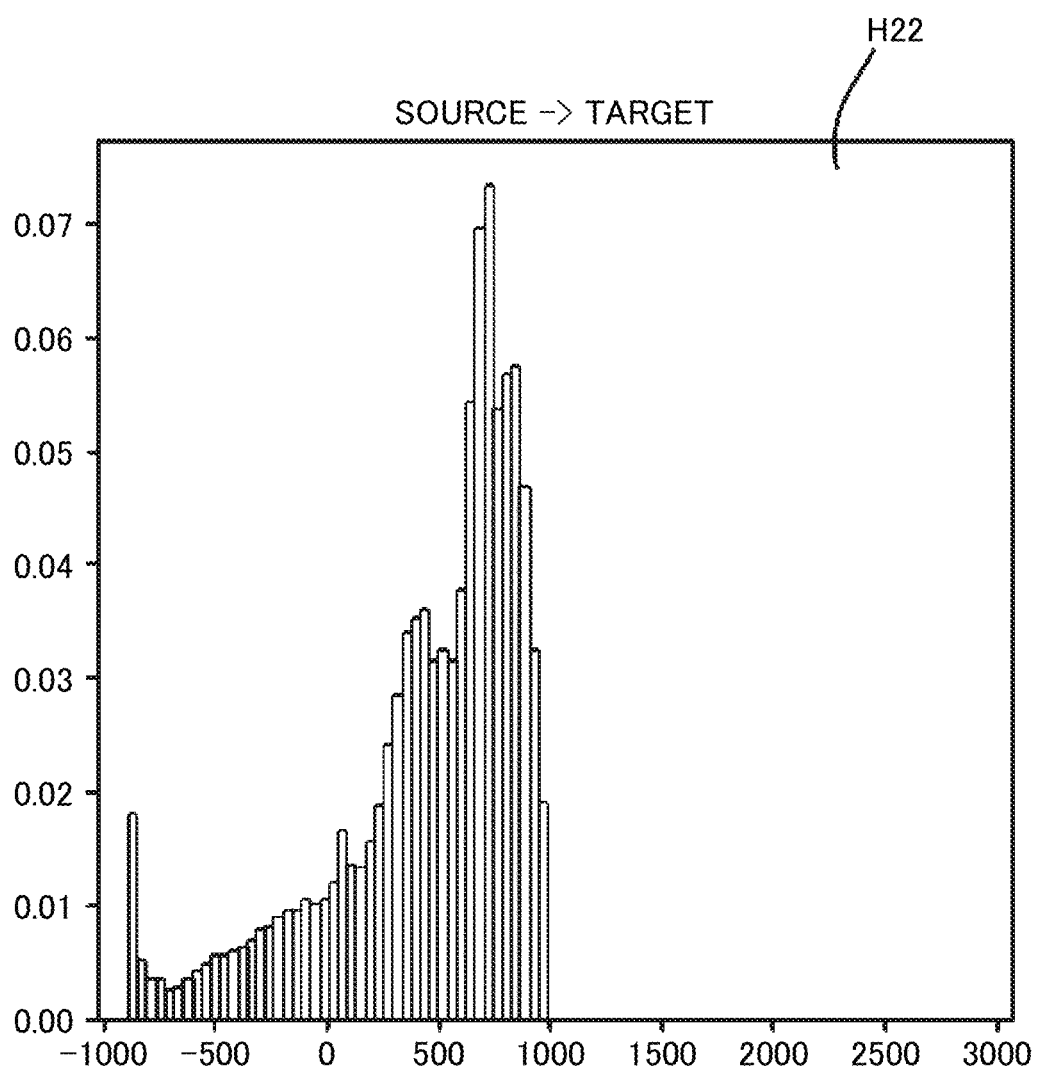
FIG. 6E is a diagram illustrating an output histogram related to the output SUM image in the second generating example.
Figure 6F:
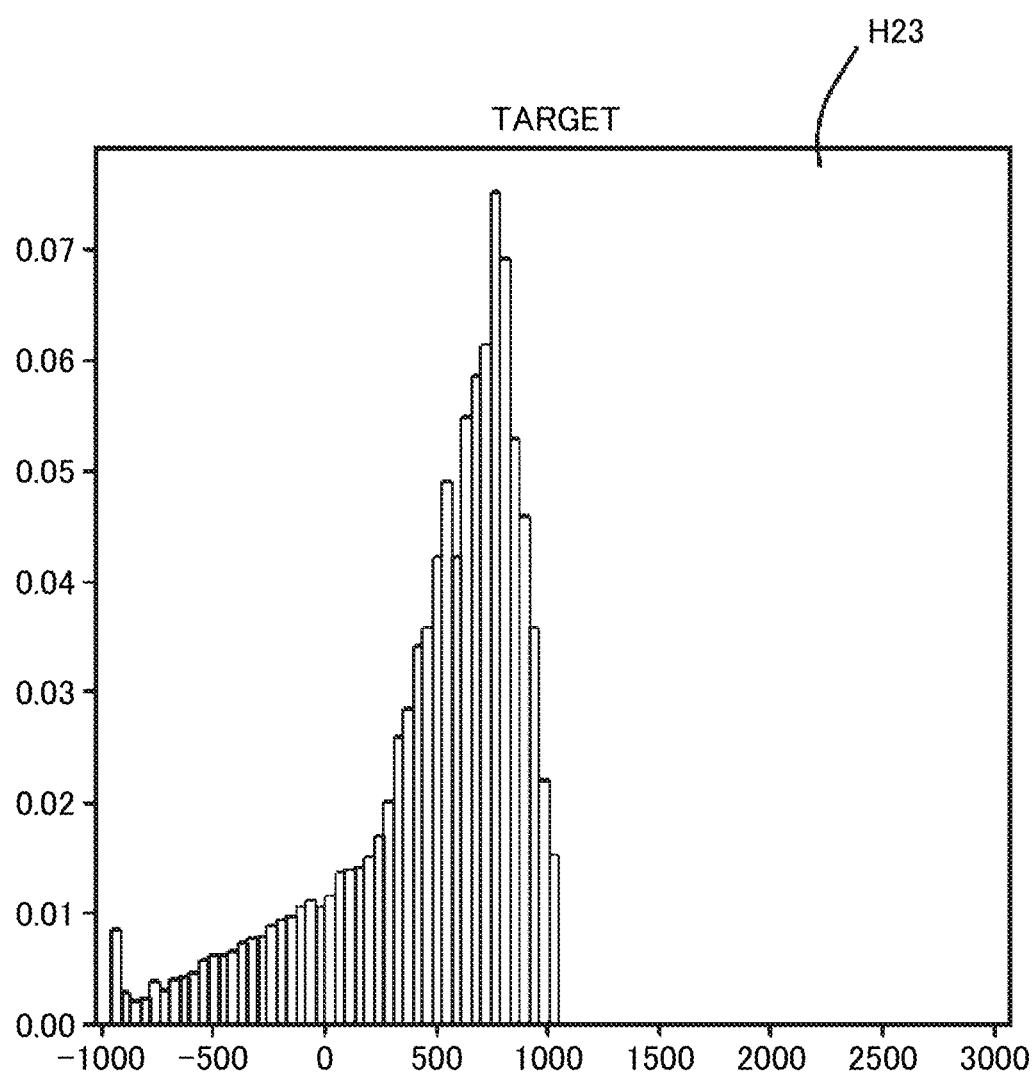
FIG. 6F is a diagram illustrating a target histogram related to the target SUM image in the second generating example.
Figure 6G:
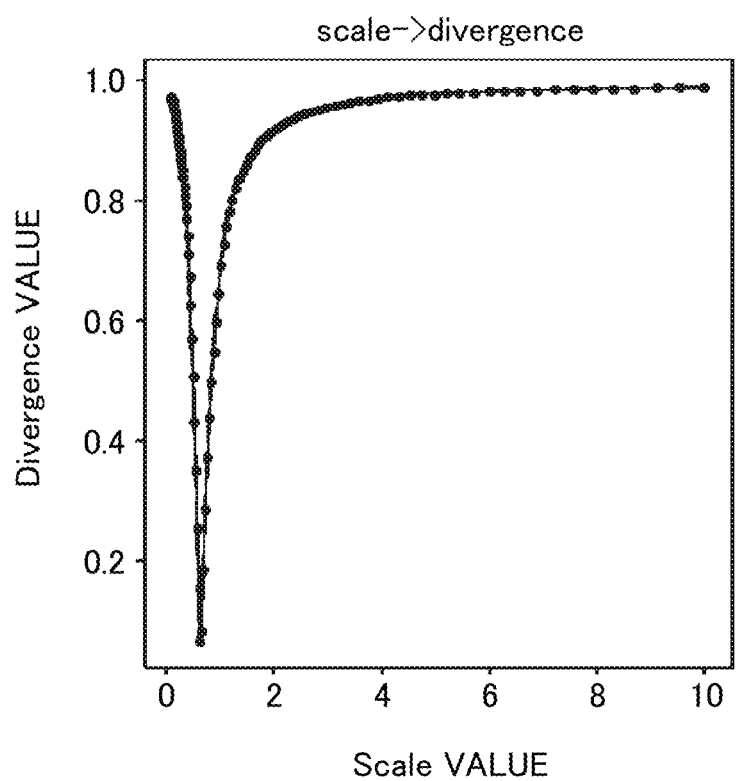
FIG. 6G is a diagram illustrating a relationship between a scale value and a divergence value in the second generating example.

FIG. 6A is an example of an original SUM image SR2. FIG. 6B is an example of an output SUM image OT2. FIG. 6C is an example of a target SUM image TG2. FIG. 6D is an example of an original histogram H21 related to the original SUM image SR2. FIG. 6E is an example of an output histogram H22 related to the output SUM image OT2. FIG. 6F is an example of a target histogram H23 of the target SUM image TG2. FIG. 6G is a diagram illustrating a relationship between a scale value and a divergence value.

In the second generating example, the histogram processing unit 164 compares the original histogram H21 and the target histogram H23, for example, according to the histogram intersection, and calculates the divergence value. Based on the original histogram H21 and the scale value, the histogram processing unit 164 multiplies the original histogram H21 and the scale value, for example, and enlarges (reduces in this case) the original histogram H21 in the x-axis direction (for example, the horizontal direction in FIG. 6D) to generate the processed histogram. The histogram processing unit 164 compares the processed histogram and the target histogram H23, for example, according to the histogram intersection, and calculates the divergence value. The degree of difference between each processed histogram based on each scale value and the target histogram H23 is shown as the divergence value for each scale value in FIG. 6G.

The luminance processing unit 163 calculates a WW value (an example of the output WW/WL) corresponding to the scale value (for example, a value of 0.7) at which the divergence value in FIG. 6G is equal to or less than a predetermined value (for example, a value of 0.3) (for example, the minimum value). The luminance processing unit 163 carries out the luminance control based on the derived WW value to the original SUM image SR2. The image generation unit 162 generates the output SUM image OT2 luminance-controlled by the luminance processing unit 163.

According to this second generating example, the medical image processing apparatus 100 carries out the scale processing to the original histogram H21 so that the divergence value between the original histogram H21 and the target histogram H23 is as small as possible. Accordingly, the output histogram H22 can be generated. Therefore, the medical image processing apparatus 100 can generate the output SUM image OT2 based on the original SUM image SR2. Accordingly, the medical image processing apparatus 100 can obtain the same effect as the first generating example.

Third Generating Example

In a third generating example, as the target SUM image, one SUM image is generated from 271 slice images in the volume data. It is also assumed that one SUM image is generated from 92 slice images in the volume data as the original SUM image and the output SUM image. In addition, the processing of the SUM image is assumed to be performed by the scale processing or shift processing. In addition, it is assumed that the target SUM image is an image of the lung region of the subject, and the original SUM image and the output SUM image are images including the whole upper body of the subject. In the third generating example, descriptions on items or processing similar to those in the first generating example or the second generating example are omitted or simplified.

Figure 7A:
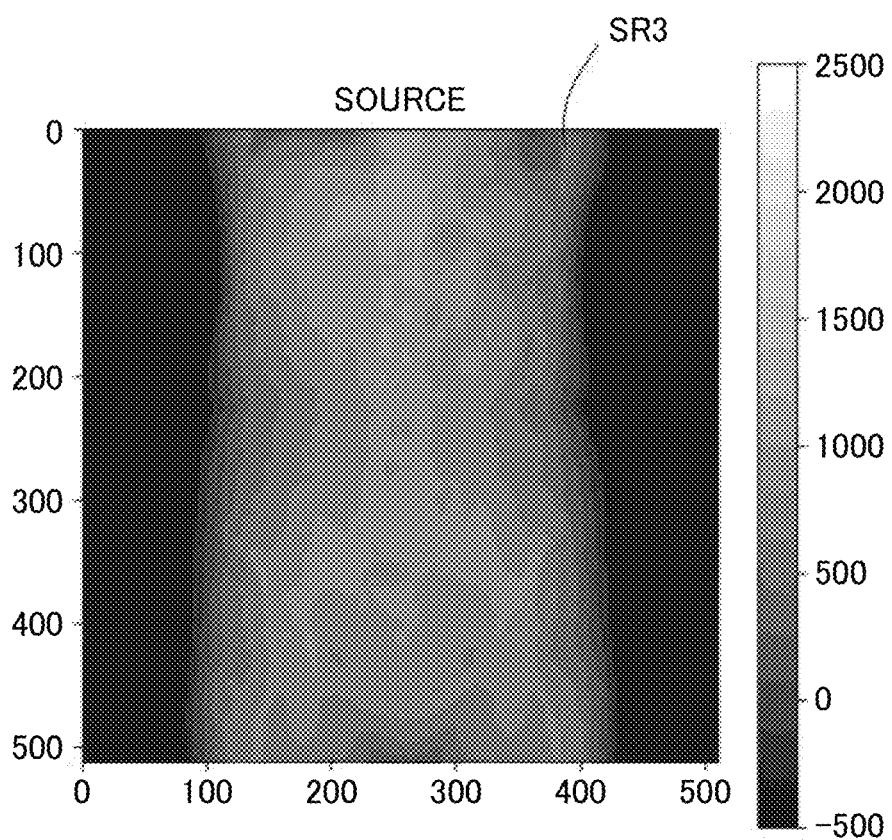
FIG. 7A is a diagram illustrating an original SUM image in a third generating example.
Figure 7B:
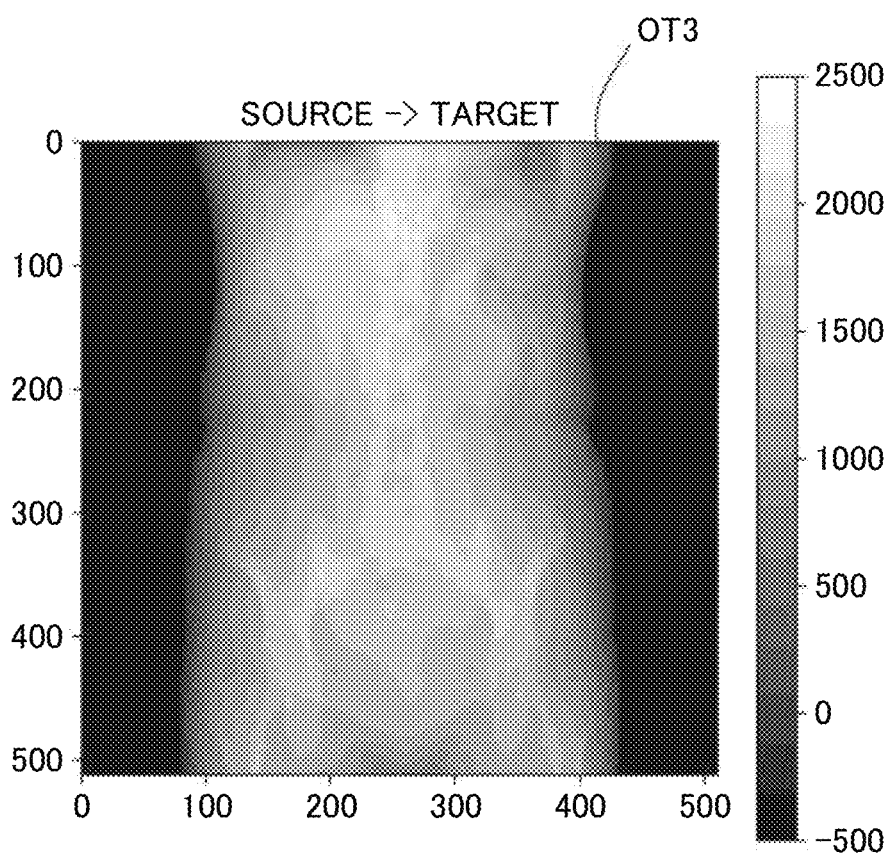
FIG. 7B is a diagram illustrating an output SUM image in the third generating example.
Figure 7C:
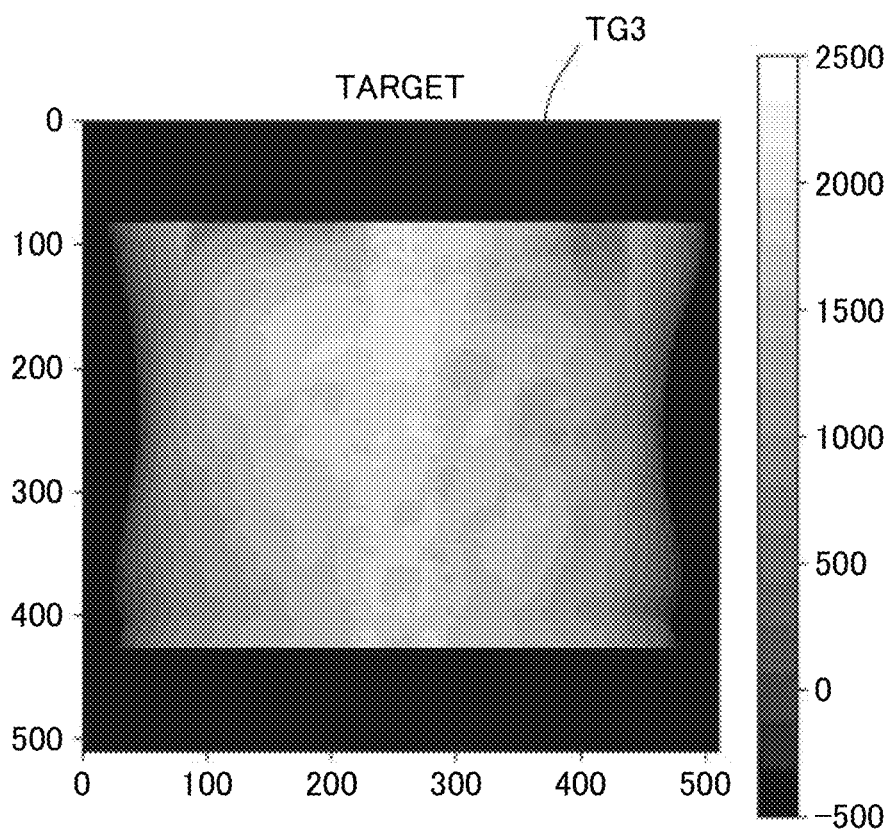
FIG. 7C is a diagram illustrating a target SUM image in the third generating example.
Figure 7D:
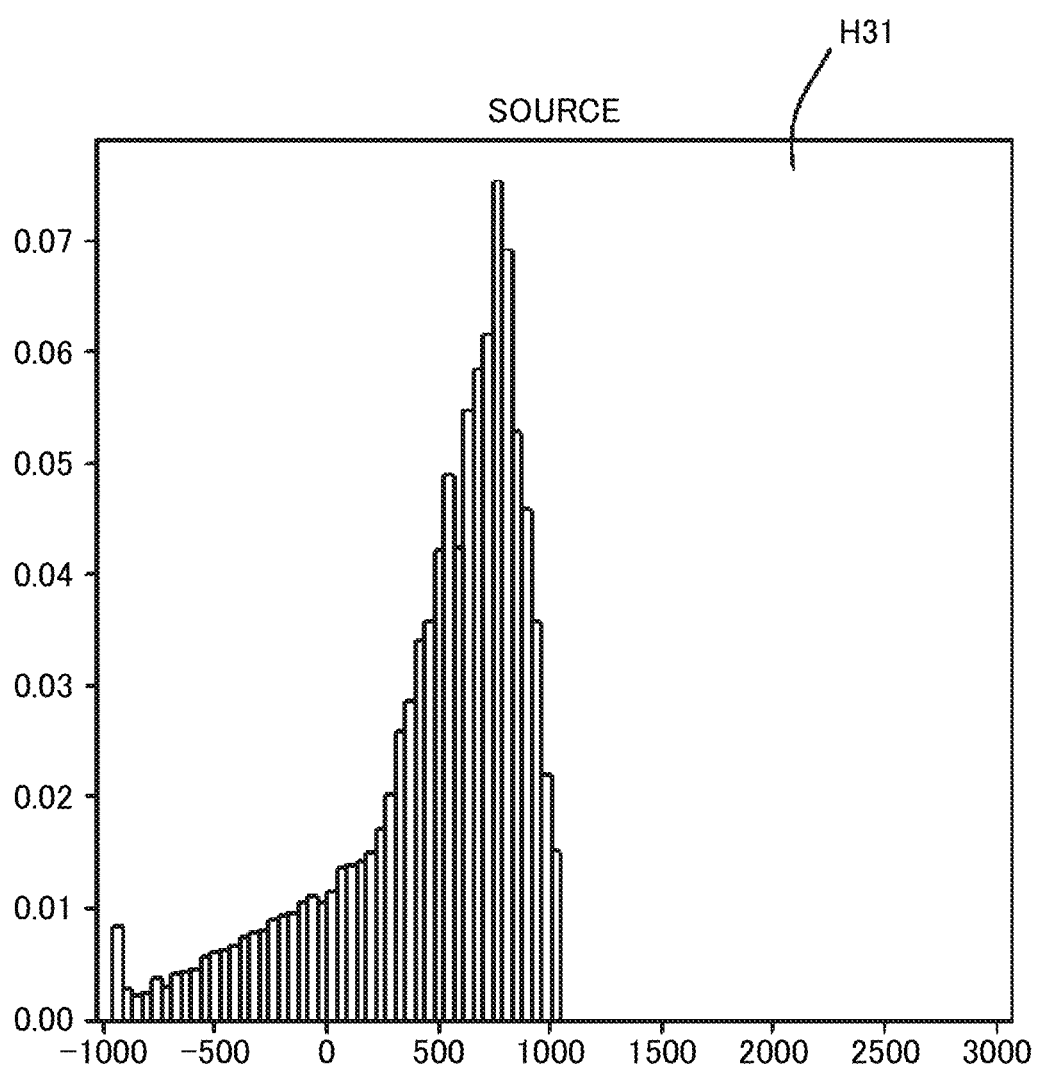
FIG. 7D is a diagram illustrating an original histogram related to the original SUM image in the third generating example.
Figure 7E:
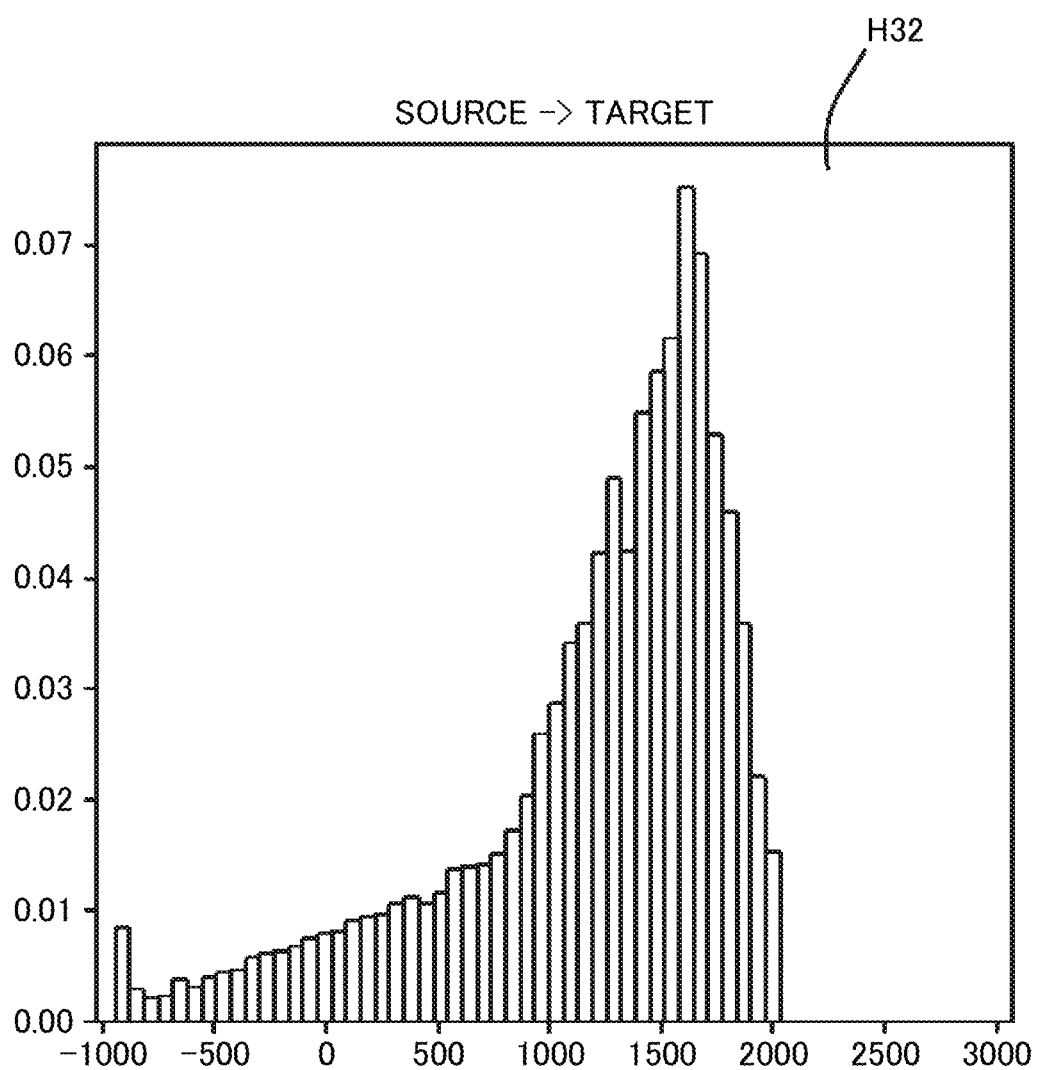
FIG. 7E is a diagram illustrating an output histogram related to the output SUM image in the third generating example.
Figure 7F:
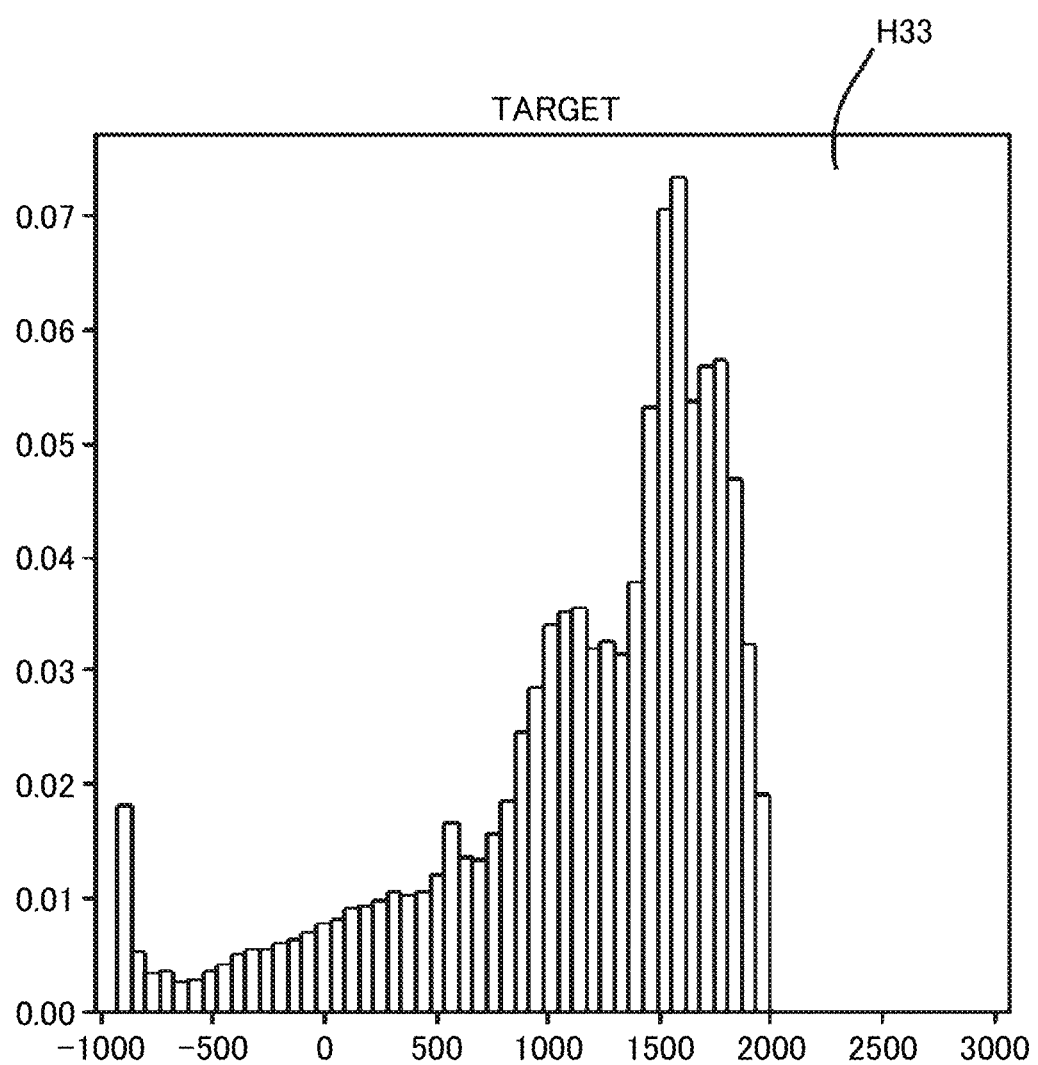
FIG. 7F is a diagram illustrating a target histogram related to the target SUM image in the third generating example.

FIG. 7A is an example of an original SUM image SR3. FIG. 7B is an example of an output SUM image OT3. FIG. 7C is an example of a target SUM image TG3. FIG. 7D is an example of an original histogram H31 related to the original SUM image SR3. FIG. 7E is an example of an output histogram H32 related to the output SUM image OT3. FIG. 7F is an example of a target histogram H33 of the target SUM image TG3.

Figure 7G:
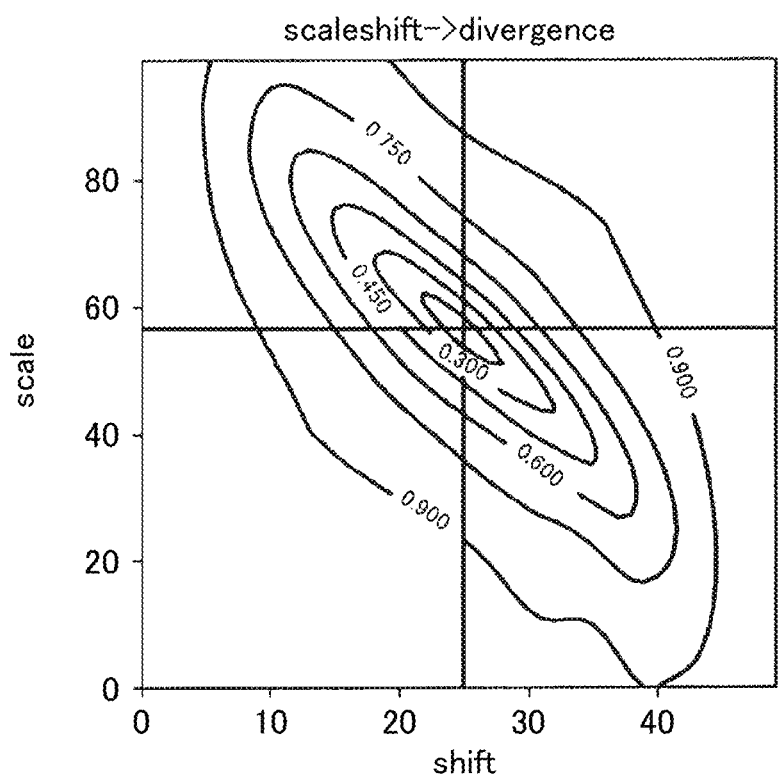
FIG. 7G is a diagram illustrating a relationship of a divergence value with a scale value and a shift value in the third generating example.

FIG. 7G is a diagram illustrating a relationship of a divergence value with a scale value and a shift value. The vertical axis of FIG. 7G represents the scale value, and the horizontal axis of FIG. 7G represents the shift value. The shift value is a value related to the shift processing, and indicates the extent of parallel translation in the x-axis direction of the original histogram (for example, the horizontal direction in FIG. 7D). In FIG. 7G, an intersection of the scale value on the vertical axis and the shift value on the horizontal axis indicates the divergence value corresponding to the scale value and the shift value. The divergence value indicates the degree of difference between the original histogram H31 (including the processed histogram obtained by enlarging and translating the original histogram based on the scale value and the shift value) and the target histogram H33.

In the third generating example, the histogram processing unit 164 compares the original histogram H31 and the target histogram H33, for example, according to the histogram intersection, and calculates the divergence value. Based on the original histogram H31 and the scale value and the shift value, the histogram processing unit 164 multiplies, for example, the original histogram H31 and the scale value and adds the shift value to the multiplication result to generate the processed histogram which is obtained by processing the original histogram H31 in the x-axis direction (for example, the horizontal direction in FIG. 7D). The histogram processing unit 164 compares the processed histogram and the target histogram H33, for example, according to the histogram intersection, and calculates the divergence value. The degree of difference between the target histogram H33 and each processed histogram based on each scale value and each shift value is shown on a two-dimensional plane, as the divergence value for each scale value and each shift value in FIG. 7G.

The luminance processing unit 163 calculates a WW value corresponding to the scale value (for example, a value of 56) and a WL value corresponding to the shift value (for example, a value of 25) both at which the divergence value in FIG. 7G is equal to or less than a predetermined value (for example, a value of 0.3) (for example, the minimum value). Each of the WW value and the WL value is an example of the output WW/WL. The scale value and the WW value correspond one to one and the shift value and the WL value correspond one to one. A derivation method of the WW value may be the same as the derivation method in the first generating example. In the derivation method of the WL value, for example, the shift value and the WL value are in a proportional relationship and may have linearity. In this case, the luminance processing unit 163 may multiply the shift value by a predetermined value β to calculate the WL value. In addition, the shift value may indicate the enlargement ratio for adjusting the original WL value. In this case, the luminance processing unit 163 may multiply the original WL value by the shift value to generate the WL value. The luminance processing unit 163 carries out the luminance control based on the derived WW value and WL value to the original SUM image SR3. The image generation unit 162 generates the output SUM image OT3 luminance-controlled by the luminance processing unit 163.

According to this third generating example, the medical image processing apparatus 100 carries out the scale processing and the shift processing to the original histogram H31 so that the divergence value between the original histogram H31 and the target histogram H33 is as small as possible. Accordingly, the output histogram H32 can be generated. Therefore, the medical image processing apparatus 100 can generate the output SUM image OT3 based on the original SUM image SR3. By using the divergence value, the appearance when the output SUM image OT3 is displayed becomes close to the appearance when the target SUM image TG3 is displayed. The luminance of the target SUM image TG3 is luminance adjusted as the user desires. Therefore, the medical image processing apparatus 100 can provide the output SUM image OT3 which is easy to see for the user by bringing the luminance balance of the output SUM image OT3 closer to the luminance balance of the target SUM image TG3. In addition, the medical image processing apparatus 100 can perform fine luminance control of WW/WL by carrying out the shift processing together with the scale processing to the original histogram H31, and can make the luminance control one step closer to the luminance control related to the target SUM image TG3.

Fourth Generating Example

In a fourth generating example, as the target SUM image, one SUM image is generated from 92 slice images in the volume data. It is also assumed that one SUM image is generated from 271 slice images in the volume data as the original SUM image and the output SUM image. In addition, it is assumed that the target SUM image is an image including the whole upper body of the subject, and the original SUM image and the output SUM image are images including the lung region of the subject. In addition, the processing of the SUM image is assumed to be performed by the scale processing or shift processing. In the fourth generating example, descriptions on items or processing similar to those in the first to third generating examples are omitted or simplified.

Figure 8A:
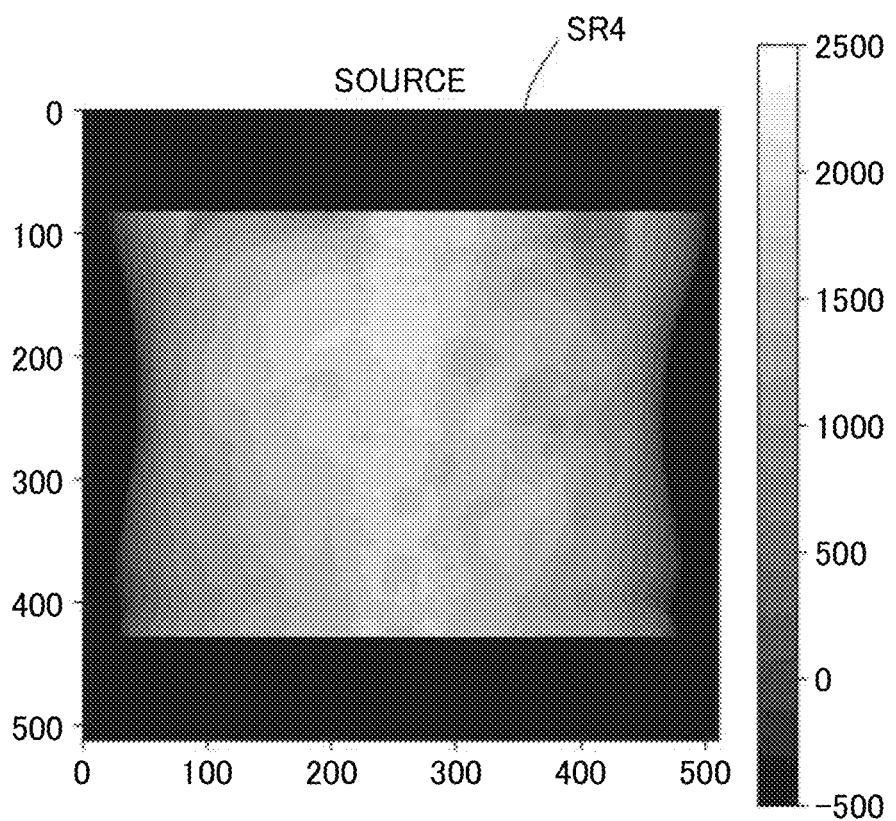
FIG. 8A is a diagram illustrating an original SUM image in a fourth generating example.
Figure 8B:
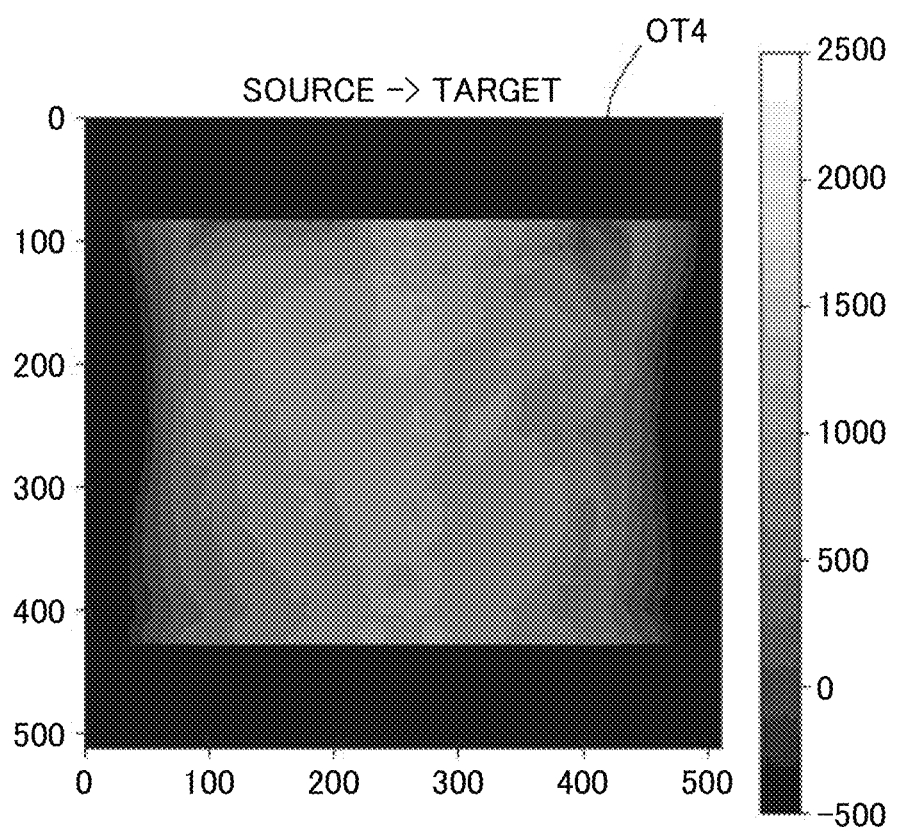
FIG. 8B is a diagram illustrating an output SUM image in the fourth generating example.
Figure 8C:
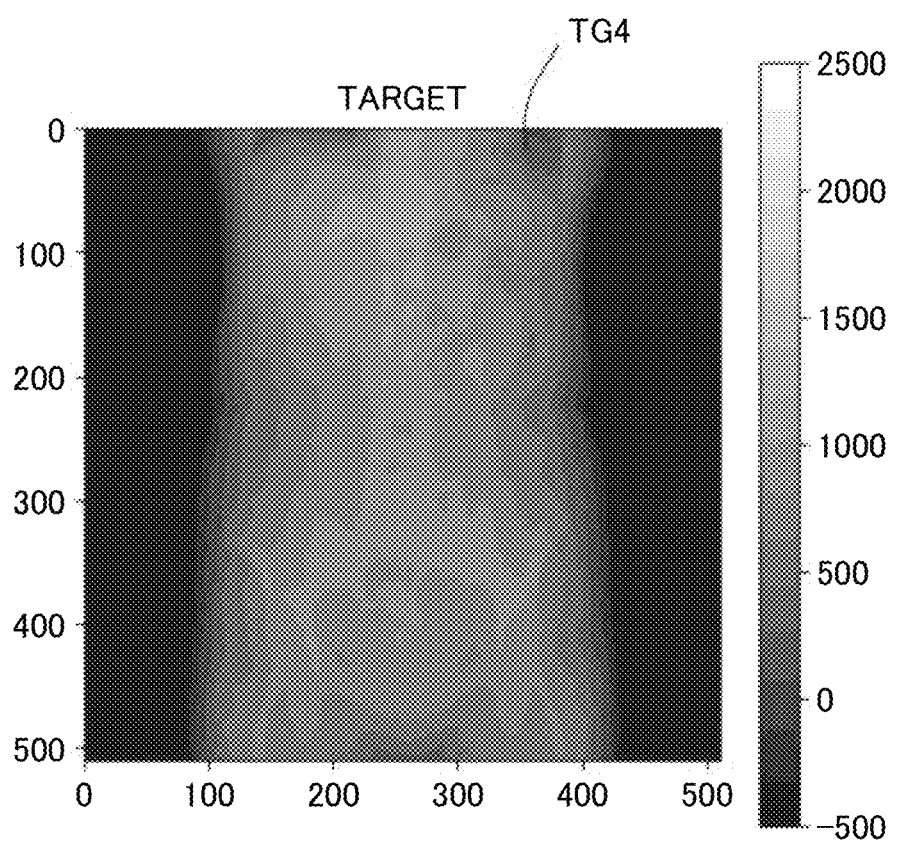
FIG. 8C is a diagram illustrating a target SUM image in the fourth generating example.
Figure 8D:
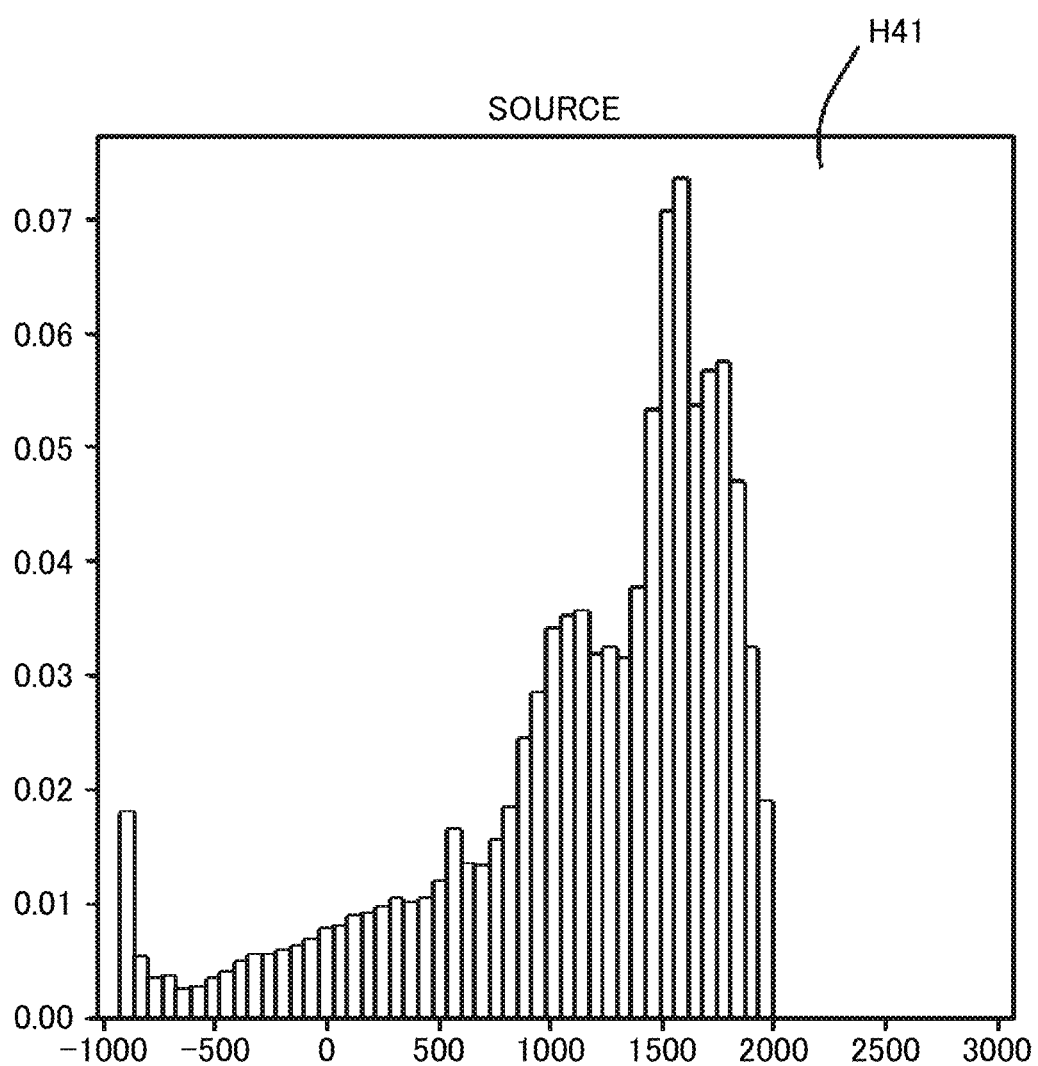
FIG. 8D is a diagram illustrating an original histogram related to the original SUM image in the fourth generating example.
Figure 8E:
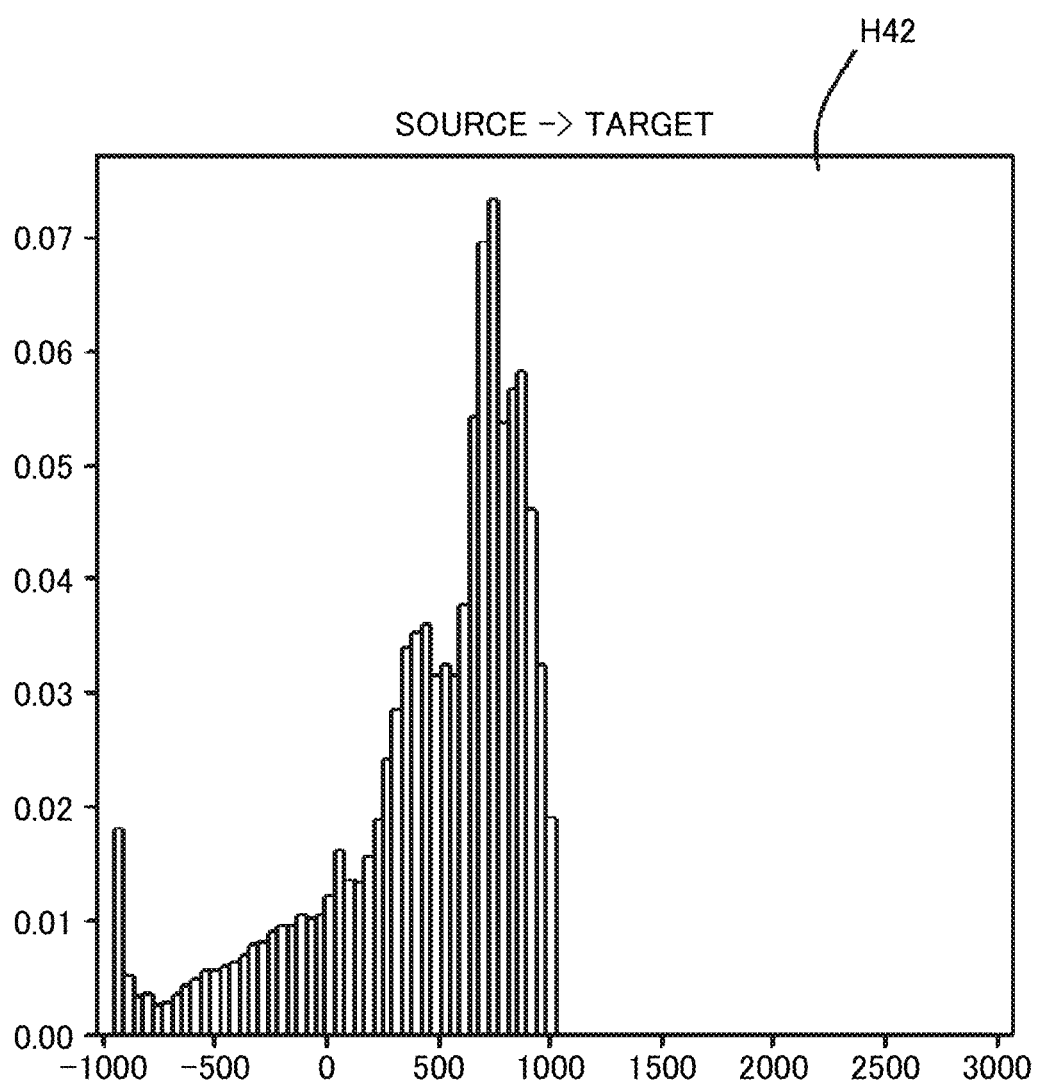
FIG. 8E is a diagram illustrating an output histogram related to the output SUM image in the fourth generating example.
Figure 8F:
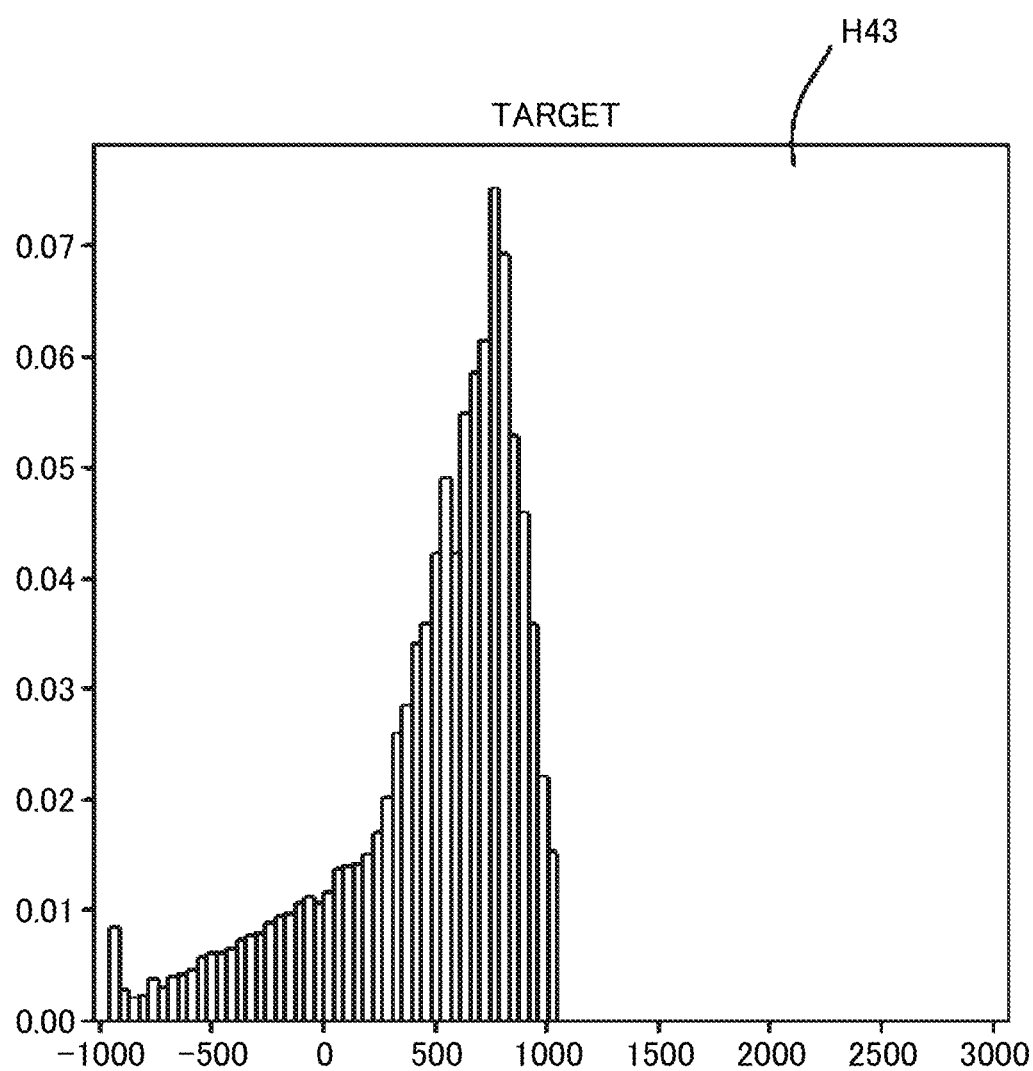
FIG. 8F is a diagram illustrating a target histogram related to the target SUM image in the fourth generating example.
Figure 8G:
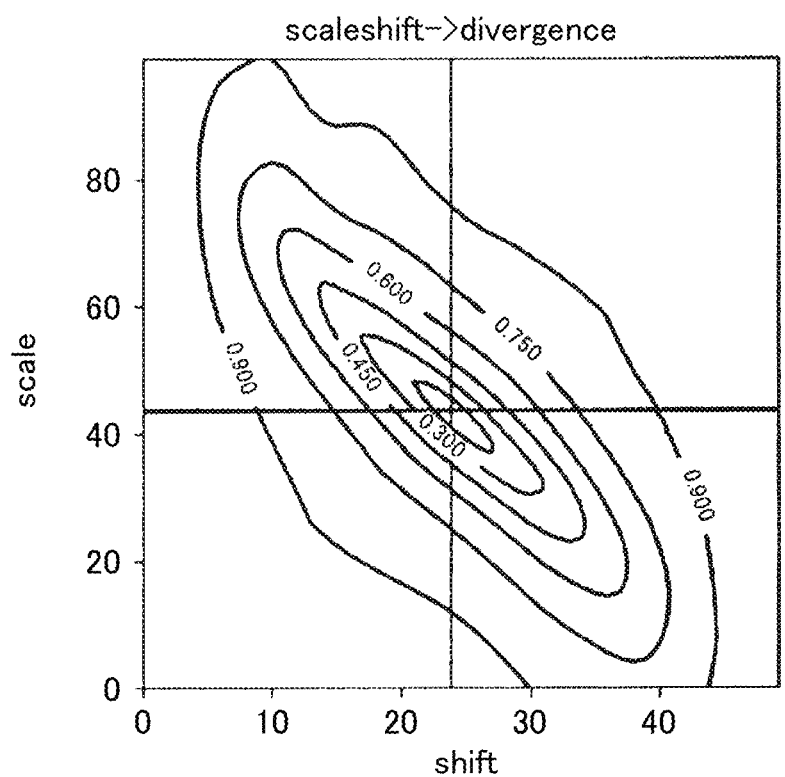
FIG. 8G is a diagram illustrating a relationship of a divergence value with a scale value and a shift value in the fourth generating example.

FIG. 8A is an example of an original SUM image SR4. FIG. 8B is an example of an output SUM image OT4. FIG. 8C is an example of a target SUM image TG4. FIG. 8D is an example of an original histogram H41 related to the original SUM image SR4. FIG. 8E is an example of an output histogram H42 related to the output SUM image OT4. FIG. 8F is an example of a target histogram H43 of the target SUM image TG4. FIG. 8G is a diagram illustrating a relationship of a divergence value with a scale value and a shift value.

In the fourth generating example, the histogram processing unit 164 compares the original histogram H41 and the target histogram H43, for example, according to the histogram intersection, and calculates the divergence value. Based on the original histogram H41 and the scale value and the shift value, the histogram processing unit 164 multiplies, for example, the original histogram H41 and the scale value and adds the shift value to the multiplication result to generate the processed histogram which is obtained by enlarging and translating the original histogram H41 in the x-axis direction (for example, the horizontal direction in FIG. 8D). The histogram processing unit 164 compares the processed histogram and the target histogram H43, for example, according to the histogram intersection, and calculates the divergence value. The degree of difference between the target histogram H43 and each processed histogram based on each scale value and each shift value is shown on the two-dimensional plane, as the divergence value for each scale value and each shift value in FIG. 8G.

The luminance processing unit 163 calculates a WW value corresponding to the scale value (for example, a value of 43) and a WL value corresponding to the shift value (for example, a value of 24) both at which the divergence value in FIG. 8G is equal to or less than a predetermined value (for example, a value of 0.3) (for example, the minimum value). The luminance processing unit 163 carries out the luminance control based on the derived WW value and WL value to the original SUM image SR4. The image generation unit 162 generates the output SUM image OT4 luminance-controlled by the luminance processing unit 163.

According to this fourth generating example, the medical image processing apparatus 100 carries out the scale processing and the shift processing to the original histogram H41 so that the divergence value between the original histogram H41 and the target histogram H43 is as small as possible. Accordingly, the output histogram H42 can be generated. Therefore, the medical image processing apparatus 100 can generate the output SUM image OT4 based on the original SUM image SR4. Accordingly, the medical image processing apparatus 100 can obtain the same effect as the third generating example.

Fifth Generating Example

In a fifth generating example, as the target SUM image, one SUM image is generated from 92 slice images in the volume data. It is also assumed that one SUM image is generated from one or more slice images in the volume data as the original SUM image and the output SUM image. In addition, it is assumed that the target SUM image, the original SUM image, and the output SUM image are images including the whole upper body of the subject. The processing of the SUM image is assumed to be performed by scale processing. In the fifth generating example, descriptions on items or processing similar to those in the first to fourth generating examples are omitted or simplified.

Figure 9A:
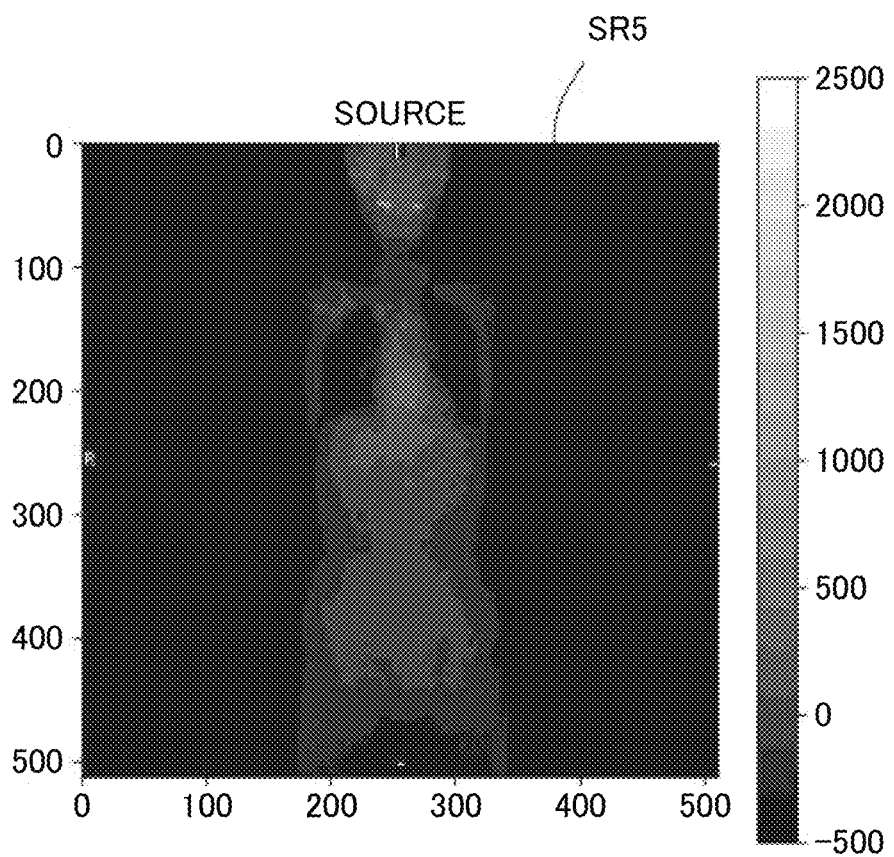
FIG. 9A is a diagram illustrating an original SUM image in a fifth generating example.
Figure 9B:
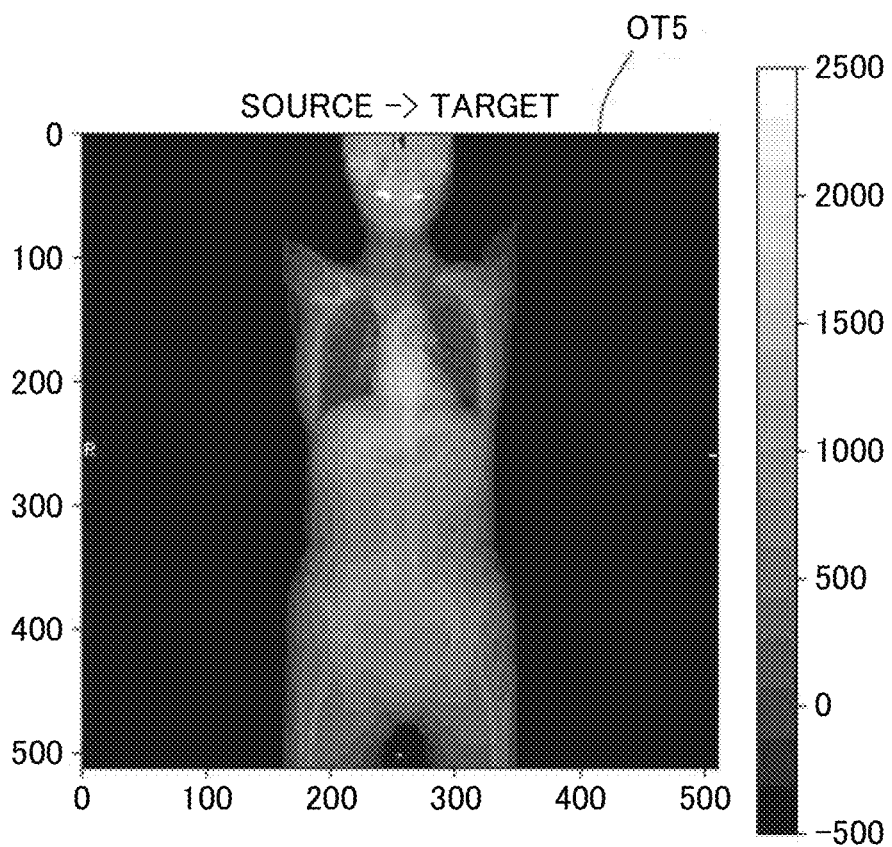
FIG. 9B is a diagram illustrating an output SUM image in the fifth generating example.
Figure 9C:
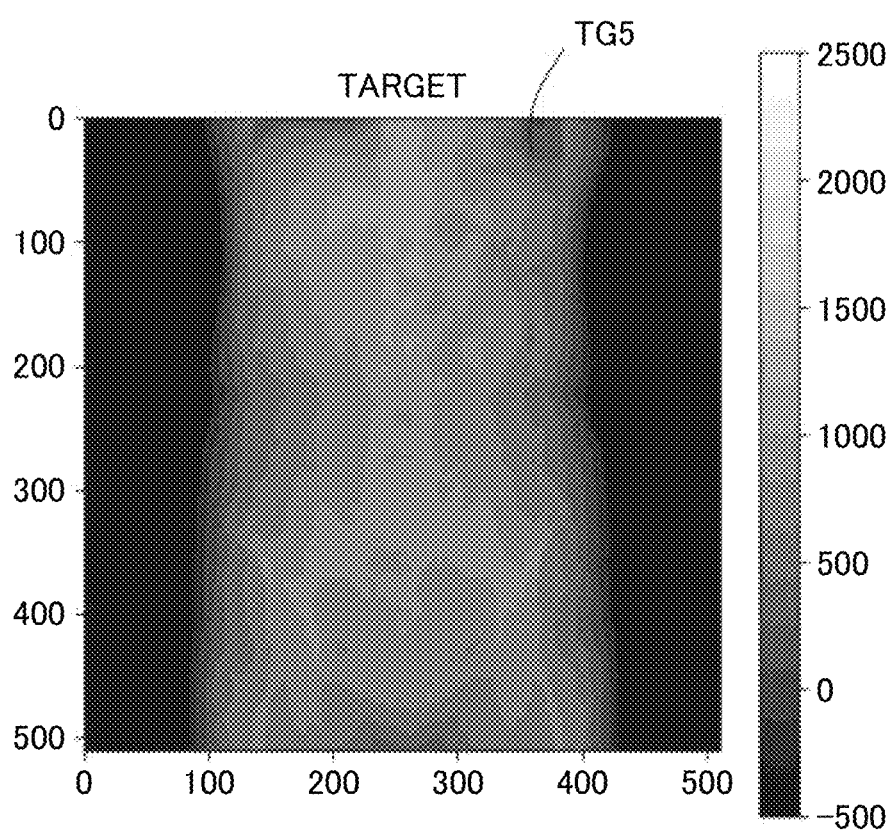
FIG. 9C is a diagram illustrating a target SUM image in the fifth generating example.
Figure 9D:
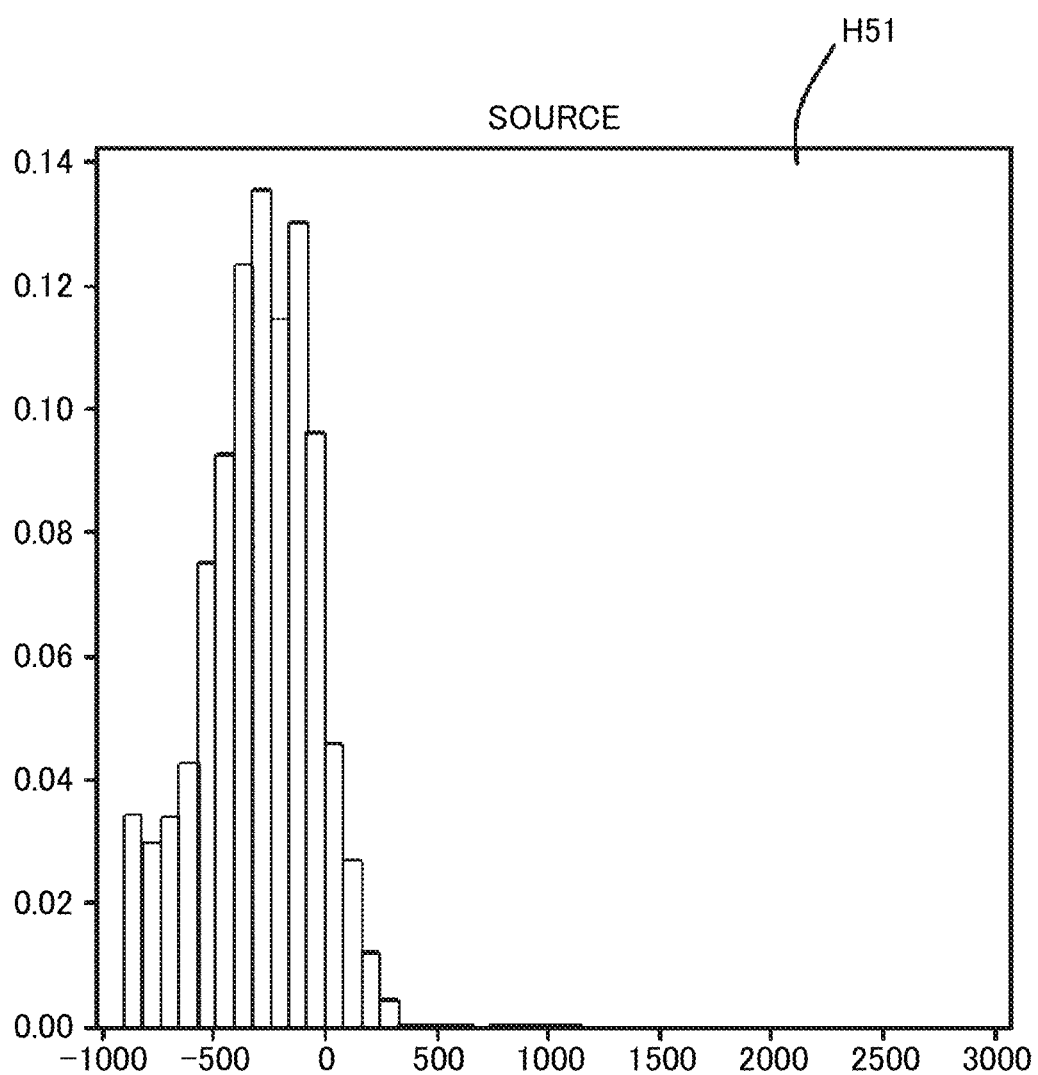
FIG. 9D is a diagram illustrating an original histogram related to the original SUM image in the fifth generating example.
Figure 9E:
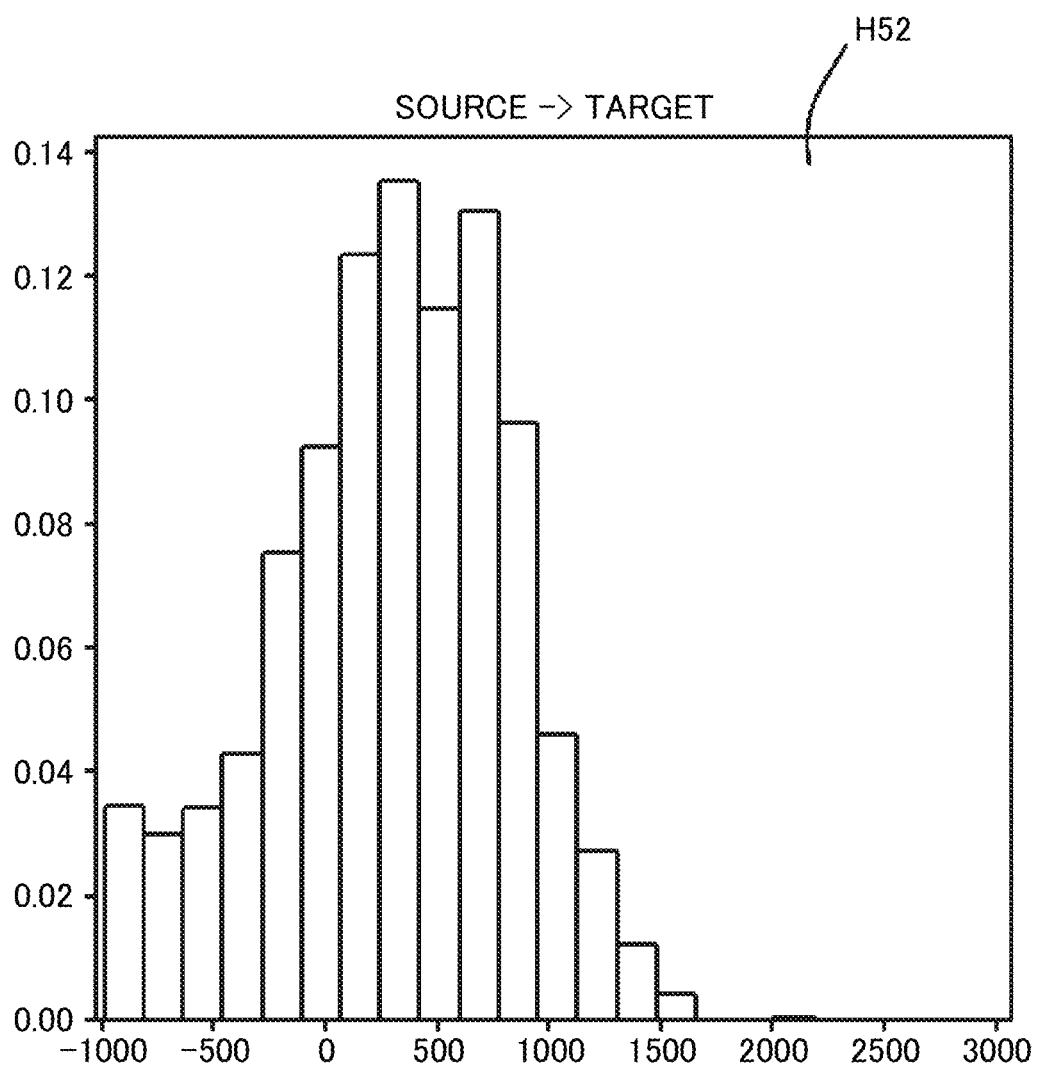
FIG. 9E is a diagram illustrating an output histogram related to the output SUM image in the fifth generating example.
Figure 9F:
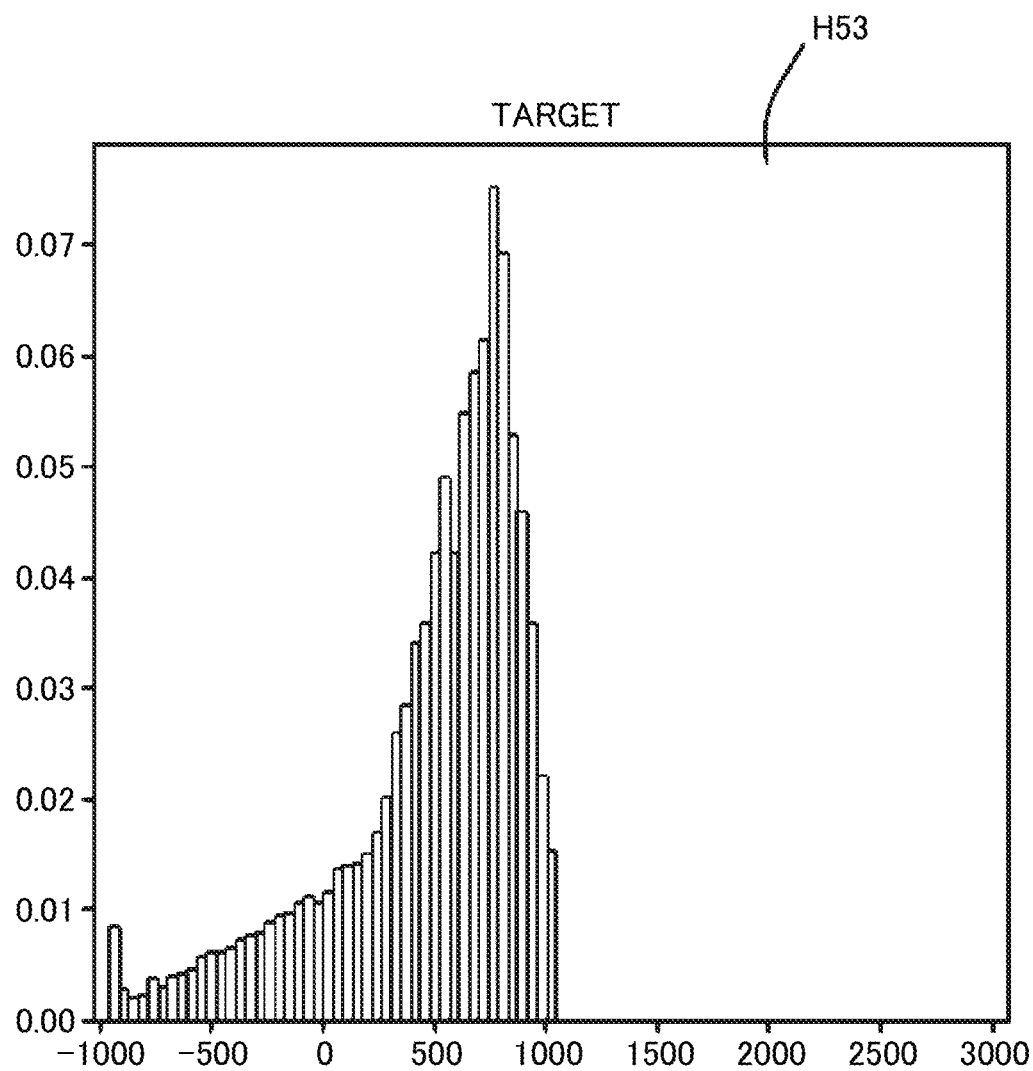
FIG. 9F is a diagram illustrating a target histogram related to the target SUM image in the fifth generating example.
Figure 9G:
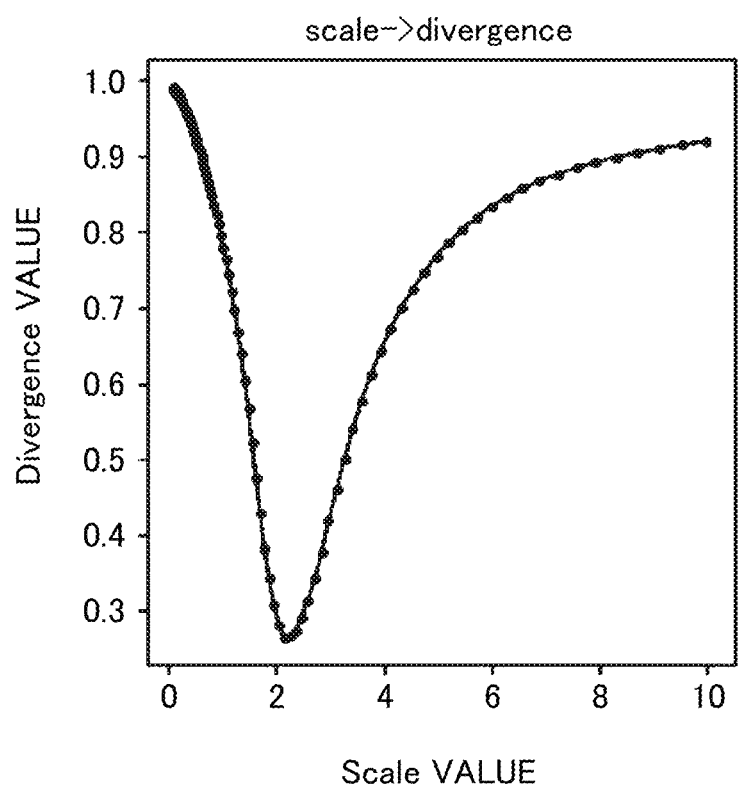
FIG. 9G is a diagram illustrating a relationship between a scale value and a divergence value in the fifth generating example.

FIG. 9A is an example of an original SUM image SR5. FIG. 9B is an example of an output SUM image OT5. FIG. 9C is an example of a target SUM image TG5. FIG. 9D is an example of an original histogram H51 related to the original SUM image SR5. FIG. 9E is an example of an output histogram H52 related to the output SUM image OT5. FIG. 9F is an example of a target histogram H53 of the target SUM image TG5. FIG. 9G is a diagram illustrating a relationship between a scale value and a divergence value.

In the fifth generating example, the histogram processing unit 164 compares the original histogram H51 and the target histogram H53, for example, according to the histogram intersection, and calculates the divergence value. Based on the original histogram H51 and the scale value, the histogram processing unit 164 multiplies the original histogram H51 and the scale value, for example, and enlarges the original histogram H51 in the x-axis direction (for example, the horizontal direction in FIG. 9D) to generate the processed histogram. The histogram processing unit 164 compares the processed histogram and the target histogram H53, for example, according to the histogram intersection, and calculates the divergence value. The degree of difference between each processed histogram based on each scale value and the target histogram H53 is shown as the divergence value for each scale value in FIG. 9G.

The luminance processing unit 163 calculates a WW value (an example of the output WW/WL) corresponding to the scale value (for example, a value of 2.1) at which the divergence value in FIG. 9G is equal to or less than a predetermined value (for example, a value of 0.3) (for example, the minimum value). The luminance processing unit 163 carries out the luminance control based on the derived WW value to the original SUM image SR5. The image generation unit 162 generates the output SUM image OT5 luminance-controlled by the luminance processing unit 163.

According to this fifth generating example, the medical image processing apparatus 100 carries out the scale processing to the original histogram H51 so that the divergence value between the original histogram H51 and the target histogram H53 is as small as possible. Accordingly, the output histogram H52 can be generated. Therefore, the medical image processing apparatus 100 can generate the output SUM image OT5 based on the original SUM image SR5. Accordingly, the medical image processing apparatus 100 can obtain the same effect as the first generating example.

Sixth Generating Example

In a sixth generating example, as the target SUM image, one SUM image is generated from one or more slice images in the volume data of the lung region. It is also assumed that one SUM image is generated from one or more slice images in the volume data as the original SUM image and the output SUM image. In addition, it is assumed that the target SUM image is an image including the lung region of the subject, and the original SUM image and the output SUM image are images including the whole upper body of the subject. The processing of the SUM image is assumed to be performed by scale processing. In the sixth generating example, descriptions on items or processing similar to those in the first to fifth generating examples are omitted or simplified.

Figure 10A:
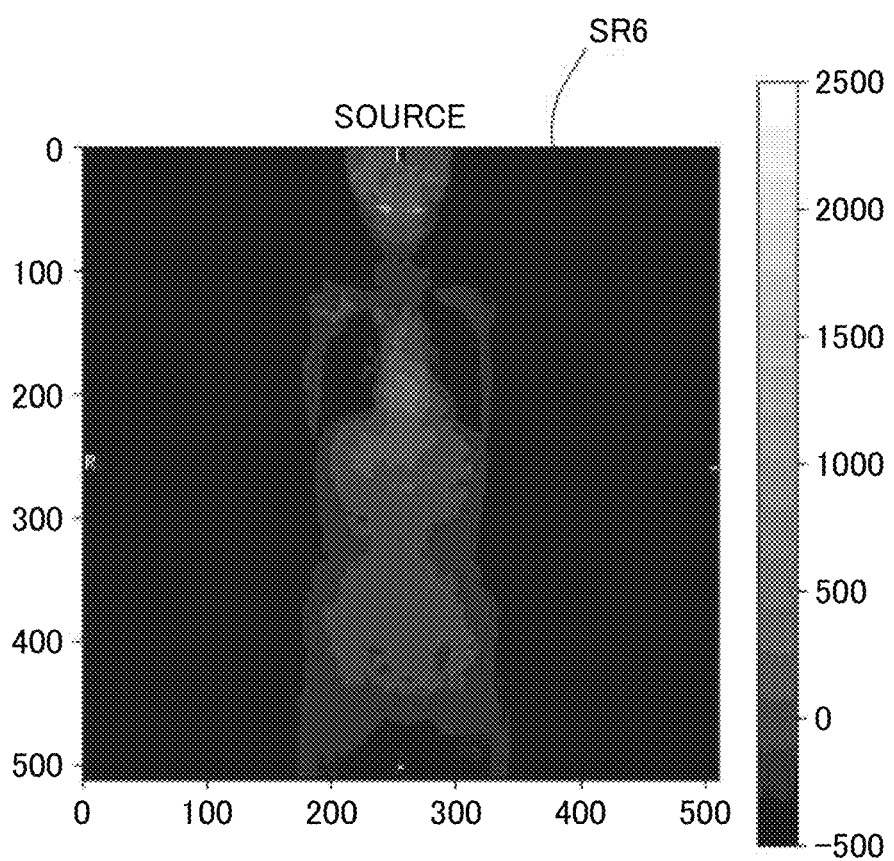
FIG. 10A is a diagram illustrating an original SUM image in a sixth generating example.
Figure 10B:
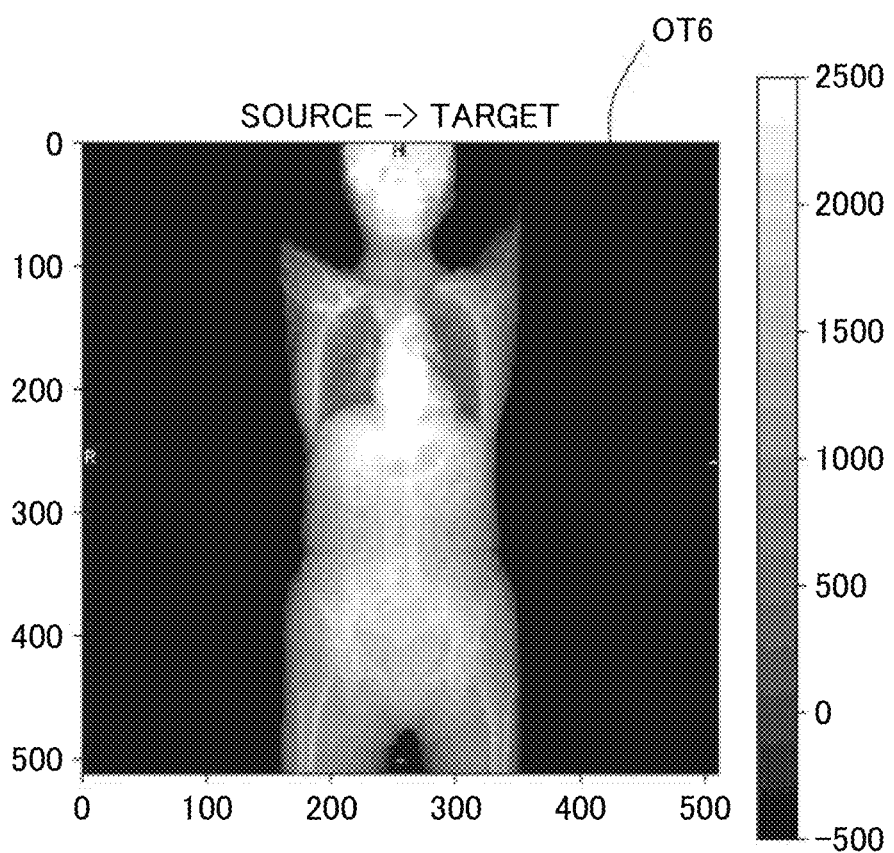
FIG. 10B is a diagram illustrating an output SUM image in the sixth generating example.
Figure 10C:
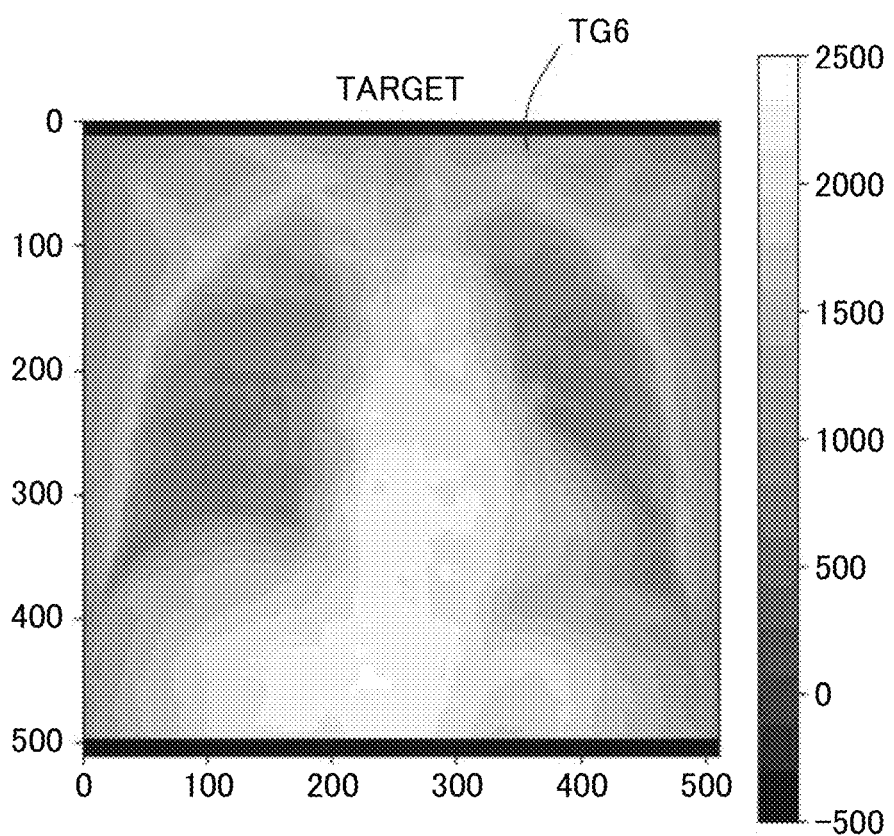
FIG. 10C is a diagram illustrating a target SUM image in the sixth generating example.
Figure 10D:
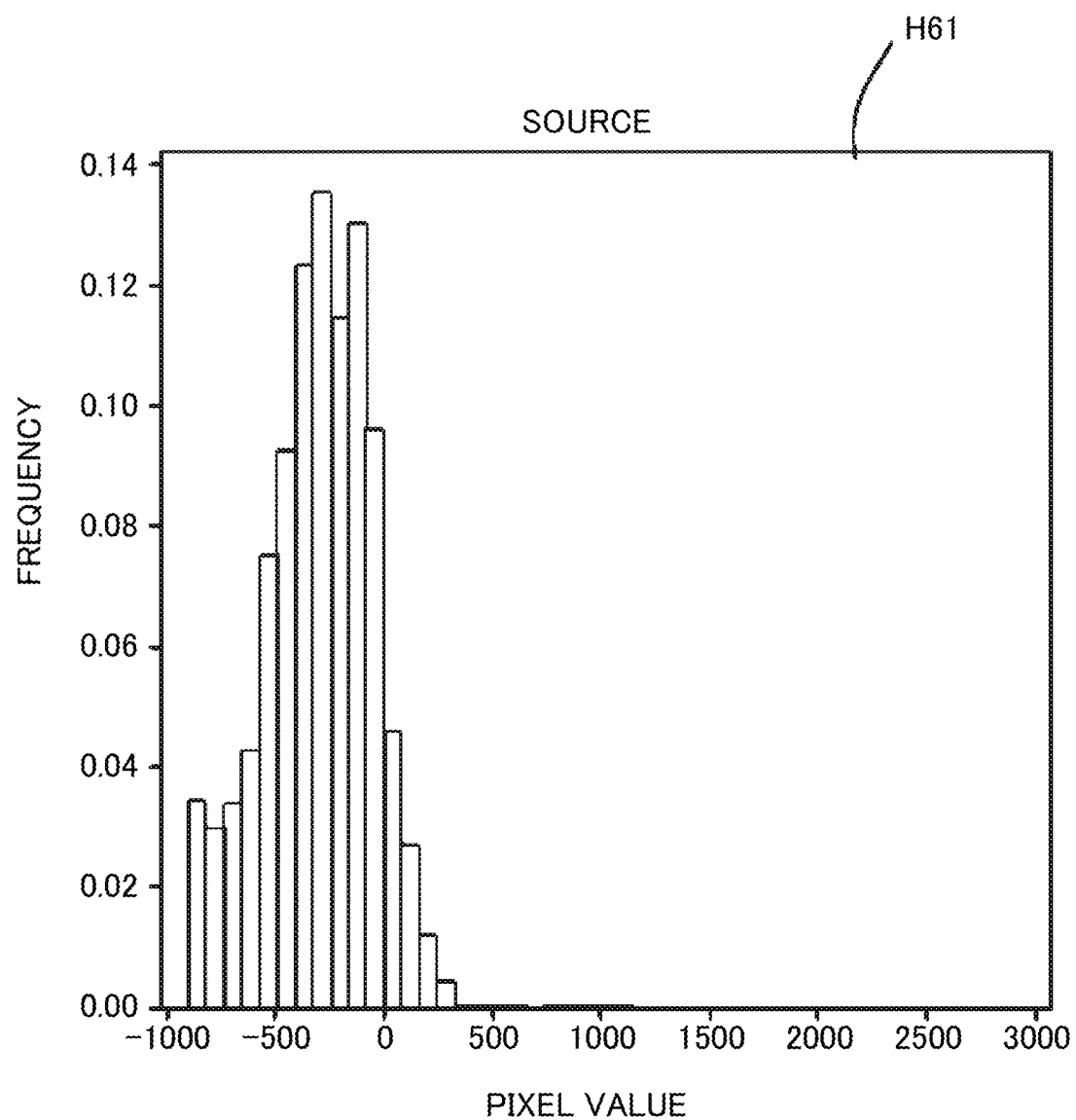
FIG. 10D is a diagram illustrating an original histogram related to the original SUM image in the sixth generating example.
Figure 10E:
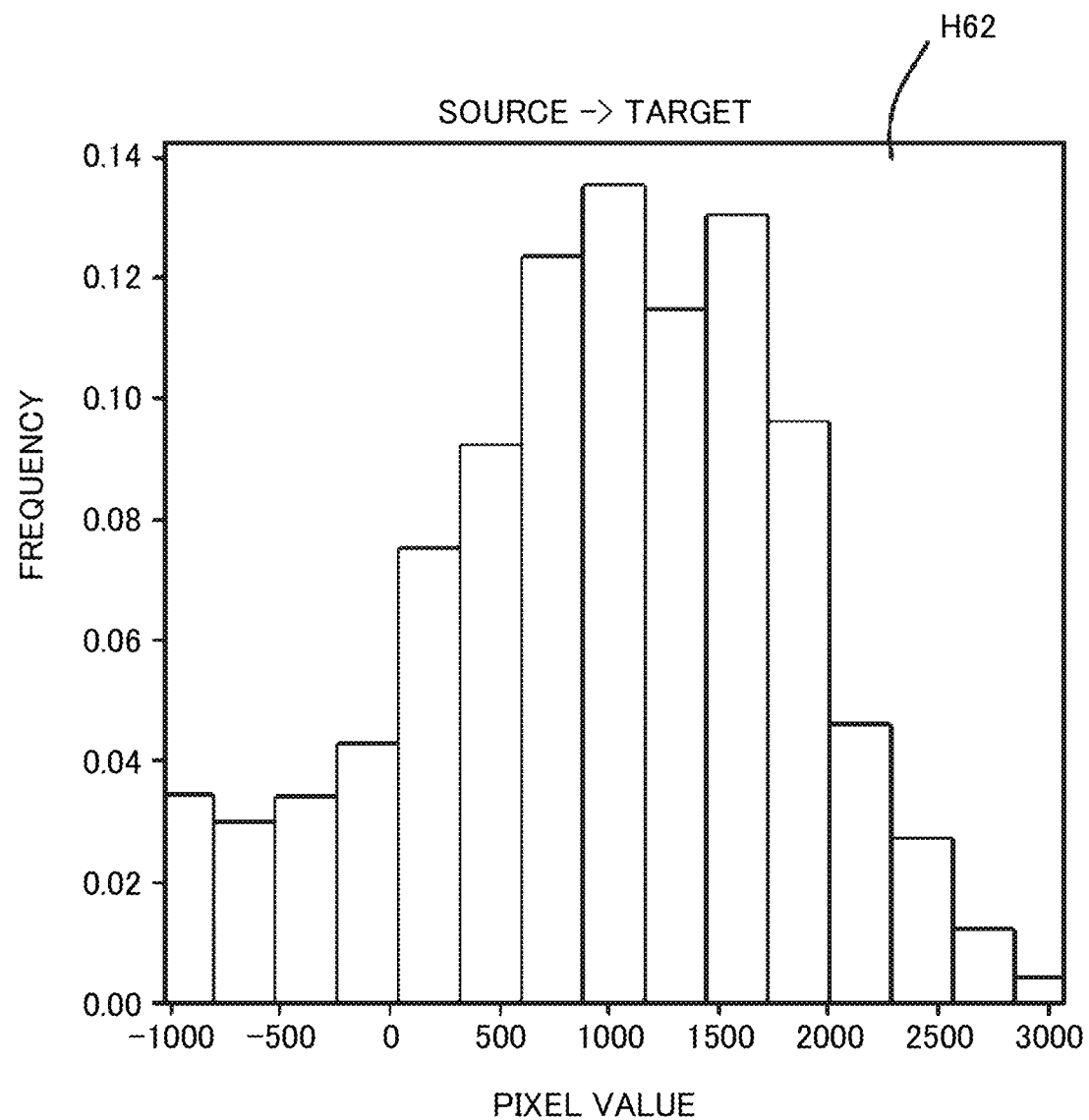
FIG. 10E is a diagram illustrating an output histogram related to the output SUM image in the sixth generating example.
Figure 10F:
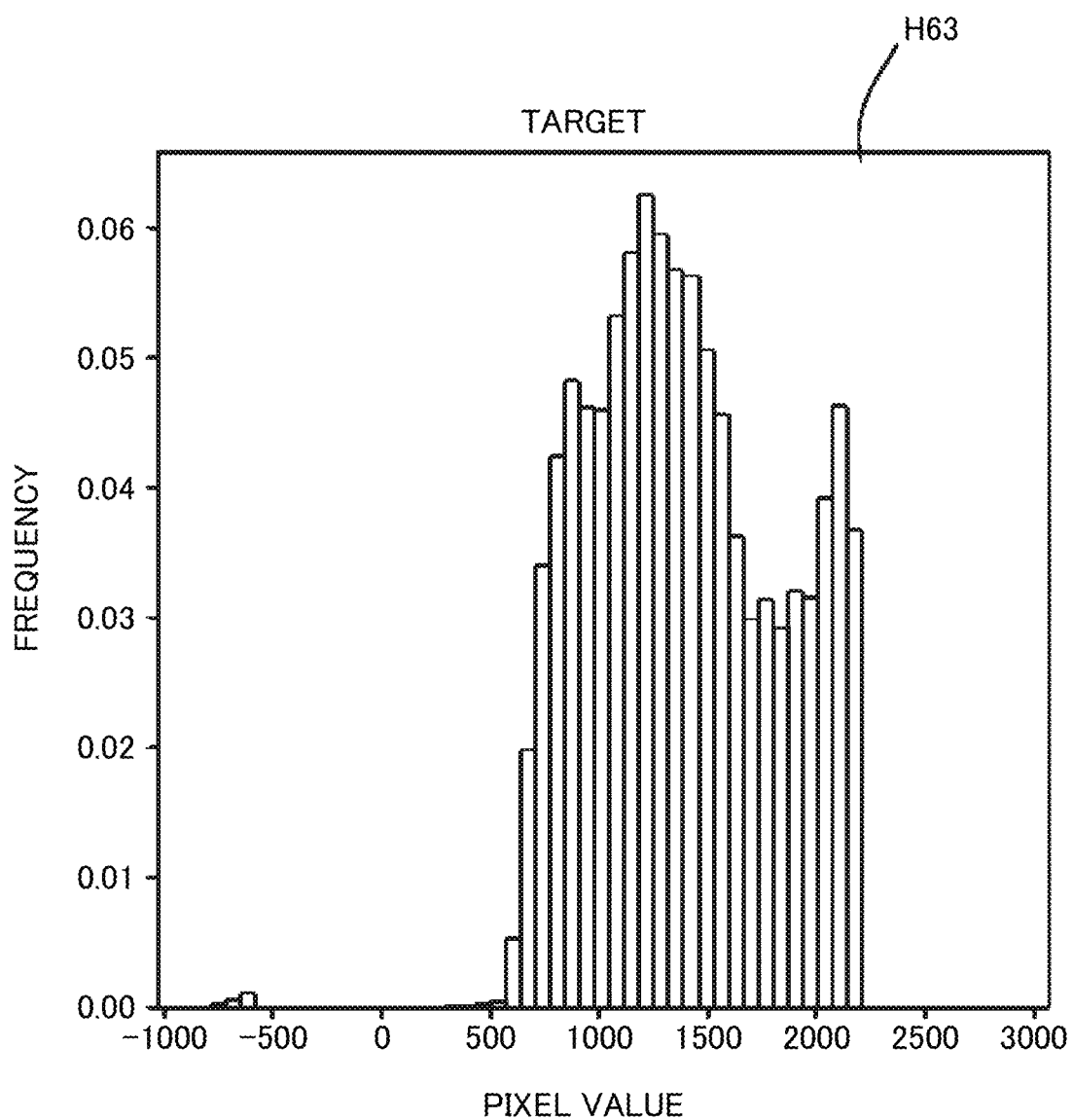
FIG. 10F is a diagram illustrating a target histogram related to the target SUM image in the sixth generating example.
Figure 10G:
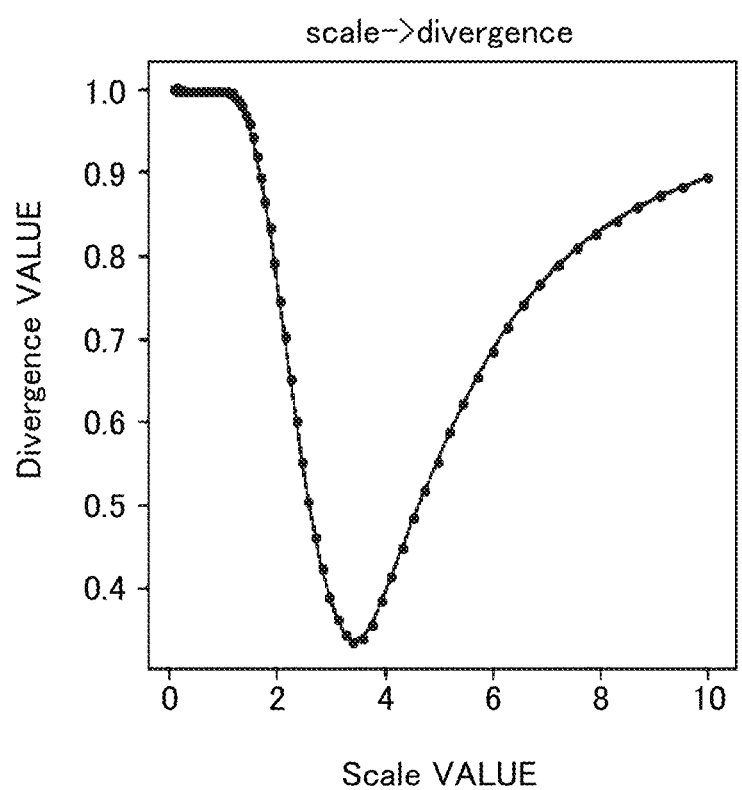
FIG. 10G is a diagram illustrating a relationship between a scale value and a divergence value in the sixth generating example.

FIG. 10A is an example of an original SUM image SR6. FIG. 10B is an example of an output SUM image OT6. FIG. 10C is an example of a target SUM image TG6. FIG. 10D is an example of an original histogram H61 related to the original SUM image SR6. FIG. 10E is an example of an output histogram H62 related to the output SUM image OT6. FIG. 10F is an example of a target histogram H63 of the target SUM image TG6. FIG. 10G is a diagram illustrating a relationship between a scale value and a divergence value.

In the sixth generating example, the histogram processing unit 164 compares the original histogram H61 and the target histogram H63, for example, according to the histogram intersection, and calculates the divergence value. Based on the original histogram H61 and the scale value, the histogram processing unit 164 multiplies the original histogram H61 and the scale value, for example, and enlarges the original histogram H61 in the x-axis direction (for example, the horizontal direction in FIG. 10D) to generate the processed histogram. The histogram processing unit 164 compares the processed histogram and the target histogram H63, for example, according to the histogram intersection, and calculates the divergence value. The degree of difference between each processed histogram based on each scale value and the target histogram H63 is shown as the divergence value for each scale value in FIG. 10G.

The luminance processing unit 163 calculates a WW value (an example of the output WW/WL) corresponding to the scale value (for example, a value of 3.5) at which the divergence value in FIG. 10G is equal to or less than a predetermined value (for example, a value of 0.3) (for example, the minimum value). The luminance processing unit 163 carries out the luminance control based on the derived WW value to the original SUM image SR6. The image generation unit 162 generates the output SUM image OT6 luminance-controlled by the luminance processing unit 163.

According to this sixth generating example, the medical image processing apparatus 100 carries out the scale processing to the original histogram H61 so that the divergence value between the original histogram H61 and the target histogram H63 is as small as possible. Accordingly, the output histogram H62 can be generated. Therefore, the medical image processing apparatus 100 can generate the output SUM image OT6 based on the original SUM image SR6. Accordingly, the medical image processing apparatus 100 can obtain the same effect as the first generating example.

In addition, even when the part of the subject included in the SUM image is different between the original SUM image and the target SUM image, the medical image processing apparatus 100 can apply the luminance control performed so as to obtain a desired state of the user in the target SUM image, to the original SUM image to generate the luminance-controlled output SUM image OT6. This is the same in the above described first to fourth generating examples.

Seventh Generating Example

In a seventh generating example, as the target SUM image, one SUM image is generated from one or more slice images in the volume data of the lung region. It is also assumed that one SUM image is generated from one or more slice images in the volume data as the original SUM image and the output SUM image. In addition, it is assumed that the target SUM image is an image including the lung region of the subject, and the original SUM image and the output SUM image are images including the whole upper body of the subject. In addition, the processing of the SUM image is assumed to be performed by the scale processing and the shift processing. In the seventh generating example, descriptions on items or processing similar to those in the first to sixth generating examples are omitted or simplified.

Figure 11A:
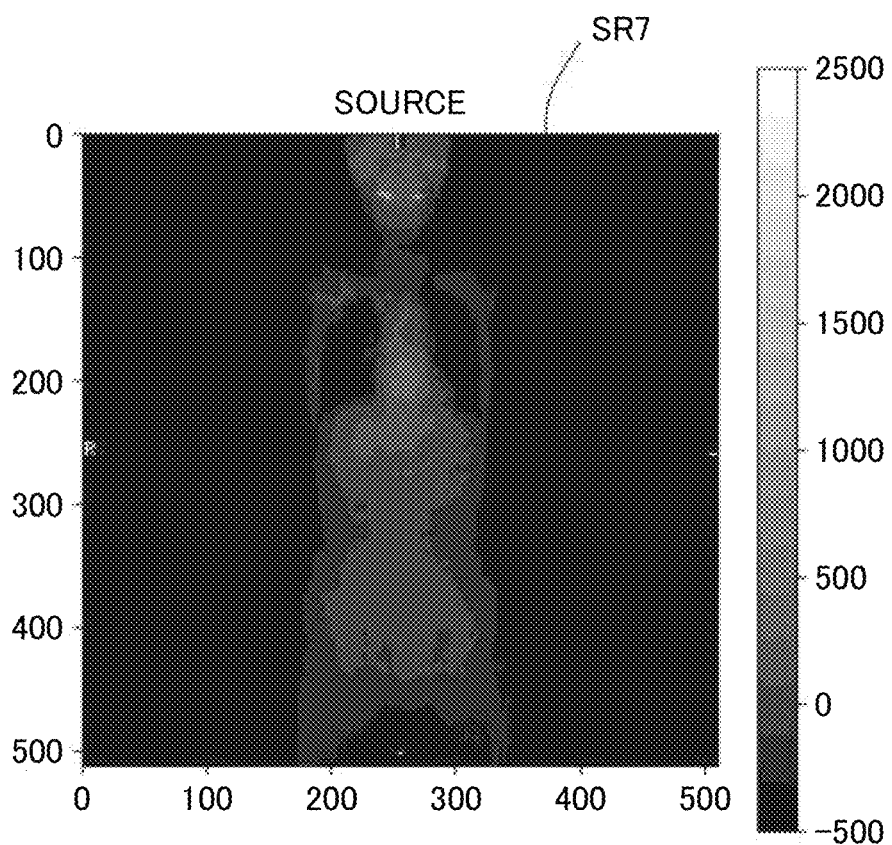
FIG. 11A is a diagram illustrating an original SUM image in a seventh generating example.
Figure 11B:
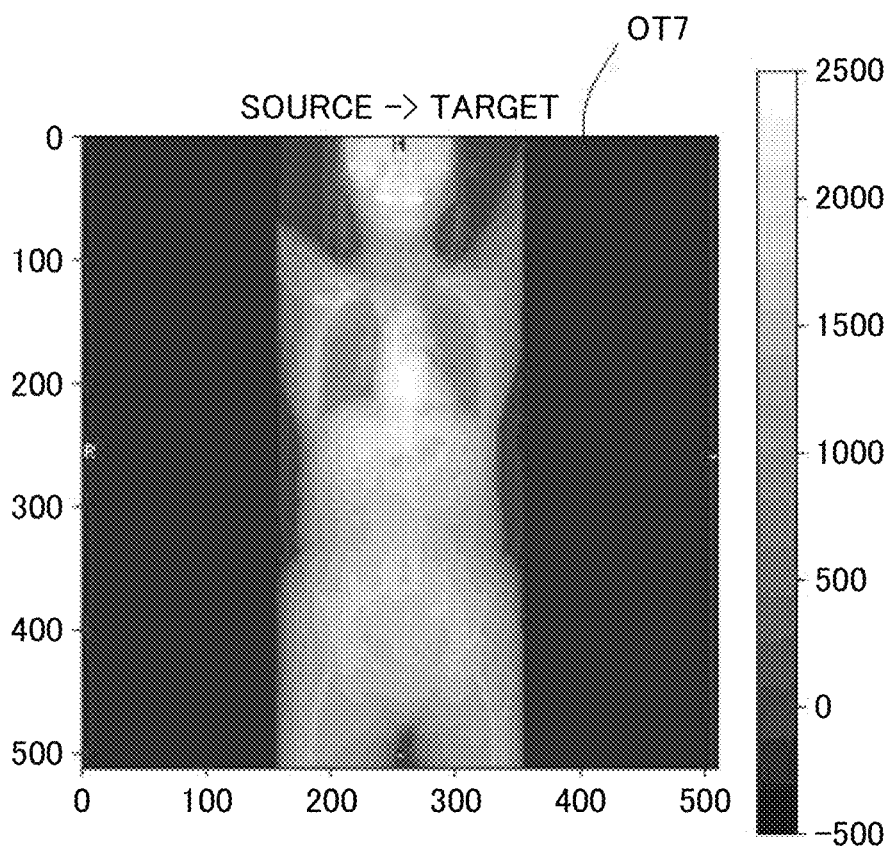
FIG. 11B is a diagram illustrating an output SUM image in the seventh generating example.
Figure 11C:
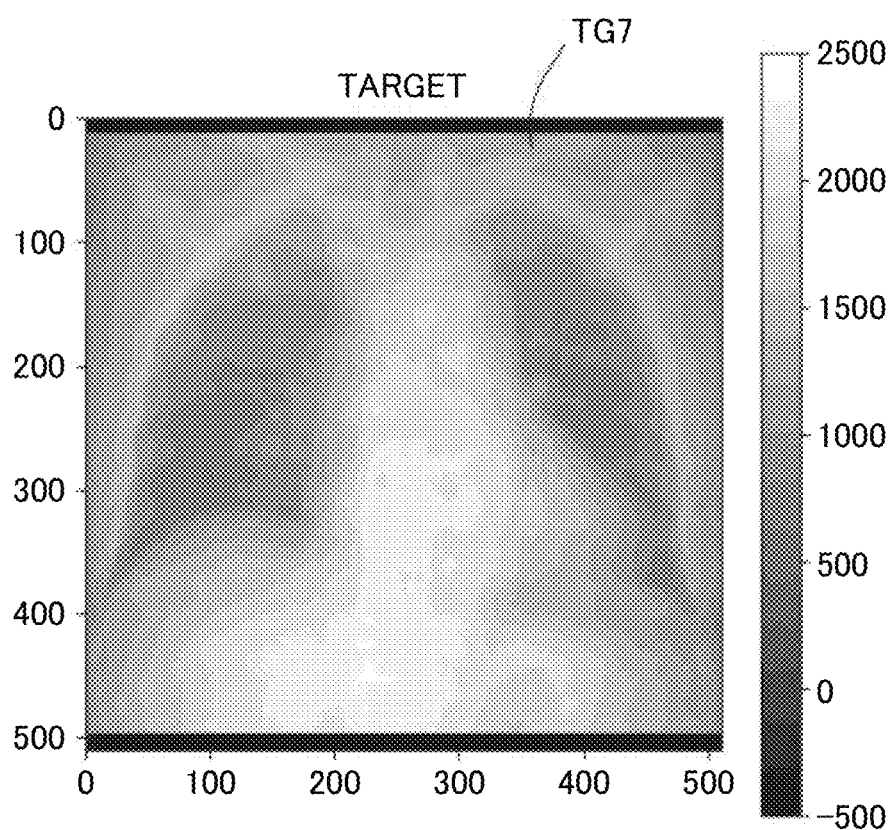
FIG. 11C is a diagram illustrating a target SUM image in the seventh generating example.
Figure 11D:
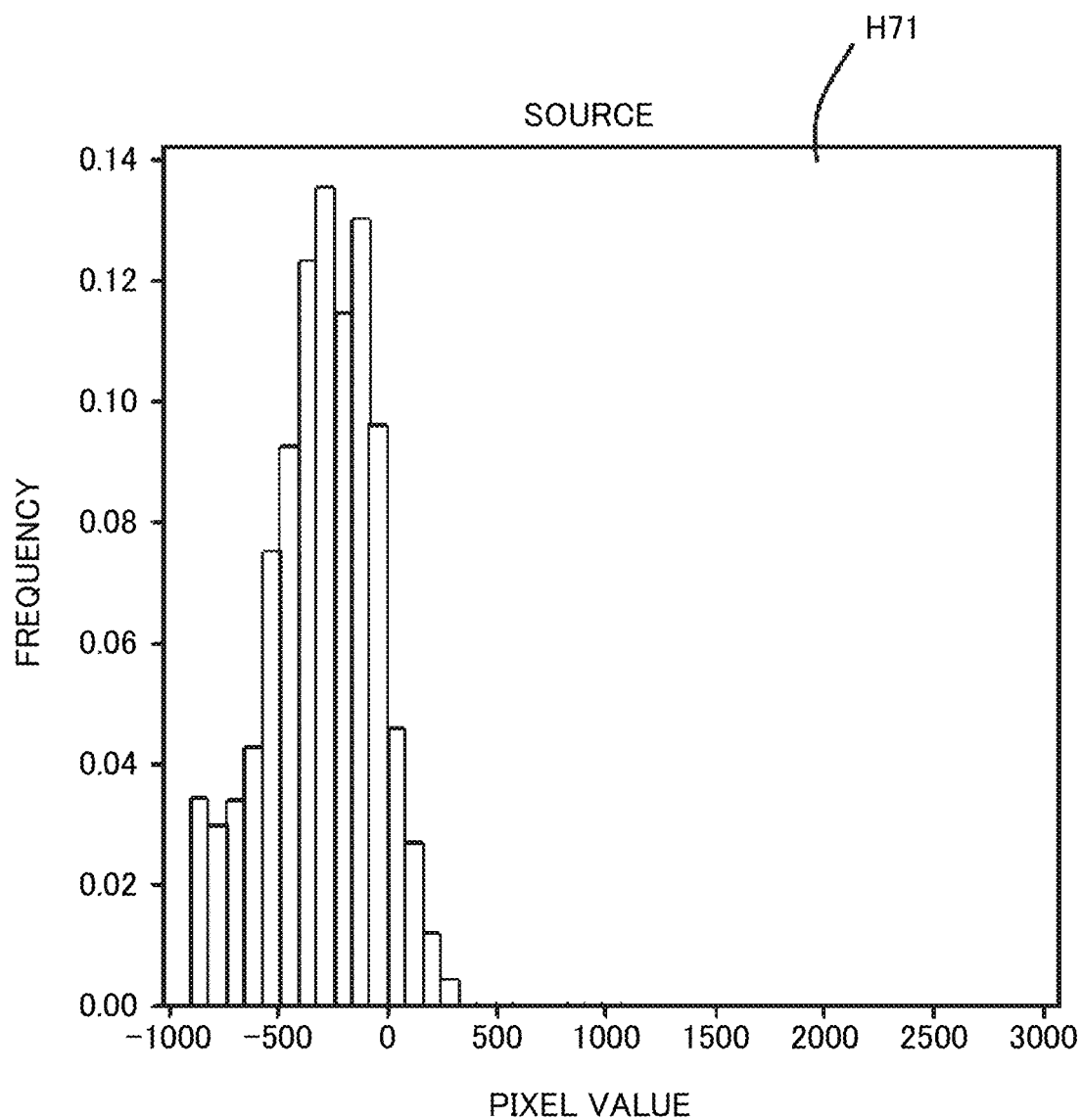
FIG. 11D is a diagram illustrating an original histogram related to the original SUM image in the seventh generating example.
Figure 11E:
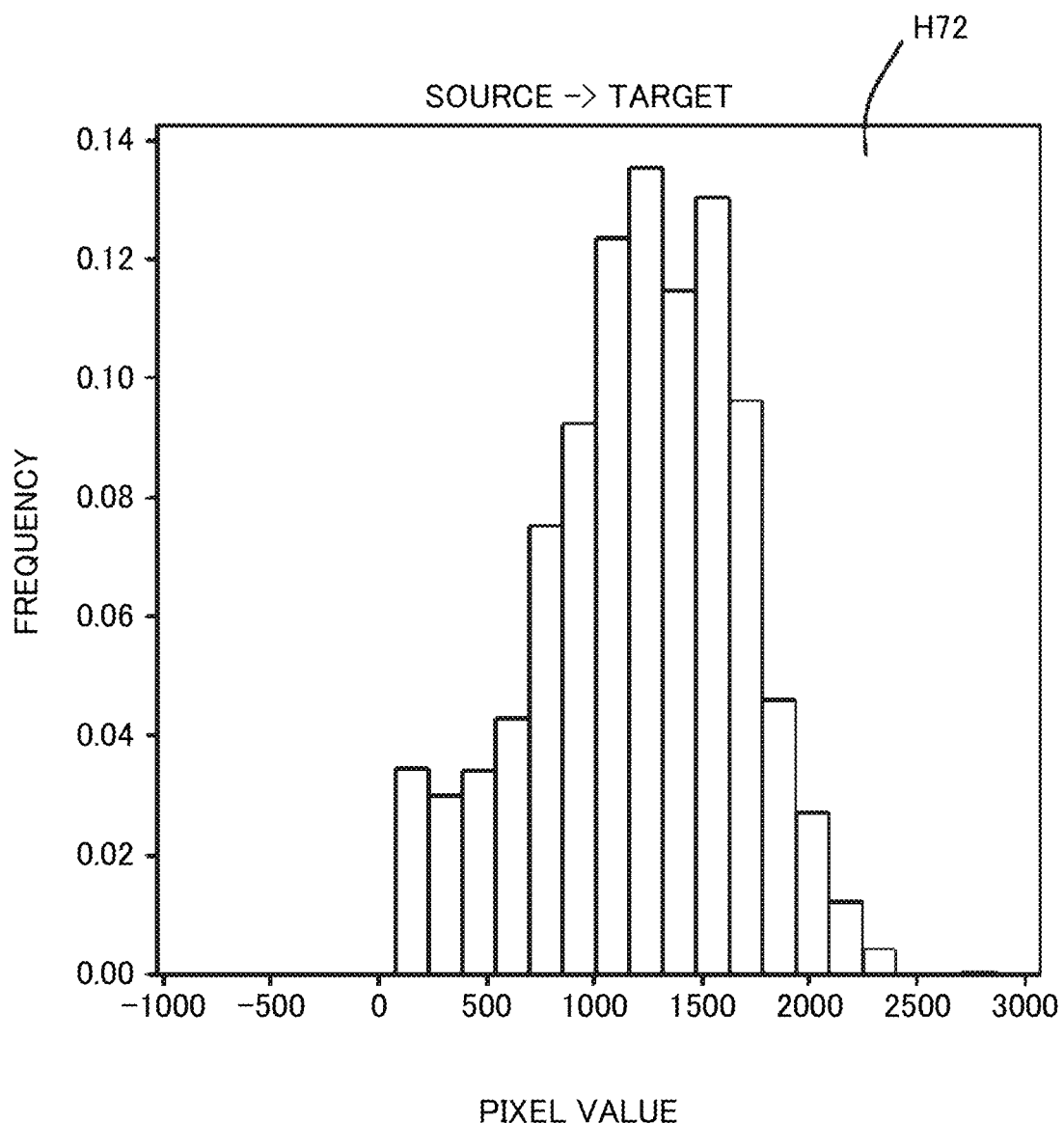
FIG. 11E is a diagram illustrating an output histogram related to the output SUM image in the seventh generating example.
Figure 11F:
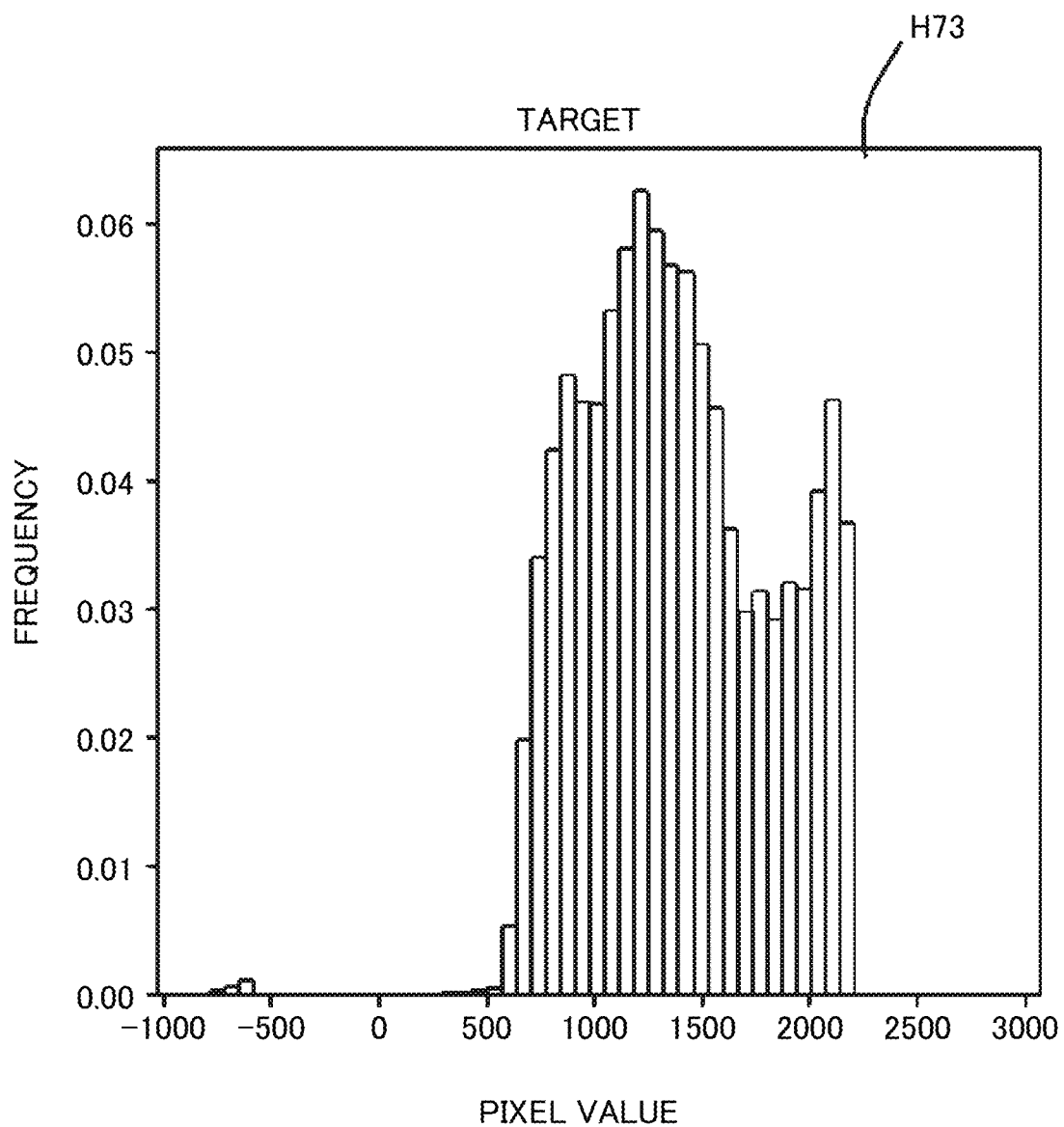
FIG. 11F is a diagram illustrating a target histogram related to the target SUM image in the seventh generating example.
Figure 11G:
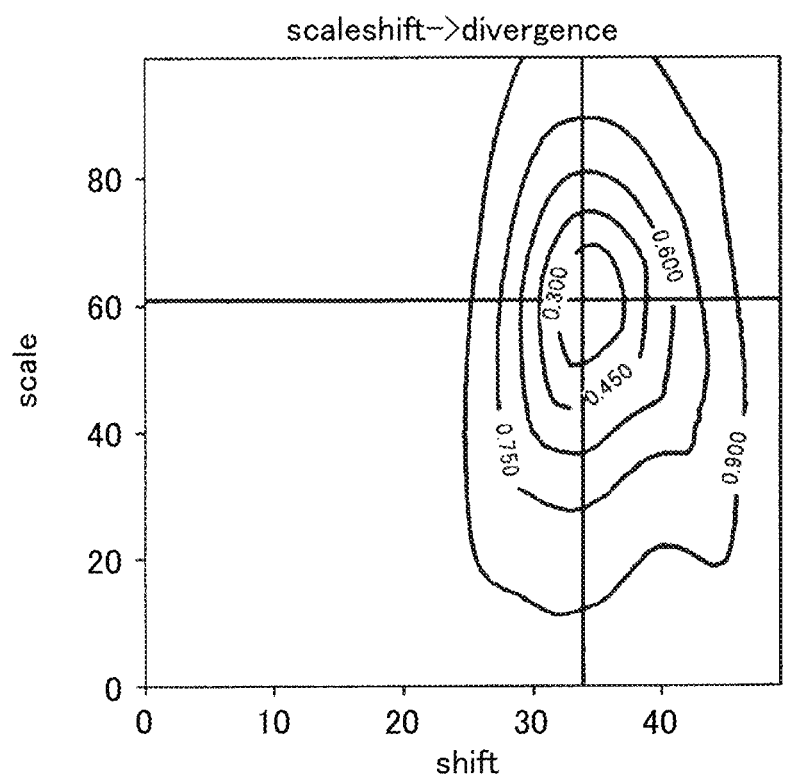
FIG. 11G is a diagram illustrating a relationship of a divergence value with a scale value and a shift value in the seventh generating example.

FIG. 11A is an example of an original SUM image SR7. FIG. 11B is an example of an output SUM image OT7. FIG. 11C is an example of a target SUM image TG7. FIG. 11D is an example of an original histogram H71 related to the original SUM image SR7. FIG. 11E is an example of an output histogram H72 related to the output SUM image OT7. FIG. 11F is an example of a target histogram H73 of the target SUM image TG7. FIG. 11G is a diagram illustrating a relationship of a divergence value with a scale value and a shift value.

In the seventh generating example, the histogram processing unit 164 compares the original histogram H71 and the target histogram H73, for example, according to the histogram intersection, and calculates the divergence value. Based on the original histogram H71 and the scale value and the shift value, the histogram processing unit 164 multiplies, for example, the original histogram H71 and the scale value and adds the shift value to the multiplication result to generate the processed histogram which is obtained by enlarging and translating the original histogram H71 in the x-axis direction (for example, the horizontal direction in FIG. 11D). The histogram processing unit 164 compares the processed histogram and the target histogram H73, for example, according to the histogram intersection, and calculates the divergence value. The degree of difference between the target histogram H73 and each processed histogram based on each scale value and each shift value is shown on the two-dimensional plane, as the divergence value for each scale value and each shift value in FIG. 11G.

The luminance processing unit 163 calculates a WW value corresponding to the scale value (for example, a value of 61) and a WL value corresponding to the shift value (for example, a value of 34) both at which the divergence value in FIG. 11G is equal to or less than a predetermined value (for example, a value of 0.3) (for example, the minimum value). The luminance processing unit 163 carries out the luminance control based on the derived WW value and WL value to the original SUM image SR7. The image generation unit 162 generates the output SUM image OT7 luminance-controlled by the luminance processing unit 163.

According to this seventh generating example, the medical image processing apparatus 100 carries out the scale processing and the shift processing to the original histogram H71 so that the divergence value between the original histogram H71 and the target histogram H73 is as small as possible. Accordingly, the output histogram H72 can be generated. Therefore, the medical image processing apparatus 100 can generate the output SUM image OT7 based on the original SUM image SR7. Accordingly, the medical image processing apparatus 100 can obtain the same effect as the third generating example.

In addition, even when the part of the subject included in the SUM image is different between the original SUM image and the target SUM image, the medical image processing apparatus 100 can apply the luminance control performed so as to obtain a desired state of the user in the target SUM image, to the original SUM image to generate the luminance-controlled output SUM image OT7.

In addition, the medical image processing apparatus 100 can perform fine luminance control of WW/WL by carrying out the shift processing together with the scale processing to the original histogram H71. Accordingly, as compared with the sixth generating example, the medical image processing apparatus 100 can make the luminance control to the original SUM image SR7 one step closer to the luminance control related to the target SUM image TG7. Therefore, in the output SUM image OT7, the medical image processing apparatus 100 can prevent halation by an excessive height of the pixel value of head or lungs part included in the upper body as in the output SUM image OT6. Accordingly, the medical image processing apparatus 100 can increase the reproducibility of the SUM image after the luminance control.

Eighth Generating Example

In an eighth generating example, as the target SUM image, one SUM image is generated from one or more slice images in the volume data of the lung region. It is also assumed that one SUM image is generated from one or more slice images in the volume data of the lung region, as the original SUM image and the output SUM image. In addition, it is assumed that the target SUM image, the original SUM image, and the output SUM image are images including the lung region of the subject. The processing of the SUM image is assumed to be performed by scale processing. In the eighth generating example, descriptions on items or processing similar to those in the first to seventh generating examples are omitted or simplified.

Figure 12A:
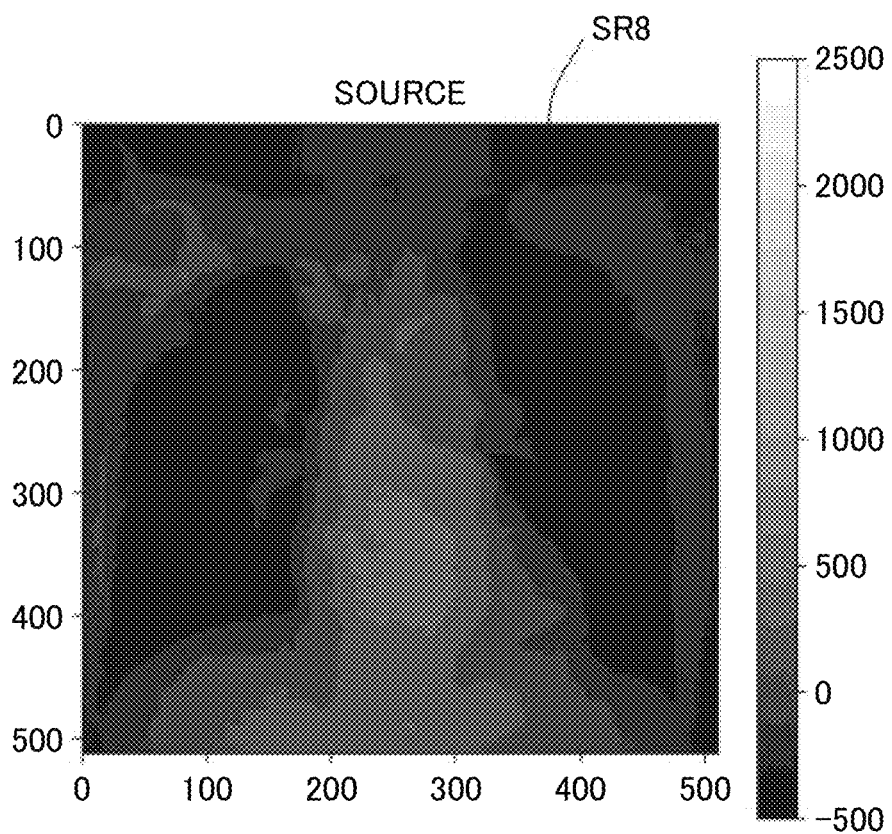
FIG. 12A is a diagram illustrating an original SUM image in an eighth generating example.
Figure 12B:
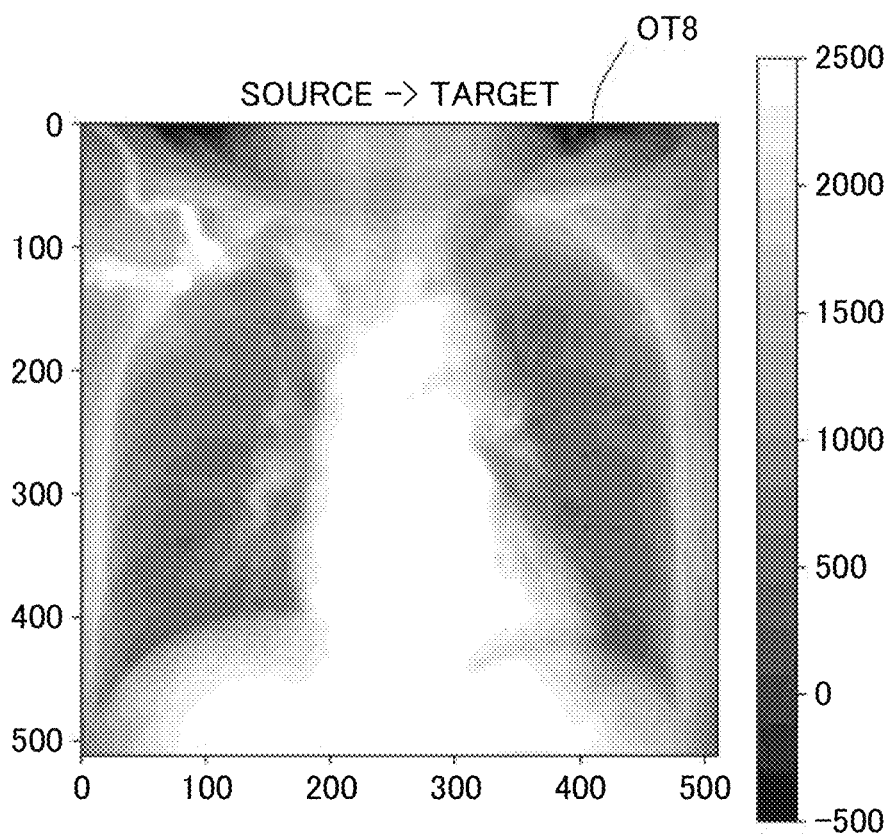
FIG. 12B is a diagram illustrating an output SUM image in the eighth generating example.
Figure 12C:
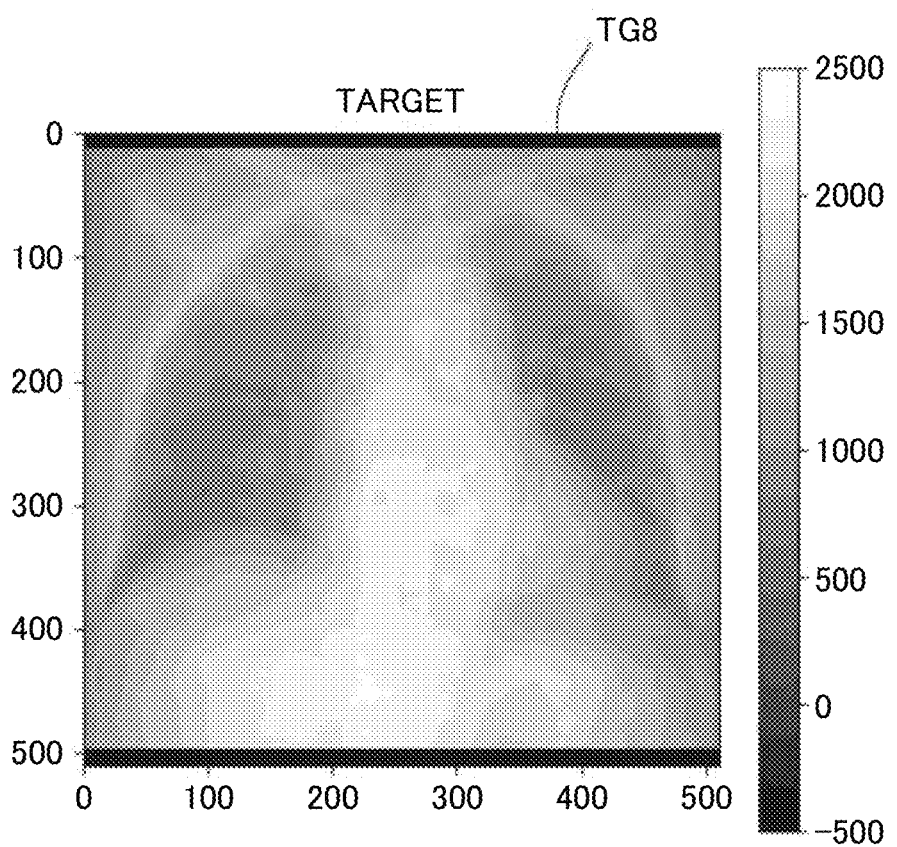
FIG. 12C is a diagram illustrating a target SUM image in the eighth generating example.
Figure 12D:
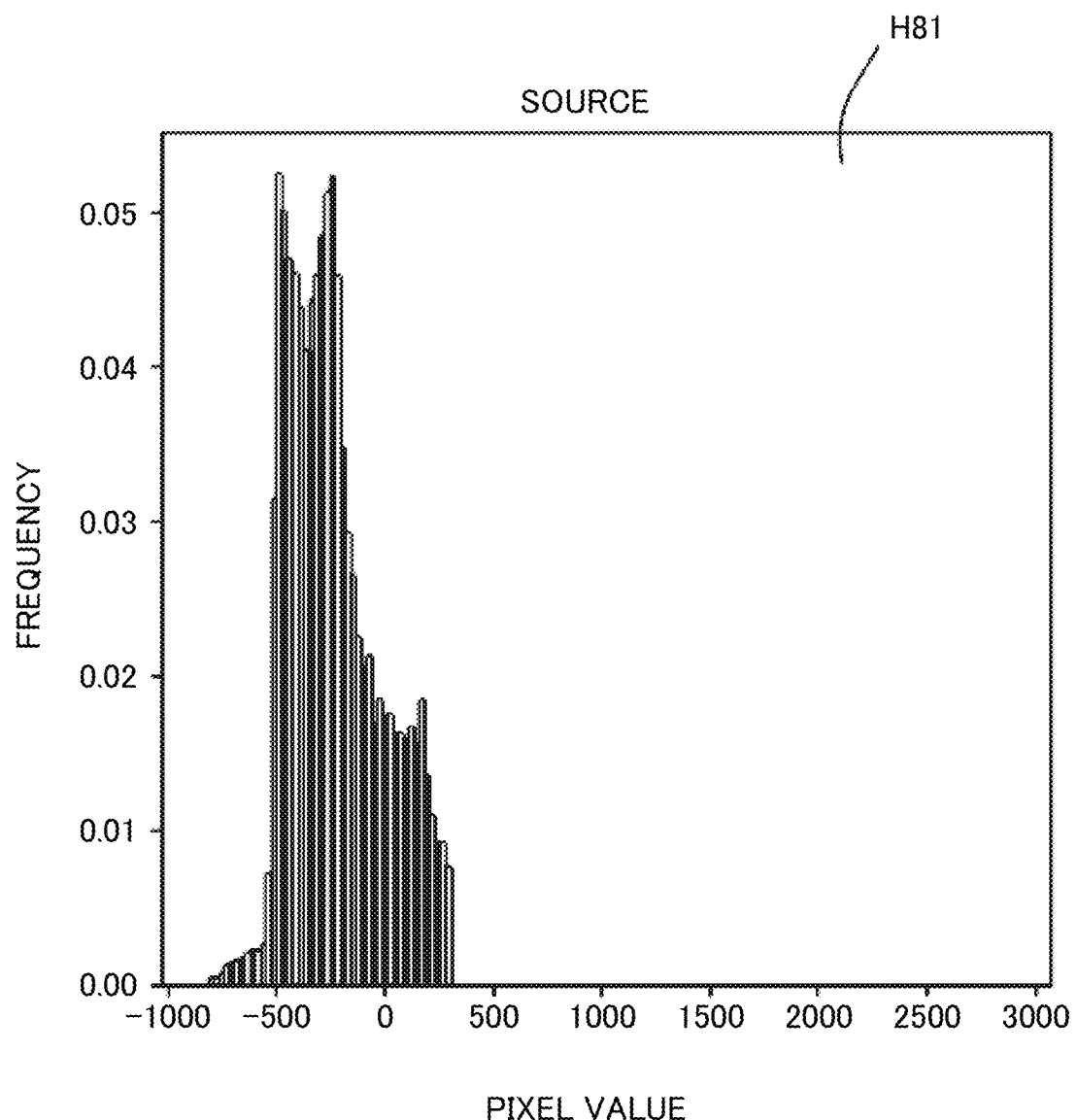
FIG. 12D is a diagram illustrating an original histogram related to the original SUM image in the eighth generating example.
Figure 12E:
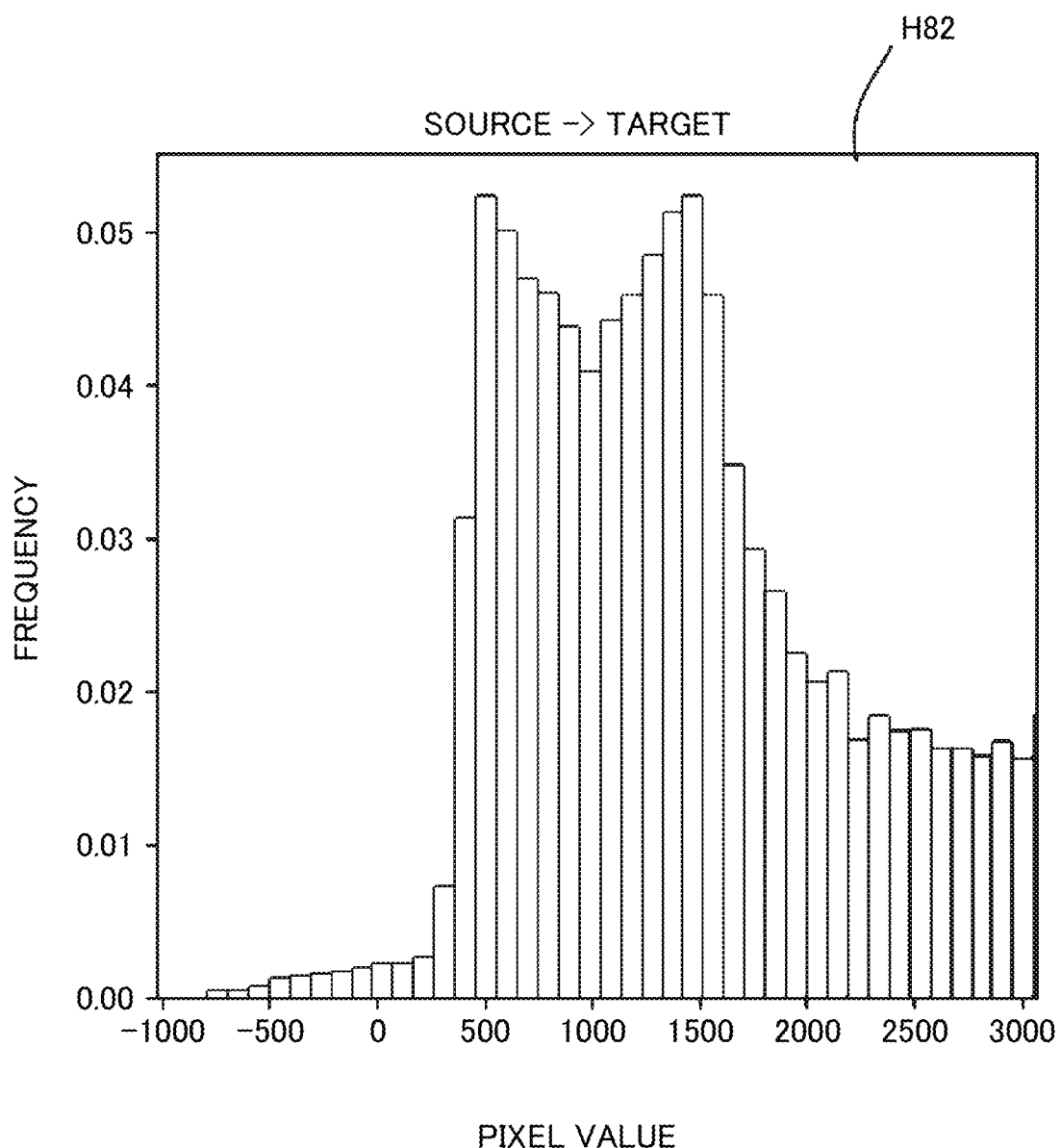
FIG. 12E is a diagram illustrating an output histogram related to the output SUM image in the eighth generating example.
Figure 12F:
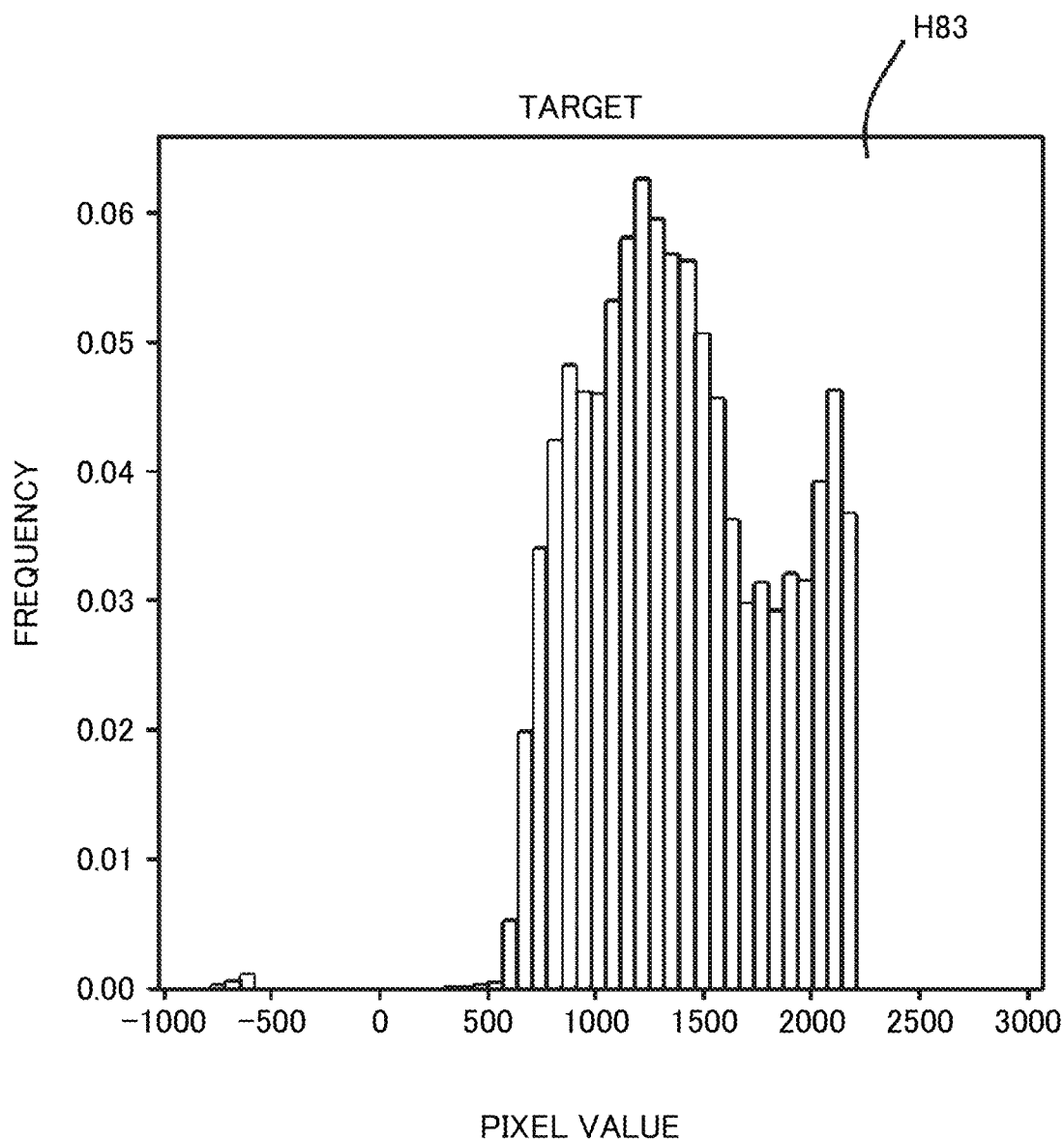
FIG. 12F is a diagram illustrating a target histogram related to the target SUM image in the eighth generating example.
Figure 12G:
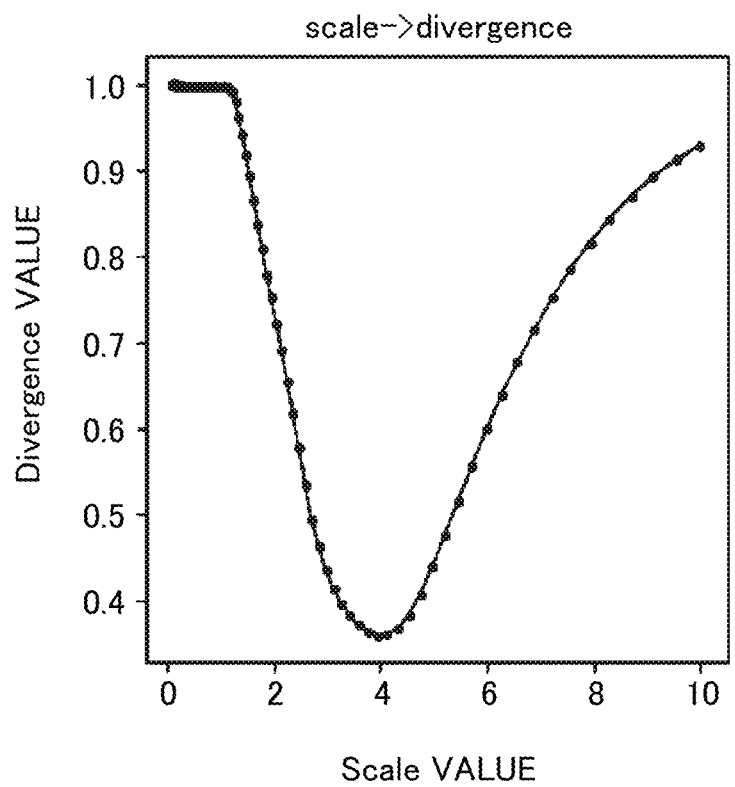
FIG. 12G is a diagram illustrating a relationship between a scale value and a divergence value in the eighth generating example.

FIG. 12A is an example of an original SUM image SR8. FIG. 12B is an example of an output SUM image OT8. FIG. 12C is an example of a target SUM image TG8. FIG. 12D is an example of an original histogram H81 related to the original SUM image SR8. FIG. 12E is an example of an output histogram H82 related to the output SUM image OT8. FIG. 12F is an example of a target histogram H83 of the target SUM image TG8. FIG. 12G is a diagram illustrating a relationship between a scale value and a divergence value.

In the eight generating example, the histogram processing unit 164 compares the original histogram H81 and the target histogram H83, for example, according to the histogram intersection, and calculates the divergence value. Based on the original histogram H81 and the scale value, the histogram processing unit 164 multiplies the original histogram H81 and the scale value, for example, and enlarges the original histogram H81 in the x-axis direction (for example, the horizontal direction in FIG. 12D) to generate the processed histogram. The histogram processing unit 164 compares the processed histogram and the target histogram H83, for example, according to the histogram intersection, and calculates the divergence value. The degree of difference between each processed histogram based on each scale value and the target histogram H83 is shown as the divergence value for each scale value in FIG. 12G.

The luminance processing unit 163 calculates a WW value (an example of the output WW/WL) corresponding to the scale value (for example, a value of 4.0) at which the divergence value in FIG. 12G is equal to or less than a predetermined value (for example, a value of 0.3) (for example, the minimum value). The luminance processing unit 163 carries out the luminance control based on the derived WW value to the original SUM image SR8. The image generation unit 162 generates the output SUM image OT8 luminance-controlled by the luminance processing unit 163.

According to this eighth generating example, the medical image processing apparatus 100 carries out the scale processing to the original histogram H81 so that the divergence value between the original histogram H81 and the target histogram H83 is as small as possible. Accordingly, the output histogram H82 can be generated. Therefore, the medical image processing apparatus 100 can generate the output SUM image OT8 based on the original SUM image SR8. Accordingly, the medical image processing apparatus 100 can obtain the same effect as the first generating example.

Ninth Generating Example

In a ninth generating example, as the target SUM image, one SUM image is generated from one or more slice images in the volume data of the lung region. It is also assumed that one SUM image is generated from one or more slice images in the volume data of the lung region, as the original SUM image and the output SUM image. In addition, it is assumed that the target SUM image, the original SUM image, and the output SUM image are images including the lung region of the subject. In addition, the processing of the SUM image is assumed to be performed by the scale processing or shift processing. In the ninth generating example, descriptions on items or processing similar to those in the first to eighth generating examples are omitted or simplified.

Figure 13A:
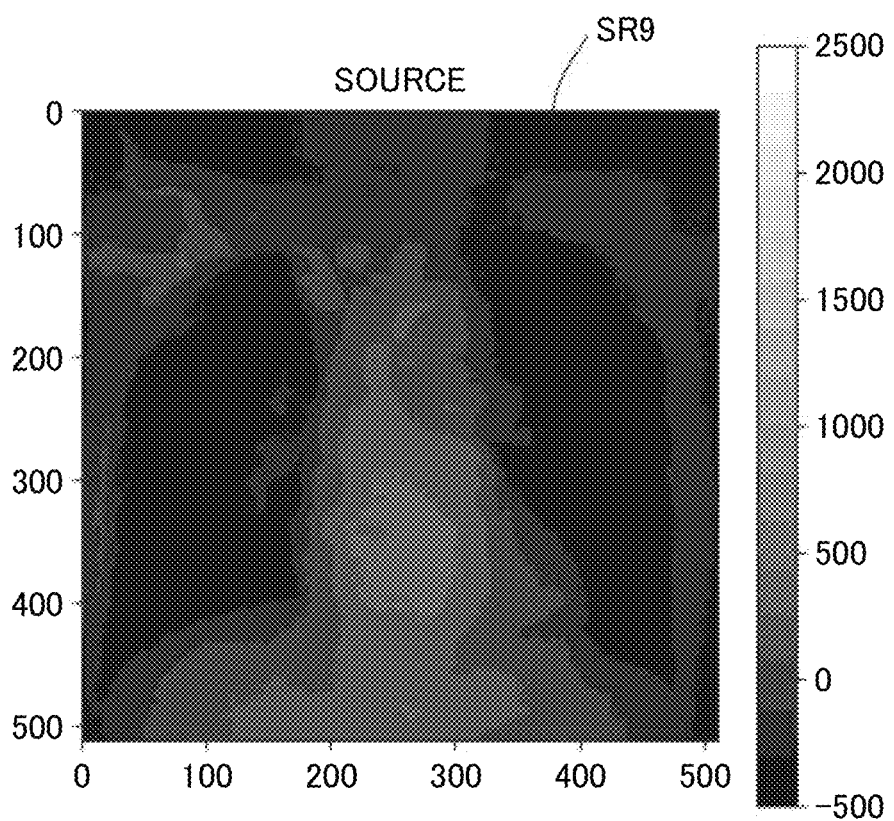
FIG. 13A is a diagram illustrating an original SUM image in a ninth generating example.
Figure 13B:
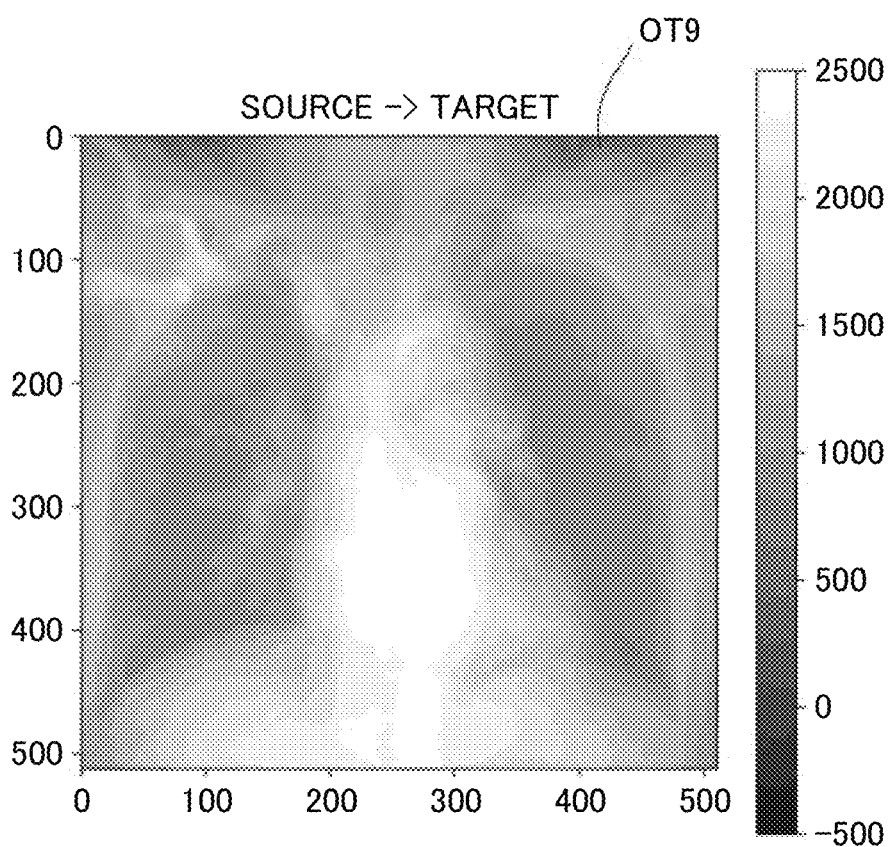
FIG. 13B is a diagram illustrating an output SUM image in the ninth generating example.
Figure 13C:
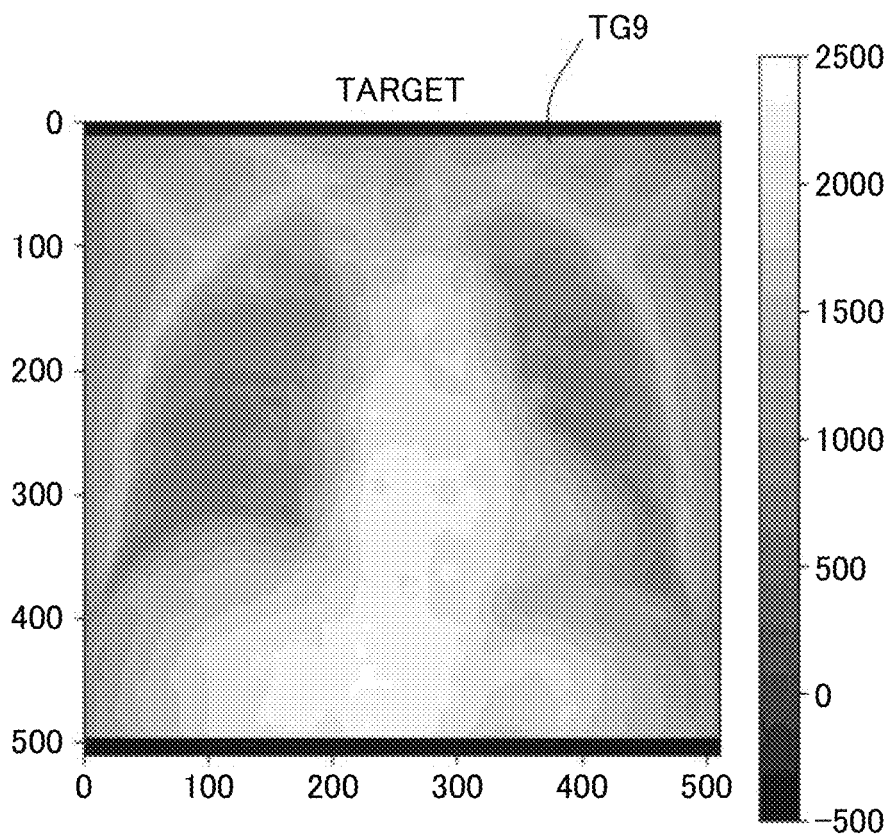
FIG. 13C is a diagram illustrating a target SUM image in the ninth generating example.
Figure 13D:
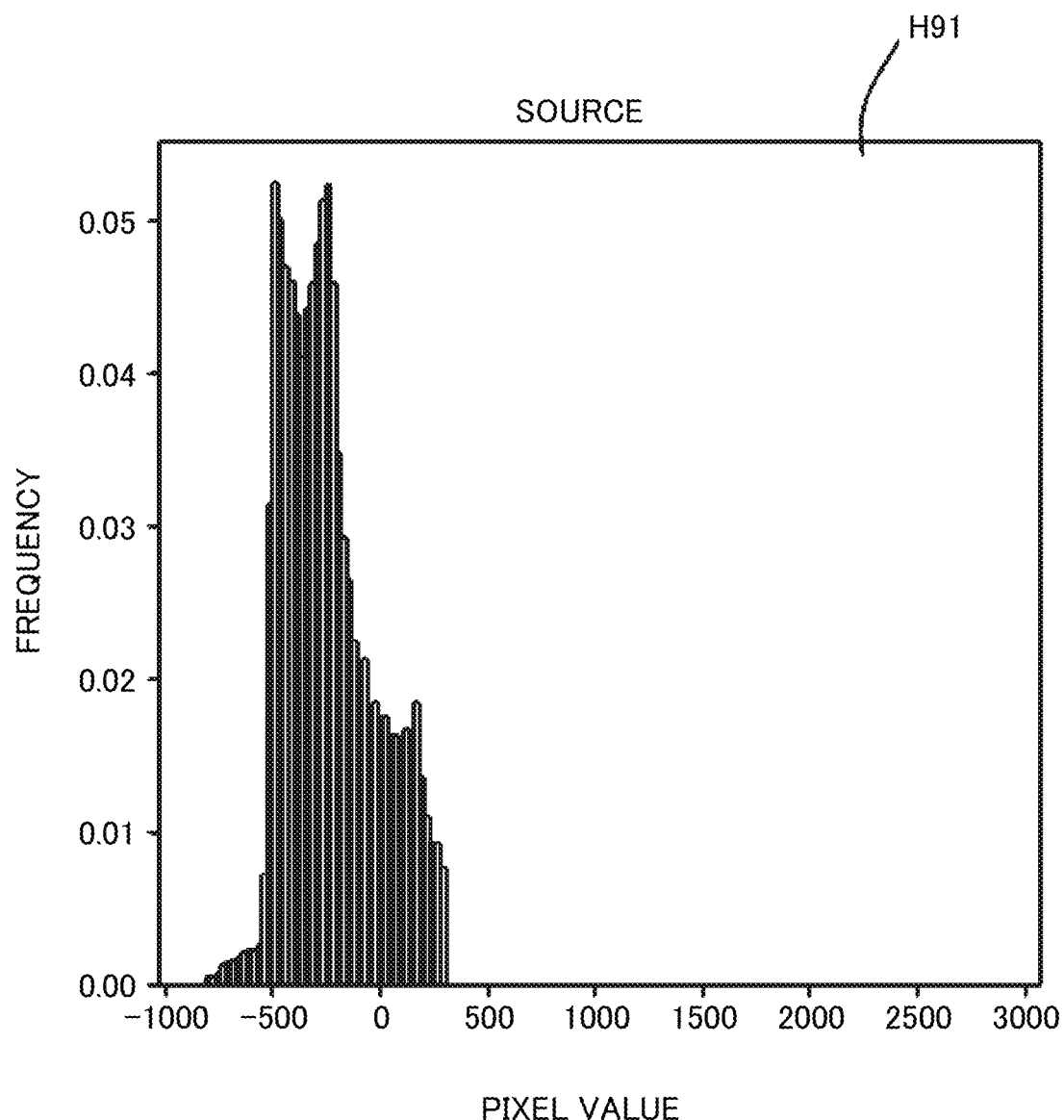
FIG. 13D is a diagram illustrating an original histogram related to the original SUM image in the ninth generating example.
Figure 13E:
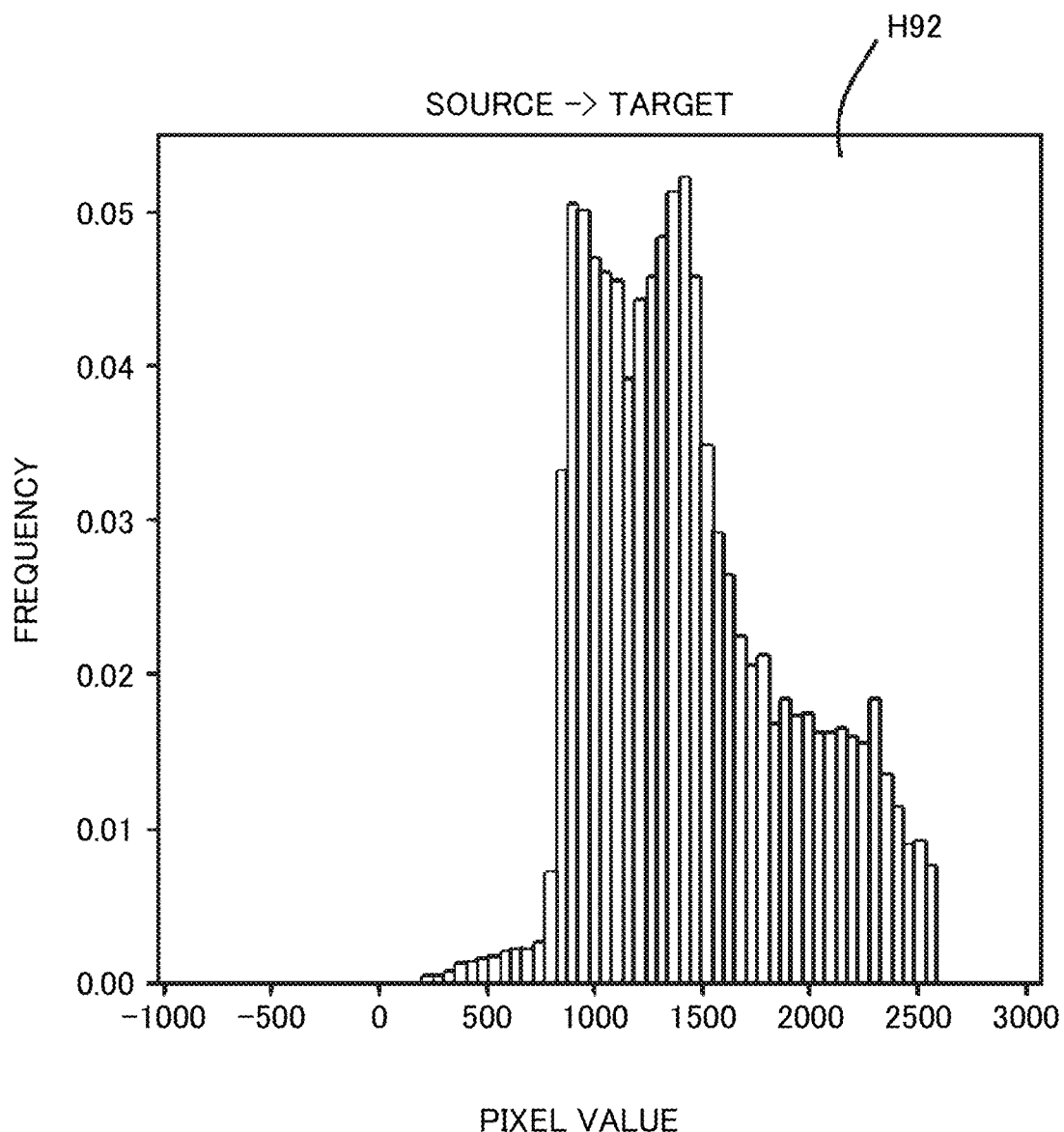
FIG. 13E is a diagram illustrating an output histogram related to the output SUM image in the ninth generating example.
Figure 13F:
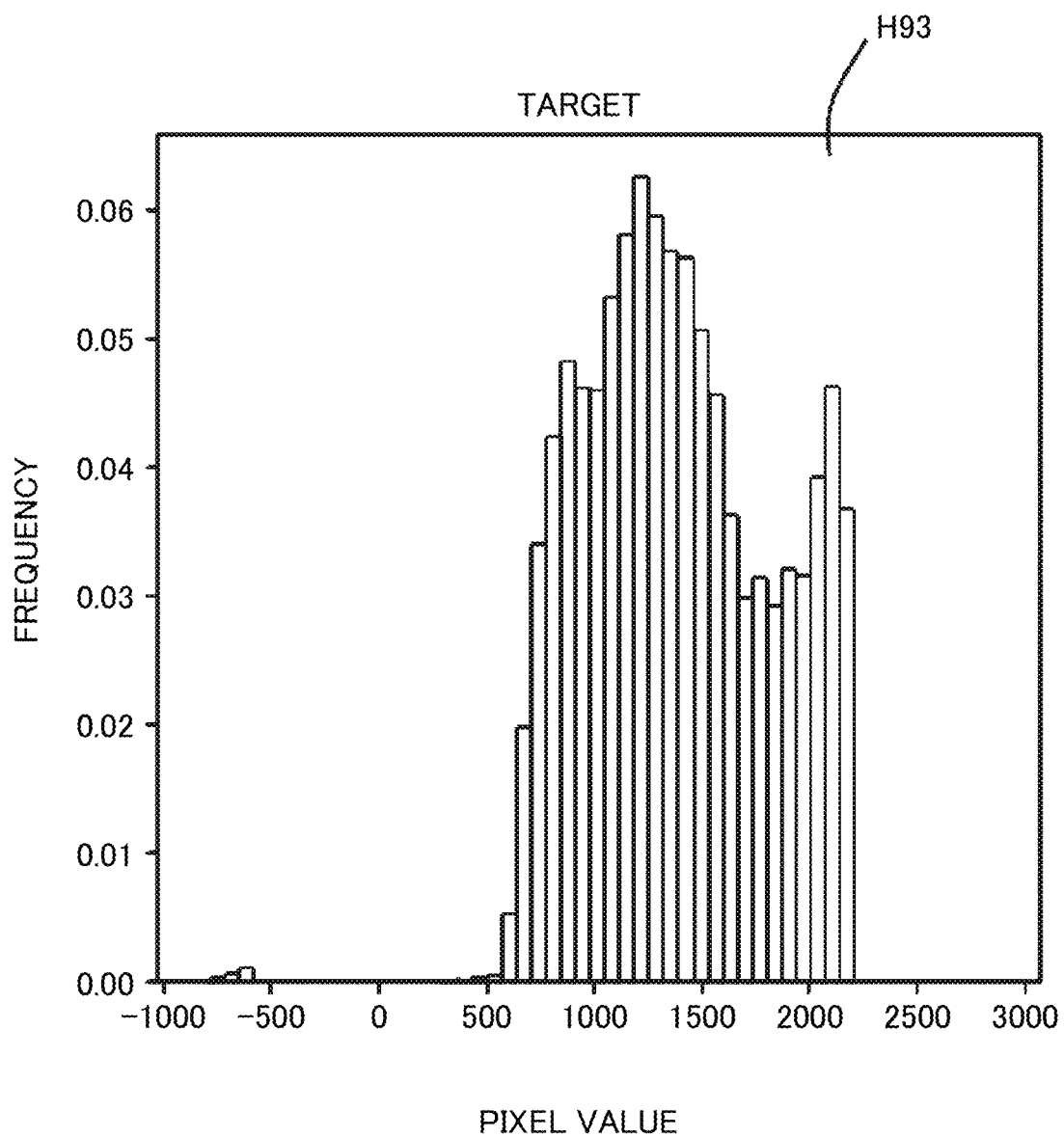
FIG. 13F is a diagram illustrating a target histogram related to the target SUM image in the ninth generating example.
Figure 13G:
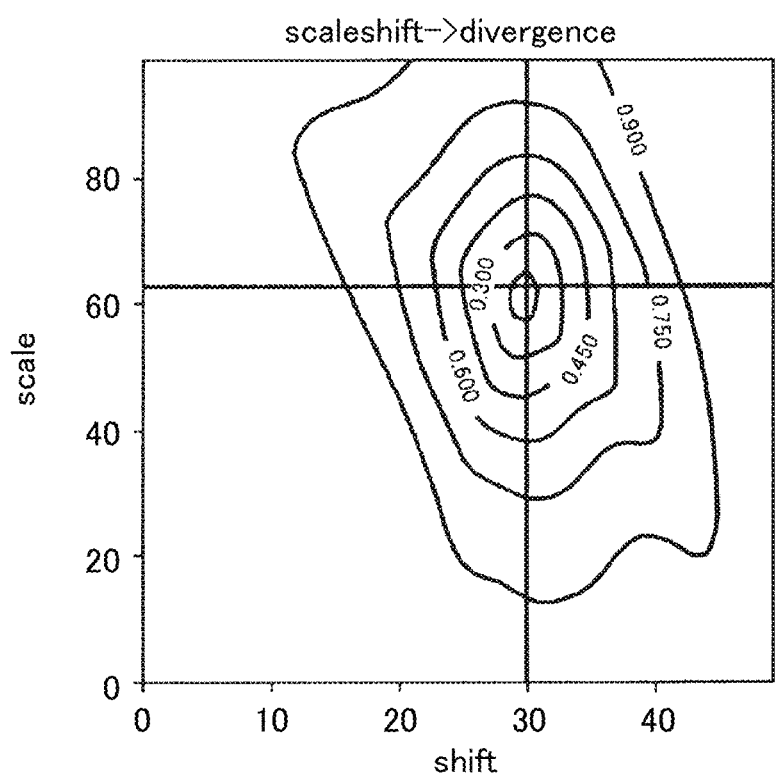
FIG. 13G is a diagram illustrating a relationship of a divergence value with a scale value and a shift value in the ninth generating example.

FIG. 13A is an example of an original SUM image SR9. FIG. 13B is an example of an output SUM image OT9. FIG. 13C is an example of a target SUM image TG9. FIG. 13D is an example of an original histogram H91 related to the original SUM image SR9. FIG. 13E is an example of an output histogram H92 related to the output SUM image OT9. FIG. 13F is an example of a target histogram H93 of the target SUM image TG9. FIG. 13G is a diagram illustrating a relationship of a divergence value with a scale value and a shift value.

In the ninth generating example, the histogram processing unit 164 compares the original histogram H91 and the target histogram H93, for example, according to the histogram intersection, and calculates the divergence value. Based on the original histogram H91 and the scale value and the shift value, the histogram processing unit 164 multiplies, for example, the original histogram H91 and the scale value and adds the shift value to the multiplication result to generate the processed histogram which is obtained by enlarging and translating the original histogram H91 in the x-axis direction (for example, the horizontal direction in FIG. 13D). The histogram processing unit 164 compares the processed histogram and the target histogram H93, for example, according to the histogram intersection, and calculates the divergence value. The degree of difference between the target histogram H93 and each processed histogram based on each scale value and each shift value is shown on the two-dimensional plane, as the divergence value for each scale value and each shift value in FIG. 13G.

The luminance processing unit 163 calculates a WW value corresponding to the scale value (for example, a value of 62) and a WL value corresponding to the shift value (for example, a value of 30) both at which the divergence value in FIG. 13G is equal to or less than a predetermined value (for example, a value of 0.3) (for example, the minimum value). The luminance processing unit 163 carries out the luminance control based on the derived WW value and WL value to the original SUM image SR9. The image generation unit 162 generates the output SUM image OT9 luminance-controlled by the luminance processing unit 163.

According to this ninth generating example, the medical image processing apparatus 100 carries out the scale processing and the shift processing to the original histogram H91 so that the divergence value between the original histogram H91 and the target histogram H93 is as small as possible. Accordingly, the output histogram H92 can be generated. Therefore, the medical image processing apparatus 100 can generate the output SUM image OT9 based on the original SUM image SR9. Accordingly, the medical image processing apparatus 100 can obtain the same effect as the third generating example.

In addition, the medical image processing apparatus 100 can perform fine luminance control of WW/WL by carrying out the shift processing together with the scale processing to the original histogram H91. Accordingly, as compared with the eighth generating example, the medical image processing apparatus 100 can make the luminance control to the original SUM image SR9 one step closer to the luminance control related to the target SUM image TG9. Therefore, in the output SUM image OT9, the medical image processing apparatus 100 can prevent halation by an excessive height of the pixel value of lungs part as in the output SUM image OT8. Accordingly, the medical image processing apparatus 100 can increase the reproducibility of the SUM image after the luminance control.

In this manner, the medical image processing apparatus 100 can carry out the luminance control used in the past to the SUM image (original SUM image), and generate a SUM image (output SUM image) for display. In addition, the user operation related to the luminance control for the original SUM image is unnecessary, and thus the convenience of the user related to the luminance control of the SUM image can be improved.

The medical image processing apparatus 100 can obtain stable results by reducing the influence of the slice number of the volume data, slice pitch, and the size of the patient (subject). For example, when the number of slices is large, a length (thickness) in the direction along the virtual ray which is the generation object of the SUM image increases and the pixel value is likely to increase. In addition, when the slice pitch is short, the number of slices is likely to be large. Therefore, the pixel value is likely to increase. Even in this case, the medical image processing apparatus 100 can control the distribution of the pixel values of the SUM image to be the same as the SUM image which has been luminance-controlled in the past by using histogram. Therefore, the medical image processing apparatus 100 can stabilize the luminance balance when displaying the SUM image, by reducing the influence due to the size of the slice number and the slice pitch. In addition, when the size of the subject is large, influence of the pixel value of a specific part (for example, lungs or bone) is likely to occur, and the pixel value may greatly vary depending on the imaged range. Even in this case, the medical image processing apparatus 100 can control the distribution of the pixel values of the SUM image to be the same as the SUM image which has been luminance-controlled in the past by using histogram. Therefore, the medical image processing apparatus 100 can stabilize the luminance balance when displaying the SUM image, by reducing the influence of the size of the subject.

In addition, in a case of increasing the display range (thickness direction) when displaying the SUM image, since the SUM image is an image obtained based on the addition result of voxel value of each voxel, the visibility is likely to deteriorate. On the other hand, in the medical image processing apparatus 100, even when changing the length in the thickness direction, it is possible to prevent the visibility of the SUM image from deteriorating by performing the above described luminance control. The thickness of the range which is the generation object of the SUM image may be input by the user operation via the UI 120.

Other Embodiments

The present disclosure is not limited to the configuration of the embodiments, and any configuration can be adopted as long as the configuration can achieve the functions shown in the claims or the functions of the configuration of the present embodiments.

In the first embodiment, the port 110 may acquire the volume data having different frequency conditions (or kernel of FBP) related to image reconstruction of the CT apparatus 200 in a mixed manner. The frequency conditions may include a mediastinal condition (low frequency emphasis) and a lung field condition (high frequency emphasis). That is, the port 110 may acquire volume data of the mediastinal condition and volume data of the lung field condition in a mixed manner. The image generation unit 162 may generate a SUM image (for example, the target SUM image, the original SUM image, and the output SUM image) based on the acquired volume data. This is because the pixel value (luminance) of the SUM image is suitably adjusted based on the past luminance control result regardless of whether it is the mediastinal condition or the lung field condition. That is, the medical image processing apparatus 100 can generate a SUM image suitably luminance-controlled, without special consciousness of difference in CT kernel on the side of the CT apparatus 200 (whether it is the mediastinal condition or the lung field condition).

In the first embodiment, the image generation unit 162 may apply a two-dimensional (2D) filter (for example, Gaussian filter) to the generated SUM image to generate a SUM image in which the low frequency components are suppressed. Accordingly, the frequency of the pixels included in the SUM image increases, thus the SUM image is clearly visualized. In this case, in the histogram of the SUM image in which the low frequency component is suppressed, the frequency of the low frequency pixel value is slightly decreased, but the characteristic of the histogram does not change so much. Therefore, even if the 2D filter is applied to the SUM image, the medical image processing apparatus 100 can suitably adjust the image quality, and furthermore, the features included in the SUM image can be sharpened by emphasizing the contour or removing the noise. Accordingly, the user can see the luminance-controlled SUM image more easily.

The image generation unit 162 may apply the 2D filter to the original SUM image and apply the 2D filter to the target SUM image. In addition, the image generation unit 162 may apply the 2D filter to the original SUM image or apply the 2D filter to the target SUM image. In addition, the histogram of the SUM image may be generated either before or after applying the 2D filter. This is because the pixel value (luminance) of the SUM image is suitably adjusted based on the past luminance control result, regardless of presence or absence, before or after of the application of 2D filter.

In the first embodiment, the CT apparatus 200 may obtain the volume data by capturing an image in a state (contrasting state) in which the contrast medium is administered to the subject (contrasted state), or may obtain the volume data by capturing an image in a state (non-contrast state) in which the contrast medium is not administered to the subject. That is, the port 110 may acquire the volume data in the contrasted state and the volume data in the non-contrast state in a mixed manner. The image generation unit 162 may generate a SUM image (for example, the target SUM image, the original SUM image, and the output SUM image) based on the acquired volume data. This is because the pixel value (luminance) of the SUM image is suitably adjusted based on the past luminance control result, in both cases of the contrasted state and the non-contrast state. That is, the medical image processing apparatus 100 can generate the SUM image suitably luminance-controlled, without special consciousness of whether the image is captured in the contrasted state or the non-contrast state.

In the first embodiment, the histogram processing unit 164 may demarcate the SUM image generated by the image generation unit 162 into lung region and non-lung region along the body axis direction of the subject. The histogram processing unit 164 may generate histograms individually in each of the lung region and the non-lung region demarcated in the SUM image. In the SUM image of the lung region, the pixel value is relatively low, and in the SUM image of the non-lung region, the pixel value is relatively high. Accordingly, the medical image processing apparatus 100 generates histograms individually in each of the lung region and the non-lung region. Thus, the luminance control suitable for lung observation and the luminance control suitable for non-lung observation can be recorded in the memory 150 as individual information. Accordingly, the medical image processing apparatus 100 can perform the luminance control to the original SUM image of the lung region or the non-lung region, based on the information of the luminance control suitable for the lung observation or the information of the luminance control suitable for the non-lung observation, and can generate the output SUM image.

In the first embodiment, the histogram processing unit 164 may generate the target histogram or the target WW/WL, based on an angle of the subject with respect to the virtual ray for generating the SUM image, for example, for each angle of the subject or for each range of the angle of the subject. The recording control unit 165 may record at least one of the information of the target SUM image, the target histogram, and the target WW/WL in the memory 150. The angle described above is determined based on an orientation of the subject (for example, a supine position, a prone position, a side lying lateral position rotated 90 degrees from the supine position or the prone position, or other angles).

When the angle of the subject is different, the length of the subject through which the virtual ray pass, that is, the length (thickness) of the subject along virtual ray changes. When the length of the subject along the virtual ray is short, the number of slice images included in the SUM image tends to be small and the pixel value tends to be small. On the other hand, when the length of the subject along the virtual ray is long, the number of slice images included in the SUM image tends to be large, and the pixel value tends to become large. Accordingly, the medical image processing apparatus 100 can perform the luminance control of the SUM image appropriate for the thickness of the subject, by preparing different histograms in accordance with the angle of the subject, based on the past result according to the angle of the subject.

The histogram processing unit 164 may generate the output histogram from the original histogram based on the target histogram stored in the memory 150, based on the angle of the subject with respect to the virtual ray related to the generation of a current SUM image. In this case, the histogram processing unit 164 may determine which target histogram will be acquired from the memory 150, according to which angular range includes the angle of the subject to the virtual ray. This is because the target histogram can be generated for each angle. The histogram processing unit 164 may generate luminance information (for example, the output WW/WL) for luminance control of the original SUM image, based on the degree of difference between the original histogram and the target histogram.

When the angle of the subject to the virtual ray related to the generation of the current SUM image does not correspond to any angle related to the target histogram recorded individually for each angle, the histogram processing unit 164 may generate a target histogram related to the current angle of the subject, by interpolating (for example, linearly interpolating) the target histogram related to the angle which does not correspond to any angle related to the target histogram recorded individually for each angle. Accordingly, the medical image processing apparatus 100 can derive target histograms corresponding to various angles even when target histograms for every angle are not accumulated in the memory 150.

In the first embodiment, the luminance control of the SUM image is not limited to the luminance control using the WW/WL, and other luminance control may be adopted. For example, the image generation unit 162 may calculate the pixel value of the SUM image from the sum of the voxel values on the virtual ray using a look up table (LUT) function or a piecewise function. The LUT function and the piecewise function may be stored in the memory 150, for example. In the LUT function, for example, pixel values for output are defined for the original pixel values respectively one by one. In the piecewise function, a pixel value of the output for any one or more original pixel values is determined and the pixel value of output for undefined original pixel value is interpolated, for example, by linear interpolation. Each value included in the LUT function and the piecewise function may be a predetermined preset value or a variable value that can be changed afterwards. In addition, the image generation unit 162 may add colors to the SUM image by using the LUT function and the piecewise function as a color map function. In addition, the histogram processing unit 164 may generate histograms for the SUM image from the sum of the voxel values on the virtual ray, and generate the LUT function and the piecewise function by comparing the histograms.

Therefore, the medical image processing apparatus 100 can perform luminance control by changing the value of the LUT function afterwards without using the WW/WL by performing the luminance control using the LUT function. Accordingly, the luminance processing unit 163 does not need the luminance control using a preset value as a fixed value, and can perform flexible luminance control. In addition, the medical image processing apparatus 100 can perform the luminance control using the piecewise function to determine correspondence relation between pixel values of the original SUM image and several points of the output SUM image without using the WW/WL. Thus, the SUM image can be luminance-controlled.

In the first embodiment, the degree of similarity between the image and the histogram is obtained using the histogram intersection, but other methods (for example, methods such as histogram correlation, chi-square, and bhattacharyya distance) may be used. As long as statistical features of the SUM image can be compared, any method may be adopted.

In the first embodiment, the histogram processing unit 164 may separately generate the target histogram based on whether the SUM image is based on the volume data in the contrasted state or the non-contrast state. That is, a target histogram having the contrast medium and a target histogram without the contrast medium may be generated and stored in the memory 150.

The histogram processing unit 164 may acquire information on whether the SUM image is a SUM image having the contrast medium or a SUM image without the contrast medium, for example, by user operation via the UI 120. The histogram processing unit 164 may determine whether the histogram is the target histogram having the contrast medium or a target histogram without the contrast medium, as the target histogram to be used for the luminance control, based on whether the original SUM image is a SUM image having the contrast medium or a SUM image without the contrast medium. Accordingly, the medical image processing apparatus 100 can generate and record the target histogram by classifying cases depending on the presence or absence of the contrast medium, perform luminance control to the original SUM image by using the target histogram, and generate the output SUM image.

In the first embodiment, the target histogram may be separately generated based on the purpose of CT scanning (such as pulmonary purpose or IVR purpose). Here, the pulmonary purpose is to mainly aim to observe the lung region. The IVR purpose is to mainly aim to observe the vicinity of the pelvis from the abdomen. The information on the purpose of the CT scanning may be acquired by input of the user via the UI 120. Based on the acquired purpose of the CT scanning, the histogram processing unit 164 may determine the target histogram (for example, a target histogram related to the pulmonary purpose or a target histogram for the IVR purpose) appropriate for the acquired purpose of the CT scanning, from a plurality of histograms classified by CT scanning purposes, as a target histogram to be used for the luminance control. Accordingly, the medical image processing apparatus 100 can classify cases according to the purpose of CT scanning, classify the cases according to lesions desired to be observed, for example, generate and record a target histogram, and perform the luminance control to the original SUM by using the target histogram to generate an output SUM image.

In the first embodiment, the region extraction unit 161 may extract any region (for example, lungs) in volume data. The image generation unit 162 may render the extracted region to generate the SUM image. The image generation unit 164 may generate the histogram of the generated SUM image. In this case, the histogram processing unit 164 may generate a histogram for each region of the subject and record in the memory 150. Accordingly, the medical image processing apparatus 100 can generate the target histogram for each extracted region to record the histogram in the memory 150, and perform the luminance control to the original SUM image using the target histogram to generate the output SUM image.

In the first embodiment, the image generation unit 162 may adjust the number of slice images used for SUM image to generate the SUM image. That is, the image generation unit 162 may generate the SUM image by changing the length (thickness) of the virtual ray direction of the volume data expressed by the SUM image. The information on the thickness (thickness after the change) may be acquired by the input of the user via the UI 120. When the above thickness is changed, the luminance processing unit 163 may perform the luminance control to the original SUM image based on the target histogram, and the image generation unit 162 may generate the luminance-controlled output SUM image. Accordingly, when the range of the volume data desired to be observed has been changed, the medical image processing apparatus 100 can perform the luminance control suitable for observing the changed range. Thus, the user can suitably observe the subject in the SUM image while changing the thickness along the virtual ray direction of the SUM image.

In the first embodiment, when changing WW/WL (for example, the target WW/WL) via the UI 120, processing unit 160 may adjust the correspondence relationship between the amount of movement of the UI 120 and the change amount of the WW/WL. For example, when performing a drag operation to move the WW/WL by a unit length via the UI 120, the processing unit 160 may set the change amount of the WW/WL corresponding to the unit length. In addition, for example, when performing the drag operation to move a slider bar via the UI 120, the processing unit 160 may set the change amount of the WW/WL corresponding thereto. In this case, the change amount of the WW/WL with respect to a movement amount of the UI 120 may be determined based on the WW/WL obtained by calculation. In addition, for example, when performing the drag operation via the spin button in the UI 120 or the SUM image, the processing unit 160 may set the change amount of the WW/WL corresponding thereto. In this case, the change amount of the WW/WL with respect to the movement amount of the UI 120 may be determined based on the WW/WL obtained by calculation. In addition, for example, when performing an increasing or decreasing operation of a value of a physical device in the UI 120 via a wheel or a scroll pad, the processing unit 160 may set the change amount of the WW/WL corresponding thereto. In this case, the change amount of the WW % WL with respect to the movement amount of the UI 120 may be determined based on the WW/WL obtained by calculation.

For example, the processing unit 160 can set a changing range of the WW that can be changed by the slider bar, from 0.1 times to 10 times the WW obtained by calculation based on the histogram. In addition, the processing unit 160 can set the changing range of the WL that can be changed by the slider bar, to the range of WL±WW with respect to the WW/WL obtained by calculation based on the histogram. Therefore, for example, when the calculation result based on the histogram is WW: a value of 100 and WL: a value of 50, the changing range of the WW that can be changed by the slider bar is WW: values within 10 to 1000 and WL: values within −50 to 150. Accordingly, when the slider bar receives an operation (an example of the luminance operation) of continuously changing the luminance of SUM image, the processing unit 160 determines the change amount of the WW/WL corresponding to the operation amount of the luminance operation and determine the value of the WW/WL, based on the information of the changing range of the WW/WL that can be changed by the slider bar. Accordingly, the medical image processing apparatus 100 can maintain the movement amount of the UI 120 when performing an operation via the UI 120 and change amount of the WW/WL at a constant amount desired by the user, and facilitate an operation of changing the WW/WL performed by the user. The information on the changing range of the WW/WL that can be changed by the slider bar may be predetermined and may be stored in the memory 150. The WW/WL that can be changed by the slider bar may be any one of the target WW/WL, the original WW/WL, and the output WW/WL.

In the first embodiment, although the operation example related to the generation of the target histogram has been described in FIG. 3, when a predetermined histogram for luminance control is stored in the memory 150 or the like in advance, the operation in FIG. 3 may be omitted.

In the first embodiment, the image generation unit 162 may generate the SUM image by excluding the bone region (or calcium region) from the volume data. The luminance processing unit 163 may perform the luminance control to the original SUM image from which the bone region is excluded, and the image generation unit 162 may generate the luminance-controlled output SUM image. Accordingly, even when the voxel value of voxels of an observation object and the voxel value of the bone region are greatly different, the medical image processing apparatus 100 becomes easy to perform the luminance control according to the voxels of the observation object, and makes it easier for the user to view the observation object.

In the first embodiment, it has been exemplified that the volume data as the captured CT image is transmitted from the CT apparatus 200 to the medical image processing apparatus 100. Alternatively, the volume data may be transmitted to a server or the like on the network and stored in the server or the like so that the volume data is temporarily stored. In this case, the port 110 of the medical image processing apparatus 100 may acquire the volume data from the server or the like via a wired line or a radio line when necessary, and also acquire the volume data via an arbitrary storage medium (not shown).

In the first embodiment, it has been exemplified that the volume data as the captured CT image is transmitted from the CT apparatus 200 to the medical image processing apparatus 100 via the port 110. The example also includes a case where the CT apparatus 200 and the medical image processing apparatus 100 are practically combined to be made as one product. In addition, the example also includes a case where the medical image processing apparatus 100 is treated as a console of the CT apparatus 200.

In the first embodiment, it has been exemplified that an image is captured by the CT apparatus 200 and the volume data including information inside the living body is generated. However, the volume data may be generated by using a so-called cone beam apparatus (in particular, an apparatus that obtains the volume data by rotating an angiography apparatus), other than a CT apparatus in a narrow sense that outputs a CT value using a Hounsfield unit, such as a helical CT apparatus or an area detector CT apparatus.

In the first embodiment, although it has been exemplified that an image is captured by the CT apparatus 200 and the volume data including information inside the living body is generated, an image may be captured by other apparatuses to generate the volume data. Other apparatuses include a magnetic resonance imaging (MRI) apparatus, a positron emission tomography (PET) apparatus, an angiography apparatus, or other modality apparatuses. Also, the PET apparatus may be used in combination with other modality apparatuses. Therefore, for example, also in the MRI apparatus, the luminance control described in the first embodiment can be implemented.

In the first embodiment, human body is exemplified as the subject, but the subject may be animal body.

The present disclosure provides a program that realizes the function of the medical image processing apparatus of the first embodiment to a medical image processing apparatus via network or various storage media. Also, a program that a computer in the medical image processing apparatus reads and executes is in an applicable range.

As described above, in the medical image processing apparatus 100 of the embodiment, the acquisition unit (for example, the port 110) acquires first volume data including the subject (for example, the volume data B_vol of S21 in FIG. 4). The luminance condition which is to be satisfied by the luminance of the first SUM image (for example, the new SUM image) based on the first volume data is predetermined. The processing unit 160 generates first luminance information (for example, B_wwwl or output WW/WL after change) that gives the luminance of the first SUM image satisfying the luminance condition. The processing unit 160 generates a first SUM image based on the first volume data and the first luminance information.

Accordingly, the medical image processing apparatus 100 can generate the first SUM image for output by performing the luminance control to the original SUM image using the first luminance information satisfying the luminance condition. In addition, the user operation related to the luminance control for the first SUM image is unnecessary, and thus the convenience of the user related to the luminance control of the first SUM image can be improved. Accordingly, the medical image processing apparatus 100 can suitably perform the luminance control to the first SUM image.

The luminance condition may be a condition that the degree of difference (for example, the divergence value) between first statistical information (for example, the original histogram or the output histogram) indicating the distribution of the pixel values of each pixel of first SUM image and a predetermined second statistical information is equal to or less than a threshold value (for example, a value of 0.3).

Accordingly, the medical image processing apparatus 100 can generate a first SUM image in which the difference between first statistical information and second statistical information is small, that is, the first statistical information and the second statistical information are similar to each other. Therefore, the medical image processing apparatus 100 can generate the first SUM image that satisfies the desired luminance as the second statistical information, and can provide the first SUM image with good visibility to the user.

The acquisition unit may acquire second volume data (for example, the volume data A_vol of S11 in FIG. 3) including a subject different from the subject of the first volume data. The processing unit 160 may generate second luminance information (for example, A_wwwl) that gives the luminance of a second SUM image (for example, the target SUM image) based on the second volume data, based on the input information input by the UI 120. The processing unit 160 may generate the second SUM image based on the second volume data and the second luminance information. The processing unit 160 may generate the first statistical information, generate the second statistical information (for example, the target histogram) indicating the distribution of the pixel values of each pixel of the second SUM image, and generate the first luminance information based on the first statistical information and the second statistical information.

Accordingly, the medical image processing apparatus 100 can perform the luminance control as a result in the past in the medical image processing apparatus 100 as its own apparatus. Therefore, it is unnecessary to acquire the second statistical information from an external apparatus.

The luminance condition may be a condition that the degree of difference (for example, the divergence value) between first statistical information and the second statistical information indicating the distribution of the pixel values of each pixel of the second SUM image is equal to or less than a predetermined threshold value (for example, a value of 0.3).

Accordingly, the medical image processing apparatus 100 can generate the first SUM image that has been subjected to luminance control close to the luminance control which is a result in the past, and can provide the first SUM image with good visibility to the user.

The first luminance information may include at least one of the window width and the window level.

Accordingly, since the medical image processing apparatus 100 uses a general WW/WL as the luminance control of the medical image, it is possible to generate the first SUM image that has been subjected to highly versatile luminance control.

The luminance condition may be a luminance condition to be satisfied by the luminance of the first SUM image in a predetermined projection direction with respect to the subject.

Accordingly, the medical image processing apparatus 100 can change the luminance control amount based on, for example, the orientation of the subject with respect to the virtual ray (projection direction with respect to the subject). For example, when the subject is facing forward with respect to virtual ray, the subject which is the generation object of the SUM image becomes thin. When the subject is facing horizontal with respect to the virtual ray, the subject which is the generation object of the SUM image becomes thick. Therefore, the number of slices used for generating the SUM image changes, and the range of pixel values that are likely to appear as the pixel values of the SUM image may be different. Even in this case, the medical image processing apparatus 100 can prepare the luminance condition according to the projection direction with respect to the subject. Accordingly, as the luminance condition changes, the first luminance information satisfying the luminance condition also changes. Therefore, the medical image processing apparatus 100 can perform the suitable luminance control according to the orientation of the subject to the first SUM image.

The UI 120 may receive the luminance operation (for example, an operation of WW/WL by the slider bar) for continuously changing the luminance of the first SUM image. The luminance operation condition (for example, the changing range of the WW/WL that can be changed by the slider bar and an upper limit value or a lower limit value by the luminance operation) that is to be satisfied by the luminance of the first SUM image based on the luminance operation may be predetermined. The processing unit 160 may generate the first luminance information satisfying the luminance operation condition based on the luminance operation by the UI 120.

Accordingly, the medical image processing apparatus 100 can maintain the operation amount of the UI 120 and the change amount of the first luminance information at a constant amount desired by the user, and facilitate an operation of changing the first luminance information performed by the user. In addition, the medical image processing apparatus 100 can finely adjust the first luminance information derived by calculation based on the histogram manually via the UI 120 to be within a constant change amount.

The present disclosure is useful for a medical image processing apparatus, a medical image processing method, and a medical image processing program and the like that can suitably perform the luminance control for a SUM image.

What is claimed is:

1. A medical image processing apparatus comprising:
an acquisition unit;
a processing unit;
a memory; and
a display, wherein:
the acquisition unit acquires first volume data including data of a subject,
a predetermined luminance condition is set in the memory,
the predetermined luminance condition is to be satisfied by luminance of a first raysum (SUM) image rendering the acquired first volume data,
the processing unit:
generates first luminance information that gives the luminance of the first SUM image that satisfies the predetermined luminance condition;
generates the first SUM image by rendering the acquired first volume data with the first luminance information; and
displays the first SUM image in the display,
the predetermined luminance condition is a condition that a degree of difference between first statistical information and second statistical information is equal to or less than a threshold value,
the first statistical information indicates a distribution of pixel values of each pixel of the first SUM image, and
the second statistical information is predetermined information.

2. The medical image processing apparatus according to claim 1, further comprising:
a user interface, wherein:
the acquisition unit acquires second volume data including data of another subject which is different from the subject of the first volume data, and
the processing unit:
generates second luminance information that gives luminance of a second SUM image rendered by the acquired second volume data, in accordance with an input received by the user interface;
generates the second SUM image by rendering the acquired second volume data with the second luminance information;
generates the first statistical information;
generates second statistical information indicating a distribution of pixel values of each pixel of the second SUM image; and
generates the first luminance information based on the generated first statistical information and the generated second statistical information.

3. The medical image processing apparatus according to claim 2, wherein the predetermined luminance condition is a condition that a degree of difference between the generated first statistical information and the generated second statistical information is equal to or less than the threshold value.

4. The medical image processing apparatus according to claim 1, wherein the first luminance information includes at least one of a window width and a window level.

5. The medical image processing apparatus according to claim 1, wherein the predetermined luminance condition is a luminance condition to be satisfied by the luminance of the first SUM image in a predetermined projection direction with respect to the subject.

6. The medical image processing apparatus according to claim 1, further comprising:
a user interface that receives a luminance operation to continuously change the luminance of the first SUM image,
wherein the processing unit:
has a predetermined luminance operation condition to be satisfied by the luminance of the first SUM image based on the luminance operation; and
generates the first luminance information satisfying the predetermined luminance operation condition based on the received luminance operation by the user interface.

7. A medical image processing method in a medical image processing apparatus, the method comprising:
acquiring, by an acquisition unit, first volume data including data of a subject;
setting a predetermined luminance condition in a memory, wherein the predetermined luminance condition is to be satisfied by luminance of a first raysum (SUM) image rendering the acquired first volume data;
generating, by a processing unit, first luminance information that gives the luminance of the first SUM image that satisfies the predetermined luminance condition;
generating, by the processing unit, the first SUM image by rendering the acquired first volume data and the first luminance information; and
displaying the first SUM image in a display, wherein:
the predetermined luminance condition is a condition that a degree of difference between first statistical information and second statistical information is equal to or less than a threshold value,
the first statistical information indicates a distribution of pixel values of each pixel of the first SUM image, and
the second statistical information is predetermined information.

8. The medical image processing method according to claim 7, further comprising:
acquiring second volume data including data of another subject which is different from the subject of the first volume data;
generating second luminance information that gives luminance of a second SUM image rendered by the acquired second volume data;
generating the second SUM image by rendering the acquired second volume data with the second luminance information;
generating the first statistical information;
generating second statistical information indicating a distribution of pixel values of each pixel of the second SUM image; and
generating the first luminance information based on the generated first statistical information and the generated second statistical information.

9. The medical image processing method according to claim 7, wherein the first luminance information includes at least one of a window width and a window level.

10. The medical image processing method according to claim 7, wherein the predetermined luminance condition is a luminance condition to be satisfied by the luminance of the first SUM image in a predetermined projection direction with respect to the subject.

11. The medical image processing method according to claim 7, further comprising:
receiving a luminance operation to continuously change the luminance of the first SUM image;
having a predetermined luminance operation condition to be satisfied by the luminance of the first SUM image based on the luminance operation; and
generating the first luminance information satisfying the predetermined luminance operation condition based on the received luminance operation.

12. A non-transitory computer-readable medium having instructions stored thereon that, when executed by a computer, cause the computer to:
acquire, by an acquisition unit, first volume data including data of a subject;
set a predetermined luminance condition in a memory, wherein the predetermined luminance condition is to be satisfied by luminance of a first raysum (SUM) image rendering the acquired first volume data;
generate, by a processing unit, first luminance information that gives the luminance of the first SUM image that satisfies the predetermined luminance condition;
generate, by the processing unit, the first SUM image by rendering the acquired first volume data with the first luminance information; and
display the first SUM image in a display, wherein:
the predetermined luminance condition is a condition that a degree of difference between first statistical information and second statistical information is equal to or less than a threshold value,
the first statistical information indicates a distribution of pixel values of each pixel of the first SUM image, and
the second statistical information is predetermined information.

13. The non-transitory computer-readable medium according to claim 12, that when executed by the computer further causes the computer to:
acquire second volume data including data of another subject which is different from the subject of the first volume data;
generate second luminance information that gives luminance of a second SUM image rendered by the acquired second volume data;
generate the second SUM image by rendering the acquired second volume data with the second luminance information;
generate the first statistical information;
generate second statistical information indicating a distribution of pixel values of each pixel of the second SUM image; and
generate the first luminance information based on the generated first statistical information and the generated second statistical information.

14. The non-transitory computer-readable medium according to claim 13, wherein the predetermined luminance condition is a condition that a degree of difference between the generated first statistical information and the generated second statistical information is equal to or less than the threshold value.

15. The non-transitory computer-readable medium according to claim 12, wherein the first luminance information includes at least one of a window width and a window level.

16. The non-transitory computer-readable medium according to claim 12, wherein the predetermined luminance condition is a luminance condition to be satisfied by the luminance of the first SUM image in a predetermined projection direction with respect to the subject.

17. The non-transitory computer-readable medium according to claim 12, that when executed by the computer further causes the computer to:
receive a luminance operation to continuously change the luminance of the first SUM image;
have a predetermined luminance operation condition to be satisfied by the luminance of the first SUM image based on the luminance operation; and
generate the first luminance information satisfying the predetermined luminance operation condition based on the received luminance operation.

\* \* \* \* \*

UNITED STATES PATENT AND TRADEMARK OFFICE
CERTIFICATE OF CORRECTION

PATENT NO. : 10,748,263 B2
APPLICATION NO. : 16/156571
DATED : August 18, 2020
INVENTOR(S) : Takahiro Suzuki Page 1 of 1

It is certified that error appears in the above-identified patent and that said Letters Patent is hereby corrected as shown below:

In the Specification

Column 28, Line 49, "of the WW % WL with respect" should read -- of the WW/WL with respect --

Signed and Sealed this
Tenth Day of August, 2021

Drew Hirshfeld
*Performing the Functions and Duties of the
Under Secretary of Commerce for Intellectual Property and
Director of the United States Patent and Trademark Office*